(12) United States Patent
Tazawa et al.

(10) Patent No.: US 9,116,289 B2
(45) Date of Patent: Aug. 25, 2015

(54) TRANSPARENT CONDUCTIVE ELEMENT, INFORMATION INPUT APPARATUS, AND DISPLAY APPARATUS

(75) Inventors: Hiroshi Tazawa, Miyagi (JP); Shunichi Kajiya, Miyagi (JP); Kazuya Hayashibe, Miyagi (JP); Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 13/091,603

(22) Filed: Apr. 21, 2011

(65) Prior Publication Data

US 2012/0100346 A1   Apr. 26, 2012

(30) Foreign Application Priority Data

Apr. 28, 2010   (JP) .................. 2010-104621

(51) Int. Cl.
*B32B 3/28* (2006.01)
*B32B 3/30* (2006.01)
*G02B 1/118* (2015.01)

(52) U.S. Cl.
CPC .......... *G02B 1/118* (2013.01); *G02B 2207/121* (2013.01); *Y10T 428/24521* (2015.01); *Y10T 428/24529* (2015.01); *Y10T 428/24545* (2015.01); *Y10T 428/24612* (2015.01)

(58) Field of Classification Search
CPC .... G02B 1/118; G02B 2207/121; G06F 3/02; G06F 3/0412; G06F 3/0414; G06F 3/041; G06F 3/0488; G06F 3/04883; G02F 1/13458; Y10T 428/24529; Y10T 428/24545; Y10T 248/24612

USPC .......... 428/1.1, 161, 162, 164, 172; 345/173, 345/174, 175; 349/12, 158, 160; 200/512; 178/18.03, 18.09; 359/585

See application file for complete search history.

(56) References Cited

U.S. PATENT DOCUMENTS

| 8,576,486 B2 * | 11/2013 | Hayashibe et al. ........... 359/581 |
| 2003/0193719 A1 * | 10/2003 | Mitsuishi et al. ............. 359/581 |
| 2005/0237897 A1 * | 10/2005 | Takaki et al. ............. 369/112.02 |
| 2010/0116332 A1 * | 5/2010 | Counil et al. ................. 136/256 |
| 2011/0235181 A1 | 9/2011 | Hayashibe et al. |

FOREIGN PATENT DOCUMENTS

| EP | 0234222 | * 9/1987 |
| FR | 2915834 A1 | * 11/2008 |
| JP | 2003136625 | 5/2003 |

(Continued)

OTHER PUBLICATIONS

Japanese Office Action issued Jan. 7, 2014 in corresponding Japanese Patent Application No. 201004621.

*Primary Examiner* — Donald J Loney
(74) *Attorney, Agent, or Firm* — K&L Gates LLP

(57) ABSTRACT

A transparent conductive element is provided and includes a conductive layer having a first surface and a second surface and a medium layer formed on at least one of the first surface and the second surface. In the transparent conductive element, at least one of the first surface and the second surface is a wave surface with a wavelength shorter than or equal to that of visible light; the ratio (Am/λm) of a mean peak-to-peak amplitude Am to a mean wavelength λm of the wave surface is 1.8 or less. The mean thickness Dm of the conductive layer is larger than the mean peak-to-peak amplitude Am of the wave surface.

18 Claims, 39 Drawing Sheets

(56) References Cited

FOREIGN PATENT DOCUMENTS

| | | |
|---|---|---|
| JP | 2003-205564 | 7/2003 |
| JP | 2004-258364 | 9/2004 |
| JP | 2011-138059 | 7/2011 |
| JP | 2011-154674 | 8/2011 |
| JP | 2011-1154338 | 8/2011 |
| WO | 2010/035855 | 4/2010 |

* cited by examiner

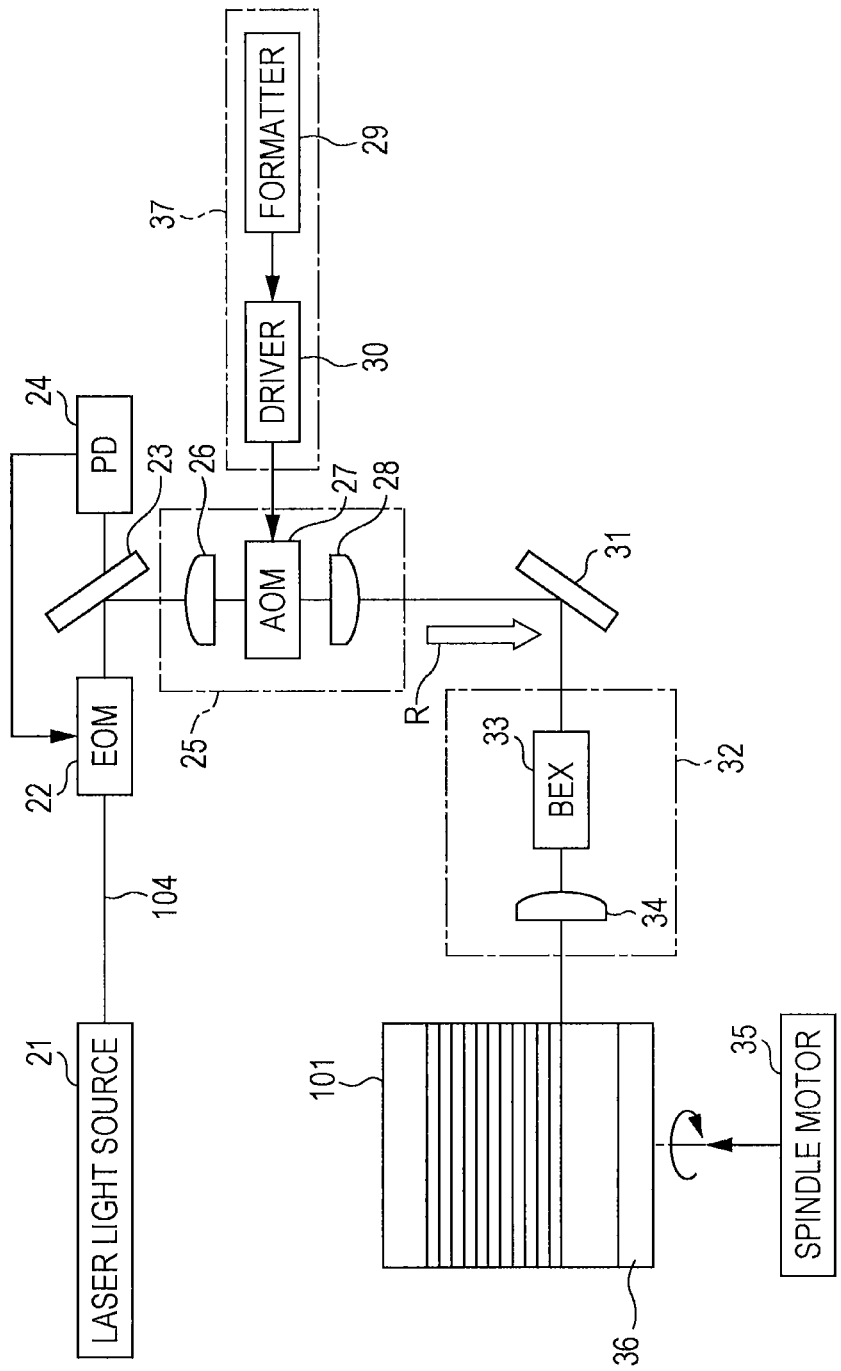

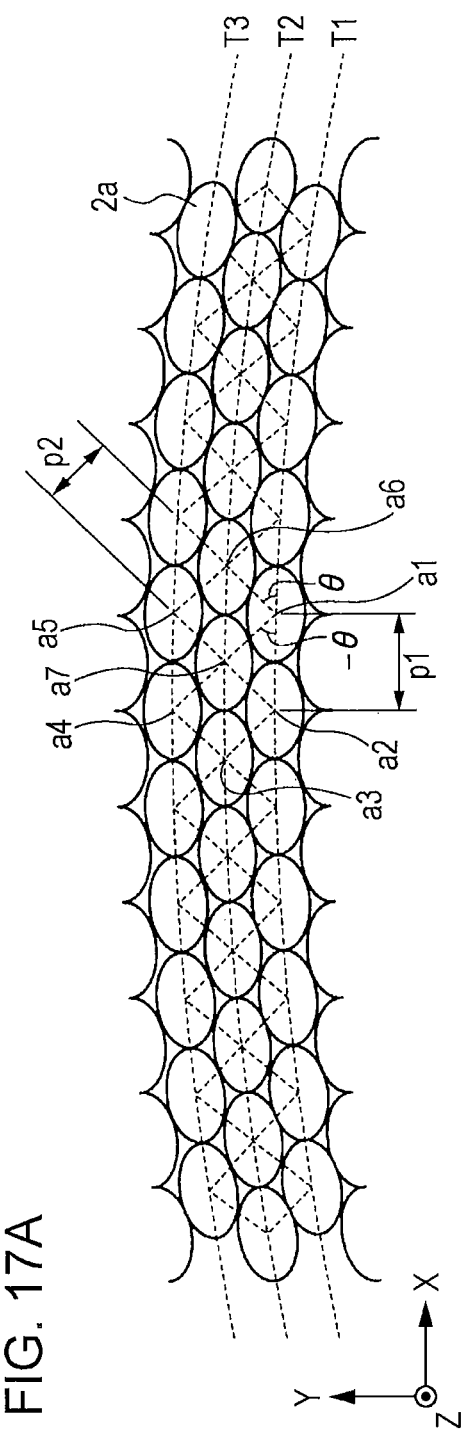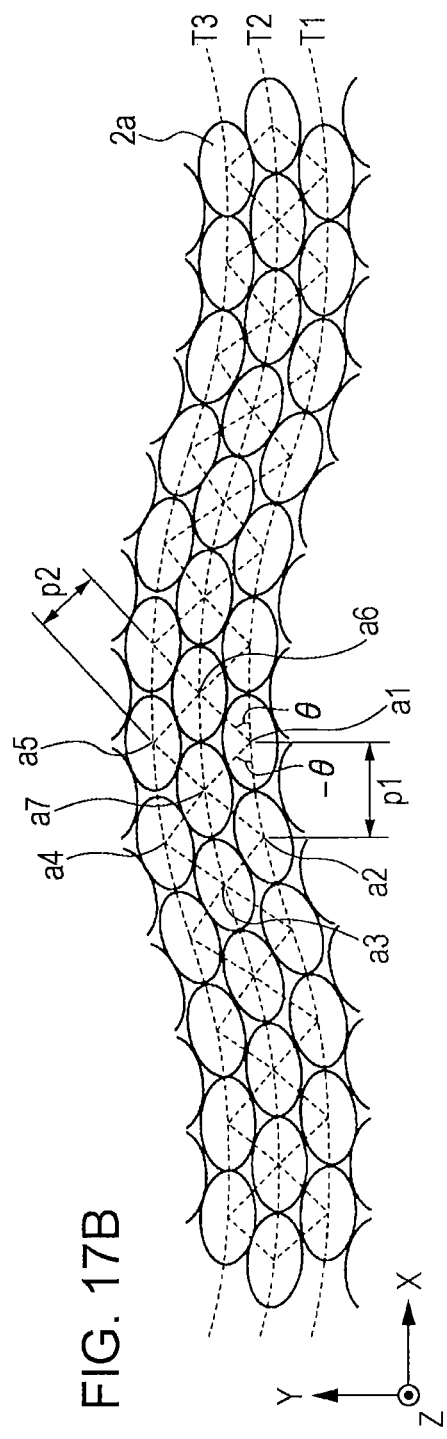

TRANSPARENT CONDUCTIVE ELEMENT, INFORMATION INPUT APPARATUS, AND DISPLAY APPARATUS

CROSS REFERENCES TO RELATED APPLICATIONS

The present application claims priority to Japanese Patent Application JP 2010-104621 filed on Apr. 28, 2010, the entire contents of which is hereby incorporated by reference.

BACKGROUND

The present disclosure relates to a transparent conductive element, an information input apparatus, and a display apparatus. Specifically, the present invention relates to a transparent conductive element having anti-reflective properties.

A transparent conductive film is used for a display device such as electronic paper and an input device such as a touch panel. A material having a high refractive index of about 2.0 (e.g., indium tin oxide (ITO)) is used as a material of the transparent conductive film utilized for these devices. Therefore, even in the case where a transparent conductive film is formed in a medium such as glass or an adhesive, the reflectance is increased depending on the thickness of the transparent conductive film, which sometimes degrades the quality of the display device and input device.

A technique that forms an anti-reflection film has been used to improve the transparency of conductive elements. For example, Japanese Unexamined Patent Application Publication No. 2003-136625 discloses a transparent conductive element for touch panels, the transparent conductive element including an anti-reflection film formed between a base and a transparent conductive film. The anti-reflection film is formed by sequentially stacking a plurality of dielectric films having different refractive indexes. In recent years, a reduction in reflection has been increasingly demanded for display devices and input devices, and the realization of anti-reflective properties without using the anti reflection film has been desired.

SUMMARY

Accordingly, it is desirable to provide a transparent conductive element having anti-reflective properties, an information input apparatus, and a display apparatus.

According to an embodiment there is provided a transparent conductive element including a conductive layer having a first surface and a second surface and a medium layer formed on at least one of the first surface and the second surface, wherein at least one of the first surface and the second surface is a wave surface with a mean wavelength $\lambda$ shorter than or equal to the wavelength of visible light, the ratio $(A/\lambda)$ of a mean peak-to-peak amplitude A to the mean wavelength $\lambda$ of the wave surface is 1.8 or less, and the mean thickness of the conductive layer is larger than the mean peak-to-peak amplitude A of the wave surface.

Herein, the medium layer is a solid layer, a liquid layer, or a gas layer. The medium layer may contain a material such as fine particles. The gas layer is preferably mainly composed of gas other than air. The medium layer is preferably formed so as to be in intimate contact with the conductive layer. In the case where medium layers are formed on both the first surface and second surface of the conductive layer, the same kind or different kinds of medium layers are selected.

In the present embodiment, the first surface and the second surface are preferably respectively a first wave surface and a second wave surface each having a wavelength shorter than or equal to that of visible light. The mean peak-to-peak amplitude of the first wave surface is preferably different from that of the second wave surface. The mean peak-to-peak amplitude of the first wave surface is preferably larger than that of the second wave surface. Preferably, the ratio $(Am1/\lambda m1)$ of a mean peak-to-peak amplitude Am1 to a mean wavelength $\lambda m1$ of the first wave surface is 1.8 or less, and the ratio $(Am2/\lambda m2)$ of a mean peak-to-peak amplitude Am2 to a mean wavelength $\lambda m2$ of the second wave surface is 1.8 or less. The surface resistance of the conductive layer is preferably 1000 $\Omega$/square or less.

In the present embodiment, the conductive layer preferably contains at least one selected from the group of conductive polymer, metal nanoparticles, and carbon nanotube. The conductive layer preferably contains a transparent oxide semiconductor. The transparent conductive element preferably further includes a metal layer formed so as to be adjacent to the conductive layer. The positions of the first wave surface and the second wave surface are preferably not in synchronization with each other. The positions of the first wave surface and the second wave surface are preferably in synchronization with each other. The medium layer preferably has a transmittance of visible light of 20% or more, the visible light having a wavelength of 400 nm or longer and 800 nm or shorter.

In the present embodiment, preferably, the medium layer has an uneven surface that forms an interface with the wave surface, the uneven surface is formed of a large number of structures arranged with a pitch smaller than or equal to the wavelength of visible light, and the mean aspect ratio of the structures is 1.8 or less. Preferably, the medium layer includes a first medium layer formed on the first surface and a second medium layer formed on the second surface; at least one of the first medium layer and the second medium layer has an uneven surface that forms an interface with the wave surface; the uneven surface is formed of a large number of structures arranged with a pitch smaller than or equal to the wavelength of visible light; and the mean aspect ratio of the structures is 1.8 or less.

In the present embodiment, at least one of the first surface and second surface of the conductive layer is a wave surface with a wavelength $\lambda$ shorter than or equal to that of visible light, and the ratio $(A/\lambda)$ of a mean peak-to-peak amplitude A to a mean wavelength $\lambda$ of the wave surface is 1.8 or less. Thus, the reflection of light at the surface of the conductive layer can be reduced.

According to the present embodiment, as described above, there can be provided a transparent conductive element having anti-reflective properties. An information input apparatus or display apparatus including the conductive element can have good display characteristics.

Additional features and advantages are described herein, and will be apparent from the following Detailed Description and the figures.

BRIEF DESCRIPTION OF THE FIGURES

FIG. 13 schematically shows an example of a roll master exposure apparatus;

FIG. 17A is a plan view showing a modification of the conductive element according to the first embodiment;

FIG. 17B is a plan view showing a modification of the conductive element according to the first embodiment;

DETAILED DESCRIPTION

Embodiments will be described in the order below with reference to the attached drawings.

1. First embodiment (the case where a two-layer transparent conductive film is formed in an optical layer: refer to FIGS. 1A to 1C)

2. Second embodiment (the case where structures are two-dimensionally arranged in a tetragonal lattice pattern: refer to FIGS. 23A to 23D)

3. Third embodiment (the case where two or more types of structures are two-dimensionally arranged: refer to FIGS. 24A and 24B)

4. Fourth embodiment (the case where structures are randomly arranged: refer to FIGS. 25A to 25C)

5. Fifth embodiment (the case where a single-layer transparent conductive film is formed in an optical layer: refer to FIGS. 26A and 26B)

6. Sixth embodiment (a first applicable example to a resistive touch panel: refer to FIG. 27)

7. Seventh embodiment (a second applicable example to a resistive touch panel: refer to FIGS. 28A to 28C)

8. Eighth embodiment (an applicable example to a display apparatus: refer to FIG. 30)

1. First Embodiment

[Structure of Touch Panel]

Figure 1A:
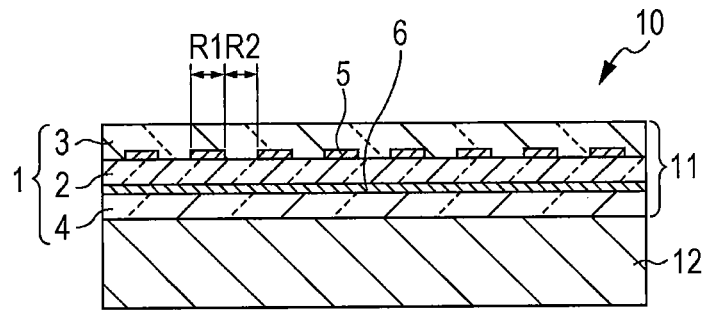
FIG. 1A is a sectional view showing an example of a structure of a touch panel according to a first embodiment.

FIG. 1A is a sectional view showing an example of a structure of a touch panel according to a first embodiment. As shown in FIG. 1A, a touch panel 10 serving as an information input apparatus is disposed on the display surface of a display apparatus 12. Examples of the display apparatus 12 to which the touch panel 10 is applicable include, but are not particularly limited to, various display apparatuses such as a liquid crystal display, a cathode ray tube (CRT) display, a plasma display panel (PDP), an electroluminescence (EL) display, and a surface-conduction electron-emitter display (SED).

The touch panel 10 is a so-called projection-type electrostatic capacitance touch panel and includes a conductive element 11. The conductive element 11 includes an optical layer 1, which includes a first transparent conductive film 5 and a second transparent conductive film 6 formed so as to have a certain distance therebetween. The first transparent conductive film 5 is, for example, an X electrode (first electrode) having a certain pattern. The second transparent conductive film 6 is, for example, a Y electrode (second electrode) having a certain pattern. The X electrode and the Y electrode are, for example, disposed so as to be perpendicular to each other. The refractive index n of the optical layer 1 is, for example, 1.2 or more and 1.7 or less.

The surface resistance of the first transparent conductive film 5 is preferably 1000 Ω/square or less and more preferably 500 Ω/square or less. When the first transparent conductive film 5 has a surface resistance within the above-described range, it can be used for an electrostatic capacitance touch panel. The surface resistance of the second transparent conductive film 6 is preferably 1000 Ω/square or less and more preferably 500 Ω/square or less. When the second transparent conductive film 6 has a surface resistance within the above-described range, it can be used for an electrostatic capacitance touch panel.

The touch panel 10 includes an electrode region R1 where the first transparent conductive film 5 or the second transparent conductive film 6 is formed and an insulating region R2 where the first transparent conductive film 5 or the second transparent conductive film 6 is not formed, the insulating region R2 providing electrical isolation between the adjacent transparent conductive films.

Figure 1B:
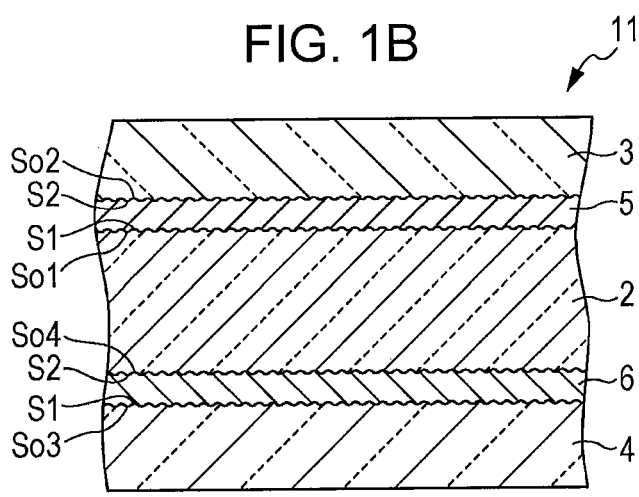
FIG. 1B is an enlarged sectional view showing an electrode region R1 shown in FIG. 1A.
Figure 1C:
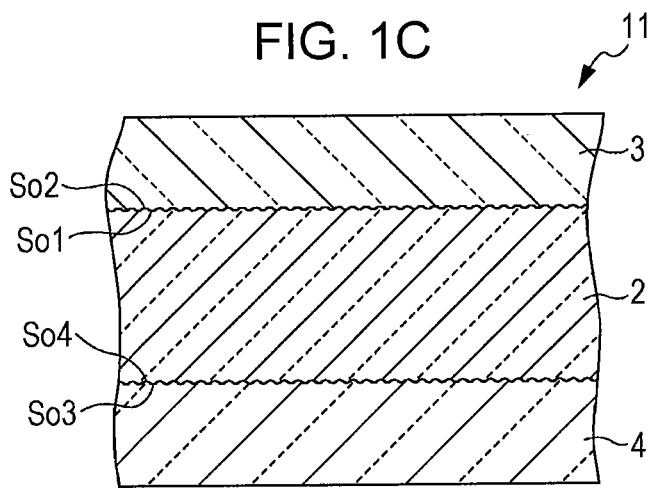
FIG. 1C is an enlarged sectional view showing an insulating region R2 shown in FIG. 1A.

FIG. 1B is an enlarged sectional view showing the electrode region R1 shown in FIG. 1A. FIG. 1C is an enlarged sectional view showing the insulating region R2 shown in FIG. 1A. The optical layer 1 includes a first optical layer 2, a second optical layer 3, and a third optical layer 4. The first transparent conductive film 5 is disposed between the first optical layer 2 and the second optical layer 3. The second transparent conductive film 6 is disposed between the first optical layer 2 and the third optical layer 4.

The optical layer 1 includes a first surface So1 and a second surface So2 that face each other and a third surface So3 and a fourth surface So4 that face each other. Specifically, the optical layer 1 includes the first optical layer 2 having the first surface So1 and the fourth surface So4, the second optical layer 3 having the second surface So2, and the third optical layer 4 having the third surface So3. The first transparent conductive film 5 is disposed between the first surface So1 and the second surface So2 so as to be in intimate contact with the first surface So1 and the second surface So2. The second transparent conductive film 6 is disposed between the third surface So3 and the fourth surface So4 so as to be in intimate contact with the third surface So3 and the fourth surface So4.

(Conductive Layer-Formed Region R1)

The first transparent conductive film 5 in the electrode region R1 has a first surface S1 and a second surface S2. The first surface S1 of the first transparent conductive film 5 is a surface that forms an interface with the first optical layer 2. The second surface S2 of the first transparent conductive film 5 is a surface that forms an interface with the second optical layer 3. At least one of the first surface S1 and the second surface S2 is a wave surface with a wavelength λ shorter than or equal to the wavelength of visible light. Preferably, both the first surface S1 and the second surface S2 are the above-described wave surfaces. This is because the interface reflection can be suppressed. The ratio (Am/λm) of the mean peak-to-peak amplitude Am to the mean wavelength λm of this wave surface is 1.8 or less. If the ratio exceeds 1.8, the transfer tends to become difficult. The mean thickness Dm of the first transparent conductive film 5 is preferably larger than the mean peak-to-peak amplitude Am of this wave surface. This increases the degree of freedom of conductive materials and thus can simplify the process.

The second transparent conductive film 6 in the electrode region R1 has a first surface S1 and a second surface S2. The first surface S1 of the second transparent conductive film 6 is a surface that forms an interface with the third optical layer 4. The second surface S2 of the second transparent conductive film 6 is a surface that forms an interface with the first optical layer 2. At least one of the first surface S1 and the second surface S2 is a wave surface with a wavelength λ shorter than or equal to the wavelength of visible light. Preferably, both the first surface S1 and the second surface S2 are the above-described wave surfaces. This is because the interface reflection can be suppressed. The ratio (Am/λm) of the mean peak-to-peak amplitude Am to the mean wavelength λm of this wave surface is 1.8 or less. If the ratio exceeds 1.8, the transfer tends to become difficult. The mean thickness Dm of the second transparent conductive film 6 is preferably larger than the mean peak-to-peak amplitude Am of this wave surface. This increases the degree of freedom of conductive materials and thus can simplify the process.

The materials, thicknesses, and the like of the first transparent conductive film 5 and the second transparent conductive film 6 can be each independently selected. The shapes, wavelengths, amplitudes, and the like of the first surface S1 and the second surface S2 of the first transparent conductive film 5 and the second transparent conductive film 6 can also be each independently selected.

At least one of the first surface So1 and the second surface So2 in the electrode region R1 is an uneven surface where a large number of structures are arranged with a pitch smaller than or equal to the wavelength of visible light. Preferably, both the first surface So1 and the second surface So2 are the above-described uneven surfaces. This is because the interface reflection can be further suppressed. The mean aspect ratio (Hm/Pm) of the structures is preferably 1.8 or less. The mean thickness Dm of the first transparent conductive film 5 is preferably larger than the mean height Hm of the structures.

At least one of the third surface So3 and the fourth surface So4 in the electrode region R1 is an uneven surface where a large number of structures are arranged with a pitch smaller than or equal to the wavelength of visible light. Preferably, both the third surface So3 and the fourth surface So4 are the above-described uneven surfaces. This is because the interface reflection can be further suppressed. The mean aspect ratio (Hm/Pm) of the structures is 1.8 or less. The mean thickness Dm of the second transparent conductive film 6 is larger than the mean height Hm of the structures.

The first surface S1 and second surface S2 of the first transparent conductive film 5 and the first surface So1 and second surface So2 of the optical layer 1 in the electrode region R1 will now be described with reference to FIGS. 2A to 3B. The first surface S1 and second surface S2 of the second transparent conductive film 6 in the electrode region R1 are the same as the first surface S1 and second surface. S2 of the first transparent conductive film 5 in the electrode region R1, and thus the description is omitted. Similarly, the third surface So3 and fourth surface So4 of the optical layer 1 in the electrode region R1 are the same as the first surface So1 and second surface So2 of the optical layer 1 in the electrode region R1, and thus the description is omitted.

First Example

Figure 2A:
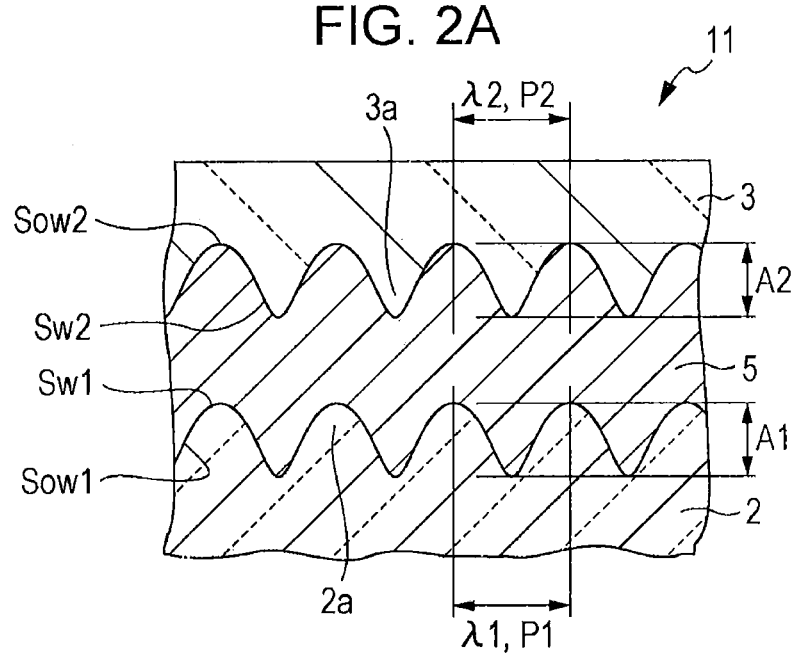
FIG. 2A is an enlarged sectional view showing a first example of an interface between an optical layer and a first transparent conductive film in the electrode region R1.

FIG. 2A is an enlarged sectional view showing a first example of the first transparent conductive film in the electrode region R1. The first transparent conductive film 5 has a first wave surface Sw1 and a second wave surface Sw2. The first wave surface Sw1 and the second wave surface Sw2, for example, are or are not in synchronization with each other. The first wave surface Sw1 is a wave surface that forms an interface with the first optical layer 2. The second wave surface Sw2 is a wave surface that forms an interface with the second optical layer 3.

The wavelength λ1 of the first wave surface Sw1 and the wavelength λ2 of the second wave surface Sw2 are shorter than or equal to the wavelength of visible light. The mean peak-to-peak amplitude Am1 of the first wave surface Sw1 and the mean peak-to-peak amplitude Am2 of the second wave surface Sw2, for example, may be the same as or different from each other.

The sectional shape obtained when the first wave surface Sw1 or the second wave surface Sw2 is cut in a single direction so that the section includes a position where the peak-to-peak amplitude is maximized is, for example, a triangular wave shape, a sinusoidal wave shape, a wave shape obtained by repeating a quadric curve or part of a quadric curve, or a shape similar to the foregoing. Examples of the quadric curve include a circle, an ellipse, and a parabola. The first wave surface Sw1 and the second wave surface Sw2 do not necessarily have the same wave shape and can have different wave shapes in accordance with demanded optical properties or the like.

The ratio (Am1/λm1) of the mean peak-to-peak amplitude Am1 to the mean wavelength λm1 of the first wave surface Sw1 in the electrode region R1 is preferably 1.8 or less. If the ratio is less than 0.1, the reflectance tends to be increased. If the ratio is more than 1.8, a desired value of the surface resistance tends to be not satisfied. The ratio (Am2/λm2) of the mean peak-to-peak amplitude Am2 to the mean wavelength λm2 of the second wave surface Sw2 is preferably 1.8 or less. If the ratio is less than 0.1, the reflectance tends to be increased. If the ratio is more than 1.8, a desired value of the surface resistance tends to be not satisfied. The mean thickness Dm of the first transparent conductive film 5 can be selected in accordance with the types of conductive materials. The physical properties, such as amplitude and wavelength, of the first wave surface Sw1 and second wave surface Sw2 are not necessarily the same as each other, and may be different from each other.

The mean wavelength λm1, mean peak-to-peak amplitude Am1, and ratio (Am1/λm1) of the first wave surface Sw1 and the mean wavelength λm2, mean peak-to-peak amplitude Am2, and ratio (Am2/λm2) of the second wave surface Sw2 are determined as follows. First, the conductive element 11 is cut in a single direction so that the section includes a position where the peak-to-peak amplitude of the first wave surface Sw1 or second wave surface Sw2 of the first transparent conductive film 5 is maximized. The section is then observed with a transmission electron microscope (TEM). From the TEM micrograph obtained, the wavelength λ1 and peak-to-peak amplitude A1 of the first wave surface Sw1 or the wavelength λ2 and peak-to-peak amplitude A2 of the second wave surface Sw2 are determined. This measurement is repeatedly performed at ten positions randomly selected from the conductive element 11. The measurement values are simply averaged (arithmetic mean) to determine the mean wavelength λm1 and mean peak-to-peak amplitude Am1 of the first wave surface Sw1 or the mean wavelength λm2 and mean peak-to-peak amplitude Am2 of the second wave surface Sw2. Subsequently, the ratio (Am1/λm1) or the ratio (Am2/λm2) is determined using the mean wavelength λm1 and the mean peak-to-peak amplitude Am1 or the mean wavelength λm2 and the mean peak-to-peak amplitude Am2.

The mean thickness means an average value of the maximum thicknesses and is specifically determined as follows. First, the conductive element 11 is cut in a single direction so that the section includes a position where the peak-to-peak amplitude of the first wave surface Sw1 or second wave surface Sw2 of the first transparent conductive film 5 is maximized. The section is then observed with a transmission electron microscope (TEM). From the TEM micrograph obtained, the thickness of the first transparent conductive film 5 at a position where the thickness is maximized is measured. This measurement is repeatedly performed at ten positions randomly selected from the first transparent conductive film 5. The measurement values are simply averaged (arithmetic mean) to determine the mean thickness.

The first optical layer 2 has a first wave surface Sow1 and the second optical layer 3 has a second wave surface Sow2. The first transparent conductive film 5 is disposed between the first wave surface Sow1 and the second wave surface Sow2. The first wave surface Sow1 is a wave surface that forms an interface with the first wave surface Sw1 of the first transparent conductive film 5. The second wave surface Sow2 is a wave surface that forms an interface with the second wave surface Sw2 of the first transparent conductive film 5. The first wave surface Sow1 is formed by two-dimensionally arranging a plurality of first structures 2a. The second wave surface Sow2 is formed by two-dimensionally arranging a plurality of second structures 3a.

The mean aspect ratio (mean height Hm1/mean arrangement pitch Pm1) of the first structures 2a in the electrode region R1 is preferably 1.8 or less. The mean aspect ratio (mean height Hm2/mean arrangement pitch Pm2) of the second structures 3a in the electrode region R1 is preferably 1.8 or less. The mean thickness of the first transparent conductive film 5 at positions corresponding to the tops of the first structures 2a is preferably 120 nm or less. If the mean thickness is more than 120 nm, the reflectance tends to be increased. When the thickness of the first transparent conductive film 5 at a position corresponding to the top of the first structure 2a is assumed to be D1, the thickness of the first transparent conductive film 5 at a position corresponding to the slope of the first structure 2a is assumed to be D2, and the thickness of the first transparent conductive film 5 at a position corresponding to the position between the first structures 2a is assumed to be D3, a relationship of D1>D3>D2 is preferably satisfied.

Herein, the mean aspect ratio (Hm1/Pm1) is determined as follows. First, the conductive element 11 is cut so that the section includes the top of the first structure 2a. The section is then observed with a transmission electron microscope (TEM). From the TEM micrograph obtained, the arrangement pitch P1 of the first structure 2a and the height or depth H1 of the first structure 2a are determined. This measurement is repeatedly performed at ten positions randomly selected from the conductive element 11. The measurement values are simply averaged (arithmetic mean) to determine the mean arrangement pitch Pm1 and the mean height Hm1. The mean aspect ratio (Hm1/Pm1) is then determined using the mean arrangement pitch Pm1 and the mean height Hm1. The mean aspect ratio (Hm2/Pm2) can be obtained in the same manner as that of the above-described mean aspect ratio (Hm1/Pm1).

The mean thickness means an average value of the maximum thicknesses and is specifically determined as follows. First, the conductive element 11 is cut so that the section includes the top of the first structure 2a. The section is then observed with a transmission electron microscope (TEM). From the TEM micrograph obtained, the thickness of the first transparent conductive film 5 at a position corresponding to the first structure 2a is measured. This measurement is repeatedly performed at ten positions randomly selected from the conductive element 11. The measurement values are simply averaged (arithmetic mean) to determine the mean thickness.

Second Example

Figure 2B:
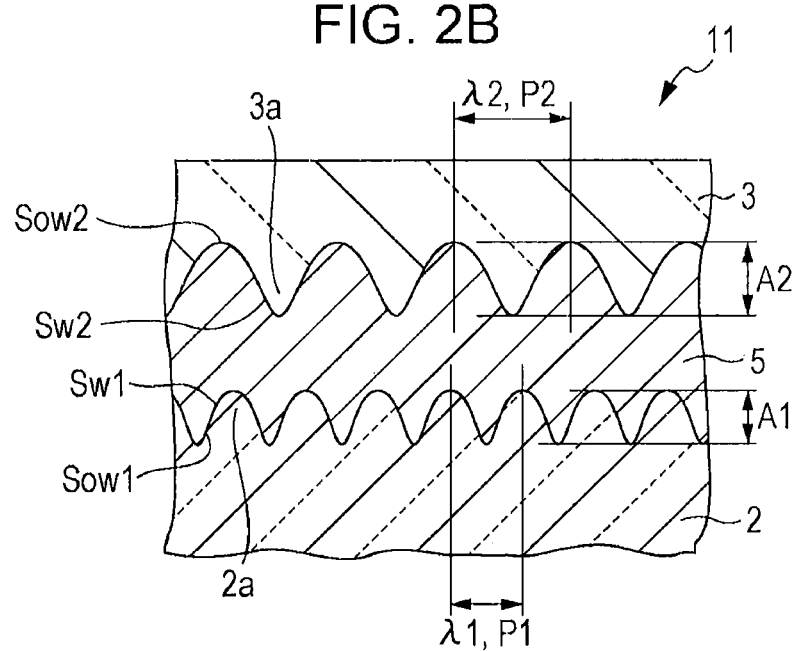
FIG. 2B is an enlarged sectional view showing a second example of an interface between the optical layer and the first transparent conductive film in the electrode region R1.

FIG. 2B is an enlarged sectional view showing a second example of the first transparent conductive film in the electrode region R1. The first transparent conductive film 5 has a first wave surface Sw1 and a second wave surface Sw2. The first wave surface Sw1 and the second wave surface Sw2 have different wavelengths λ and/or different amplitudes A. The wave shapes of the first wave surface Sw1 and the second wave surface Sw2 may be different from each other.

Third Example

Figure 3A:
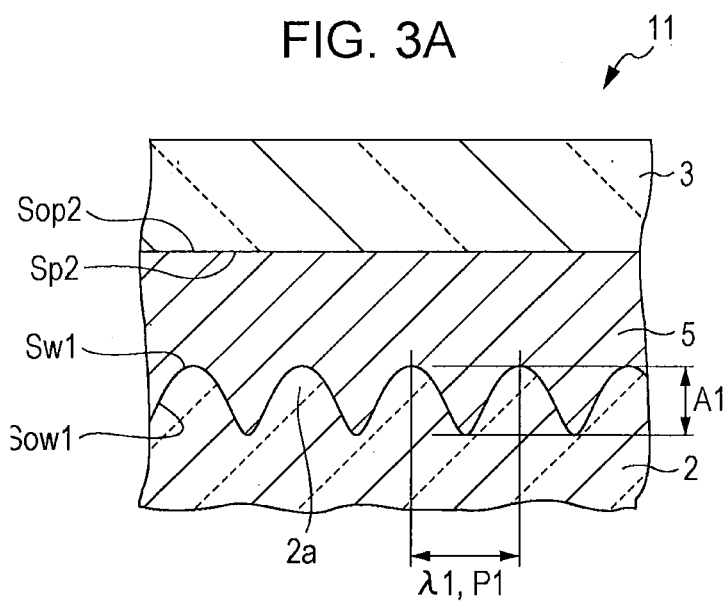
FIG. 3A is an enlarged sectional view showing a third example of an interface between the optical layer and the first transparent conductive film in the electrode region R1.

FIG. 3A is an enlarged sectional view showing a third example of the first transparent conductive film in the electrode region R1. The first transparent conductive film 5 has a wave surface Sw1 and a planar surface Sp2. The wave surface Sw1 is a surface that forms an interface with the first optical layer 2. The planar surface Sp2 is a surface that forms an interface with the second optical layer 3. In this third example, since the first transparent conductive film 5 has the wave surface Sw1, the light reflection at the interface between the first transparent conductive film 5 and the first optical layer 2 can be suppressed.

Fourth Example

Figure 3B:
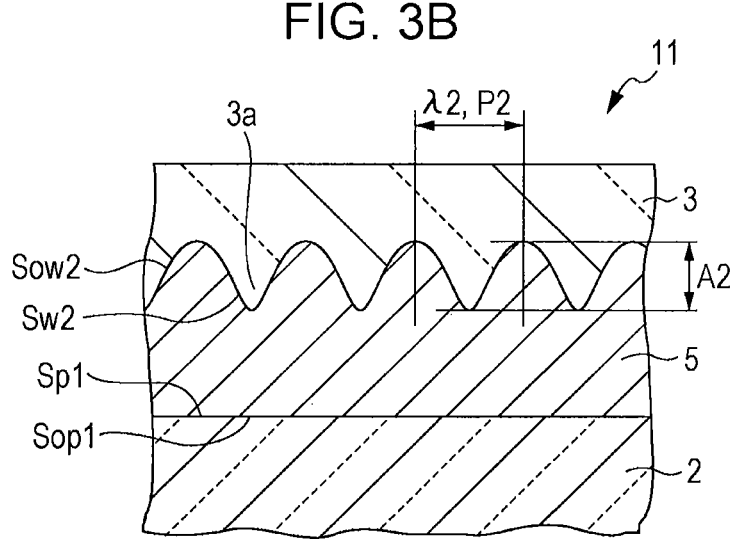
FIG. 3B is an enlarged sectional view showing a third example of an interface between the optical layer and the first transparent conductive film in the electrode region R1.

FIG. 3B is an enlarged sectional view showing a fourth example of the first transparent conductive film in the electrode region R1. The first transparent conductive film 5 has a planar surface Sp1 and a wave surface Sw2. The planar surface Sp1 is a surface that forms an interface with the first optical layer 2. The wave surface Sw2 is a surface that forms an interface with the second optical layer 3. In this fourth example, since the first transparent conductive film 5 has the wave surface Sw2, the light reflection at the interface between the second optical layer 3 and the first transparent conductive film 5 can be suppressed.

(Insulating Region R2)

The interface between the first optical layer 2 and the second optical layer 3 in the insulating region R2 has, for example, a planar surface or a wave surface, and preferably has a wave surface with a wavelength λ shorter than or equal to the wavelength of visible light. This is because, when the first optical layer 2 and the second optical layer 3 have different refractive indexes, the reflection at the interface therebetween can be suppressed. The interface specifically has the same shape as that of the first surface So1 of the first optical layer or the second surface So2 of the second optical layer.

The interface between the first optical layer 2 and the second optical layer 3 in the insulating region R2 will now be described with reference to FIGS. 4A and 4B. The interface between the first optical layer 2 and the third optical layer 4 in the insulating region R2 is the same as that between the first optical layer 2 and the second optical layer 3 in the insulating region R2, and thus the description is omitted.

First Example

Figure 4A:
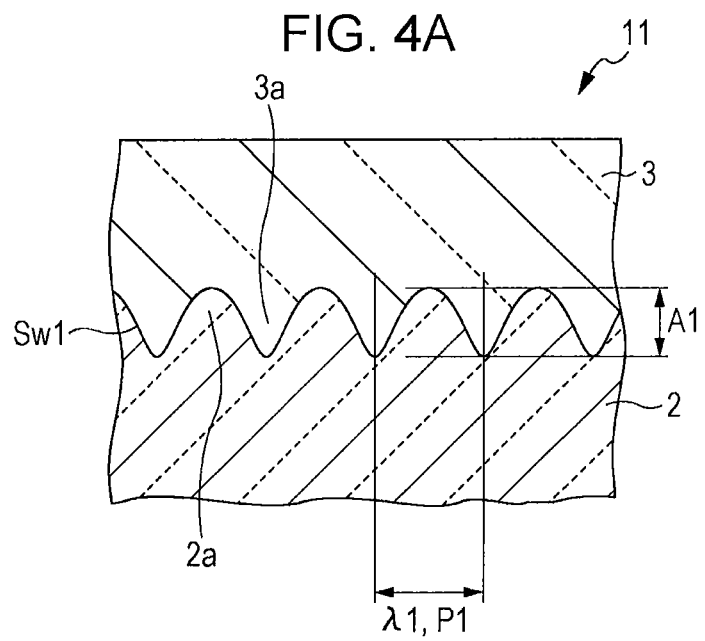
FIG. 4A is an enlarged sectional view showing a first example of the interface between the first optical layer and a second optical layer in the insulating region R2.

FIG. 4A is an enlarged sectional view showing a first example of the interface between the first optical layer and the second optical layer in the insulating region R2. The interface between the first optical layer 2 and the second optical layer 3 has the same shape as that of the first wave surface Sw1 or second wave surface Sw2 of the first transparent conductive film 5. In FIG. 4A, there is described the case where the interface between the first optical layer 2 and the second optical layer 3 has the same shape as that of the first wave surface Sw1 of the first transparent conductive film 5.

Second Example

Figure 4B:
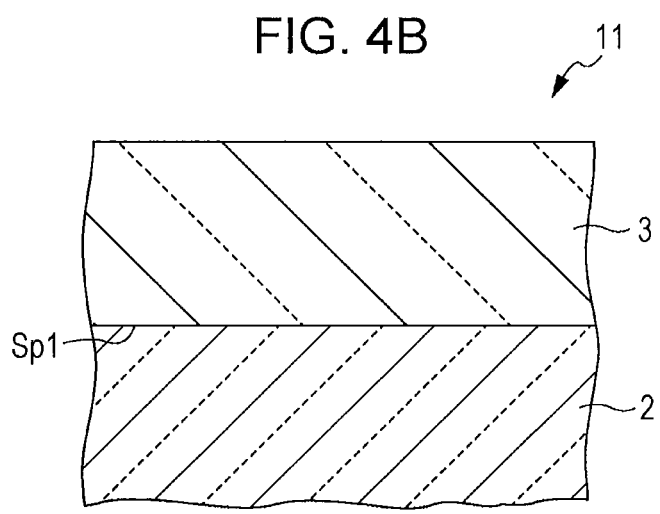
FIG. 4B is an enlarged sectional view showing a second example of the interface between the first optical layer and the second optical layer in the insulating region R2.

FIG. 4B is an enlarged sectional view showing a first example of the interface between the first optical layer and the second optical layer in the insulating region R2. The interface between the first optical layer 2 and the second optical layer 3 has the same shape as that of the planar surface Sp1 or Sp2 of the first transparent conductive film 5. In FIG. 4B, there is described the case where the interface between the first optical layer 2 and the second optical layer 3 has the same shape as that of the planar surface Sp1 of the first transparent-conductive film 5.

First Optical Layer

First Example

Figure 5A:
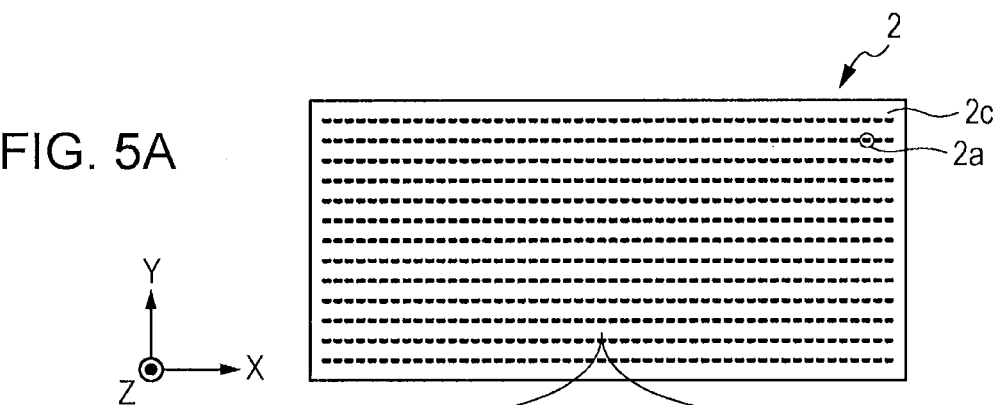
FIG. 5A is a schematic plan view showing a first example of the first optical layer in which a large number of structures, which are projections, are formed on both principal surfaces.
Figure 5B:
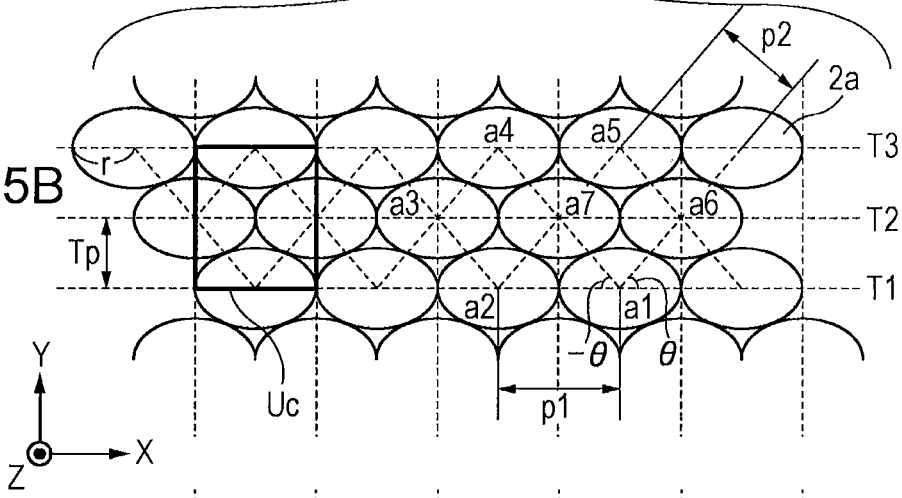
FIG. 5B is an enlarged plan view of part of the first optical layer shown in FIG. 5A.
Figure 5C:
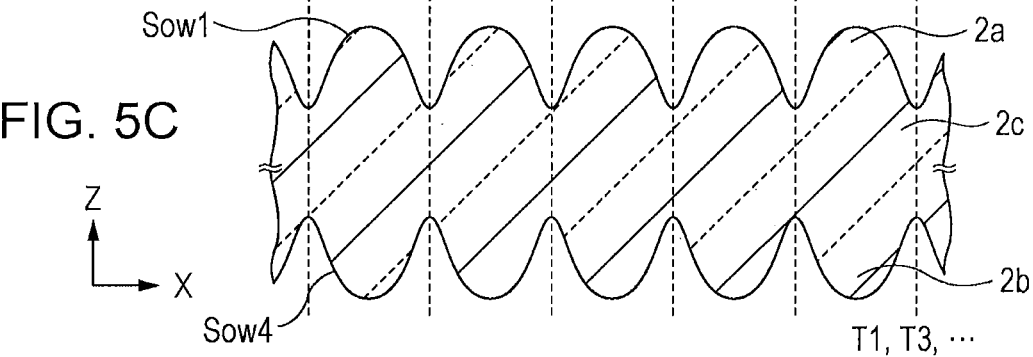
FIG. 5C is a sectional view taken along track T1, T3, . . . of FIG. 5B.
Figure 5D:
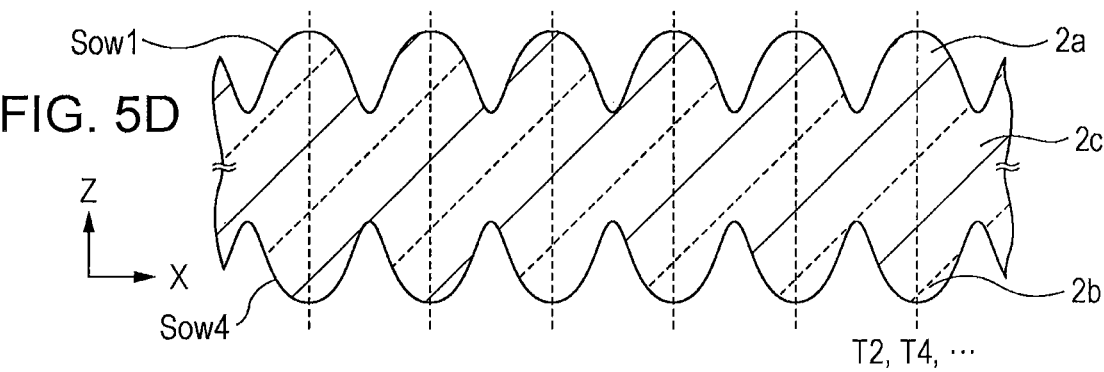
FIG. 5D is a sectional view taken along track T2, T4, . . . of FIG. 5B.
Figures 6A, 6B:
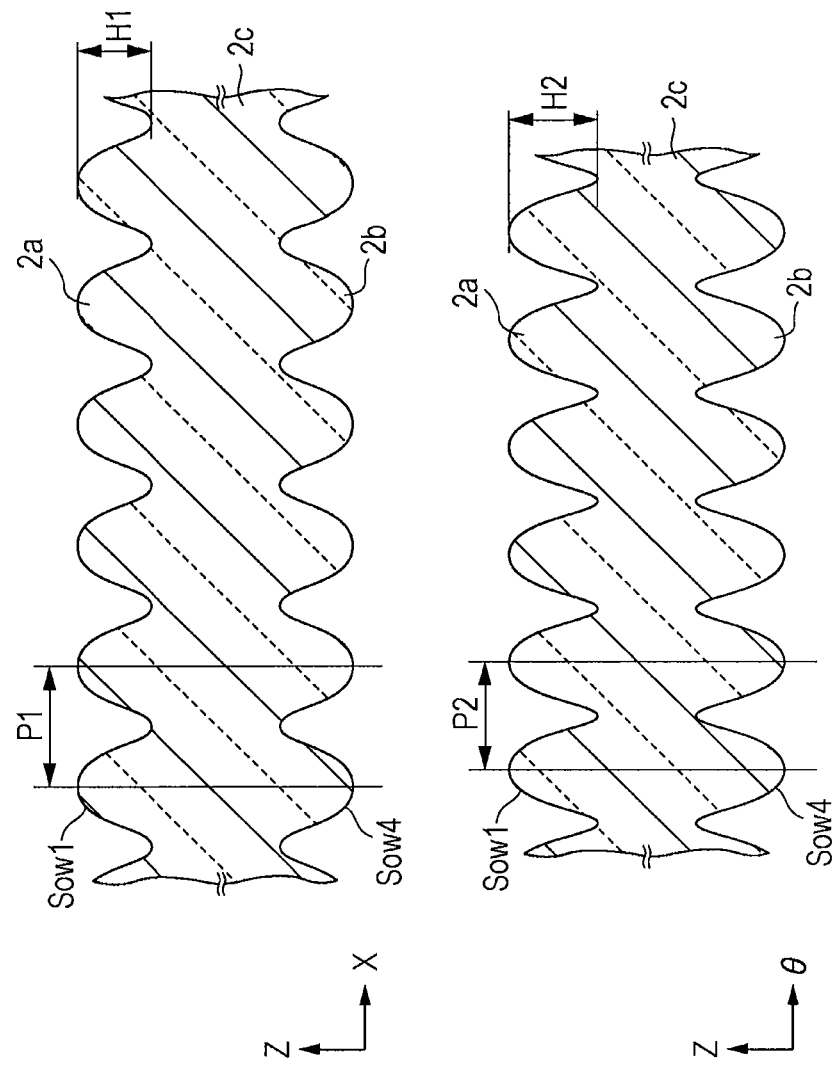
FIG. 6A is a sectional view of the first optical layer shown in FIG. 5B in a track extending direction.
FIG. 6B is a sectional view of the first optical layer shown in FIG. 5B in a θ direction.

FIG. 5A is a schematic plan view showing a first example of the first optical layer in which a large number of structures, which are projections, are formed on both principal surfaces. FIG. 5B is an enlarged plan view of part of the first optical layer shown in FIG. 5A. FIG. 5C is a sectional view taken along track T1, T3, . . . of FIG. 5B. FIG. 5D is a sectional view taken along track T2, T4, . . . of FIG. 5B. FIG. 6A is a sectional view of the first optical layer shown in FIG. 5B in a track extending direction (X direction (hereinafter, may be referred to as a track direction)). FIG. 6B is a sectional view of the first optical layer shown in FIG. 5B in a θ direction. FIGS. 7A to 8B are perspective views showing the shape examples of the structures shown in FIG. 5B.

The first optical layer 2 includes a base 2c having a first principal surface and a second principal surface, a large number of first structures 2a formed on the first principal surface, and a large number of second structures 2b formed on the second principal surface. The first structures 2a and the second structures 2b are, for example, projections.

(Base)

The base 2c is, for example, a transparent base. The material of the base 2c is, for example, a plastic material having transparency or a material mainly made of glass, but is not particularly limited thereto.

Examples of glass include soda lime glass, lead glass, hard glass, quartz glass, and liquid crystal glass (refer to "kagaku Binran (Chemical Handbook)" Kiso-hen (Basic), p. I-537, edited by the Chemical Society of Japan). In terms of optical properties such as transparency, refractive index, and dispersion, impact resistance, heat resistance, and durability, preferable examples of the plastic material include (meth)acrylic-based resins such as polymethyl methacrylate and a copolymer of methyl methacrylate and a vinyl monomer, e.g., alkyl(meth)acrylate or styrene; polycarbonate-based resins such as polycarbonate and diethylene glycol bis(ally carbonate) (CR-39); thermosetting (meth)acrylic-based resins such as a homopolymer or copolymer of (brominated)bisphenol A di(meth)acrylate and a polymer or copolymer of a urethane-modified monomer of (brominated)bisphenol A mono(meth)acrylate; polyesters such as polyethylene terephthalate, polyethylene naphthalate, and unsaturated polyester; and acrylonitrile-styrene copolymers, polyvinyl chloride, polyurethane, epoxy resin, polyarylate, polyethersulfone, polyetherketone, and cycloolefin polymers (product name: ARTON and ZEONOR). In addition, aramid-based resins can be used in consideration of heat resistance.

When the base 2c is composed of a plastic material, surface treatment may be performed by disposing an undercoat layer in order to further improve the surface energy, ease of coating, sliding property, and smoothness of the plastic surface. The undercoat layer is, for example, composed of an organoalkoxy metal compound, polyester, acrylic-modified polyester, and polyurethane. To produce the same effects achieved by disposing an undercoat layer, corona discharge or ultraviolet irradiation treatment may be performed on the surface of the base 2c.

When the base 2c is a plastic film, the base 2c can be obtained, for example, by stretching the above-described resin or by diluting the resin in a solvent, forming a film, and then drying the film. Preferably, the thickness of the base 2c is suitably selected in accordance with the applications of the conductive element 11, and is about 25 to 500 μm, for example.

The shape of the base 2c is, for example, a sheet-like shape, a plate-like shape, or a block-like shape, but is not limited thereto. Herein, it is defined that a sheet includes a film.

(Structure)

The first wave surface Sow1 is formed by arranging a large number of first structures 2a, which are projections, on the first principal surface of the base 2c. The fourth wave surface Sow4 is formed by arranging a large number of second structures 2b, which are projections, on the second principal surface of the base 2c. These first structures 2a and the second structures 2b are two-dimensionally arranged at regular intervals with a mean arrangement pitch smaller than or equal to the wavelength range of light whose reflection is to be reduced, for example, with a mean arrangement pitch substantially equal to the wavelength of visible light. Examples of the wavelength range of light whose reflection is to be reduced include wavelength ranges of ultraviolet light, visible light, and infrared light. The wavelength range of ultraviolet light is 10 nm to 360 nm, the wavelength range of visible light is 360 nm to 830 nm, and the wavelength range of infrared light is 830 nm to 1 mm. Specifically, the mean arrangement pitch of the first structures 2a is preferably 180 nm or more and 350 nm or less, more preferably 100 nm or more and 320 nm or less, and further preferably 110 nm or more and 280 nm or less. If the mean arrangement pitch is less than 180 nm, the production of the first structures 2a tends to become difficult. If the mean arrangement pitch is more than 350 nm, visible light diffraction tends to be caused.

Since the first structures 2a and the second structures 2b are the same except that the first structures 2a and the second structures 2b are formed on different surfaces of the base 2c, only the first structures 2a are described below.

The first structures 2a of the first optical layer 2 have an arrangement including multiple rows of tracks T1, T2, T3, . . . (hereinafter collectively referred to as "track T") provided on the surface of the base 2c. In the present invention, the term "track" indicates a portion where the first structures 2a are linearly arranged in rows. The term "column direction" means a direction orthogonal to the track extending direction (X direction) on the surface of the base 2c.

In the two adjacent tracks T, the first structures 2a arranged on one track are shifted by half a pitch from the first structures 2a arranged on the other track. Specifically, in the two adjacent tracks T, at the intermediate positions (at the positions shifted by half a pitch) between the first structures 2a arranged on one track (e.g., T1), the first structures 2a on the other track (e.g., T2) are disposed. Consequently, as shown in FIG. 5B, in the three adjacent rows of tracks (T1 to T3), the first structures 2a are arranged so as to form a hexagonal lattice pattern or a quasi-hexagonal lattice pattern with the centers of the first structures 2a being positioned at points a1 to a7. In this embodiment, the term "hexagonal lattice pattern" means a lattice pattern having a regular hexagonal shape. The term "quasi-hexagonal lattice pattern" means, unlike a lattice pattern having a regular hexagonal shape, a hexagonal lattice pattern that is stretched and distorted in the track extending direction (X axis direction). In addition to the quasi-hexagonal lattice pattern and the hexagonal lattice pattern, the structures may have other patterns such as a tetragonal lattice pattern and a random uneven surface.

When the first structures 2a are arranged so as to form a quasi-hexagonal lattice pattern, as shown in FIG. 5B, the arrangement pitch p1 (distance between a1 and a2) of the first structures 2a on the same track (e.g., T1) is preferably longer than the arrangement pitch of the first structures 2a between the two adjacent tracks (e.g., T1 and T2), that is, the arrangement pitch p2 (e.g., distance between a1 and a7 or a2 and a7) of the first structures 2a in the ±θ direction with respect to the track extending direction. By arranging the first structures 2a in such a manner, the packing density of the first structures 2a can be further improved.

In terms of ease of molding, the first structures 2a preferably have a conical form or a conical form stretched or shrunk in the track direction. The first structures 2a preferably have an axially symmetric conical form or a conical form stretched or shrunk in the track direction. When the adjacent first structures 2a are joined to each other, the first structures 2a preferably have an axially symmetric conical form or a conical form stretched or shrunk in the track direction, except for lower portions of the adjacent first structures 2a joined to each other. Examples of the conical form include a cone-like shape, a truncated cone-like shape, an elliptic cone-like shape, and a truncated elliptic cone-like shape. As described above, the conical form has a concept including an elliptic cone-like shape and a truncated elliptic cone-like shape in addition to a cone-like shape and a truncated cone-like shape. The truncated cone-like shape is a shape obtained by removing the top of a cone-like shape from the cone-like shape. The truncated elliptic cone-like shape is a shape obtained by removing the top of an elliptic cone-like shape from the elliptic cone-like shape.

Figure 7A:
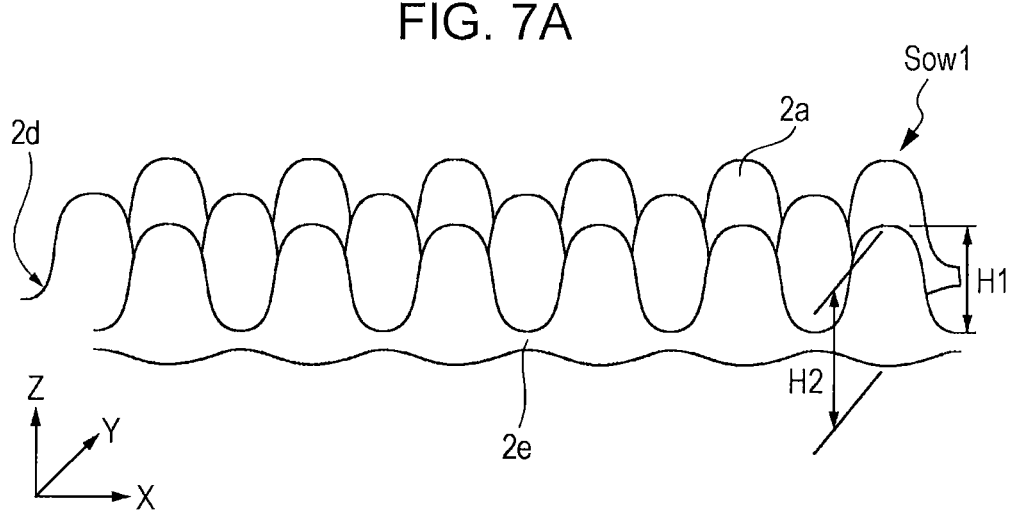
FIG. 7A is a perspective view showing a first shape example of the structures shown in FIG. 5B.
Figure 7B:
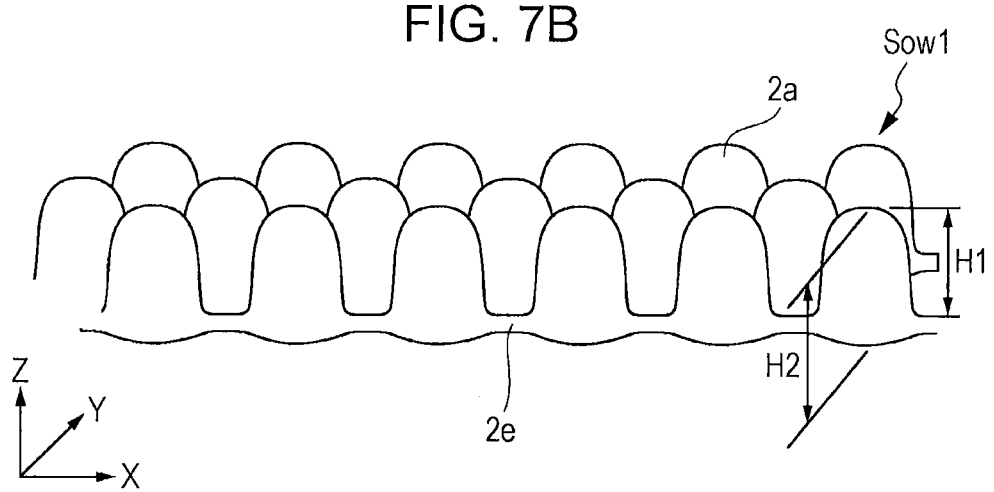
FIG. 7B is a perspective view showing a second shape example of the structures shown in FIG. 5B.
Figure 8A:
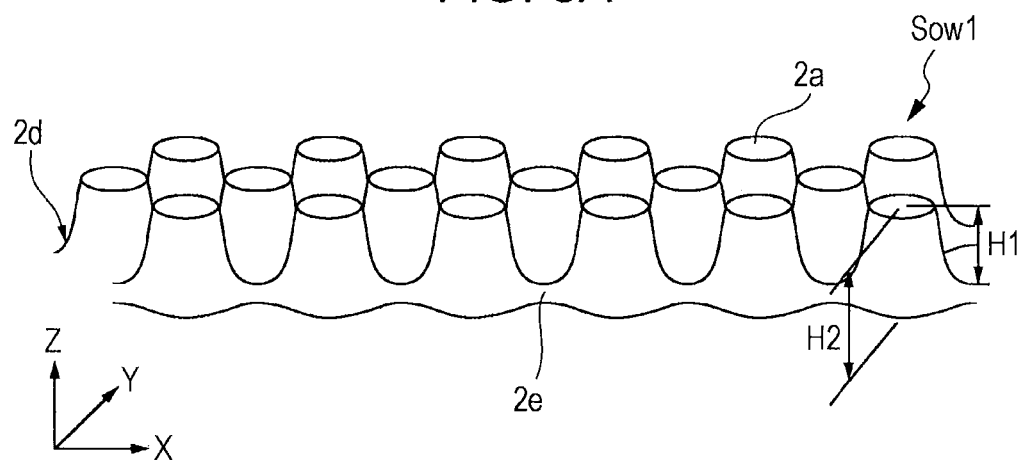
FIG. 8A is a perspective view showing a third shape example of the structures shown in FIG. 5B.

The first structures 2a preferably have a conical form with a bottom face in which the width in the track extending direction is larger than the width in the column direction that is orthogonal to the track extending direction. Specifically, as shown in FIGS. 7A and 7B, the first structures 2a preferably have an elliptic cone-like shape in which the bottom face is in the shape of an ellipse, an oblong, or an oval with a major axis and a minor axis, and the top has a curved surface. As shown in FIG. 8A, the first structures 2a preferably have a truncated elliptic cone-like shape in which the bottom face is in the shape of an ellipse, an oblong, or an oval with a major axis and a minor axis, and the top is flat. With such a shape, the packing fraction of the first structures 2a in the column direction can be improved.

To improve the reflection characteristics, a conical form (refer to FIG. 7B) having a gentle slope at the top and a gradually increasing slope at the center to the bottom is preferred. To improve the reflection and transmission characteristics, a conical form (refer to FIG. 7A) whose slope at the center is steeper than those at the bottom and top or a conical form (refer to FIG. 8A) whose top is flat is preferred. When the first structures 2a have an elliptic cone-like shape or a truncated elliptic cone-like shape, the major axis direction of the bottom face is preferably parallel to the track extending direction. In FIGS. 7A to 8B, the first structures 2a each have the same structure, but the shape of the first structures 2a is not limited thereto. First structures 2a having two or more types of shapes may be formed on the surface of the base. The first structures 2a may be formed integrally with the base 2c.

Figure 8B:
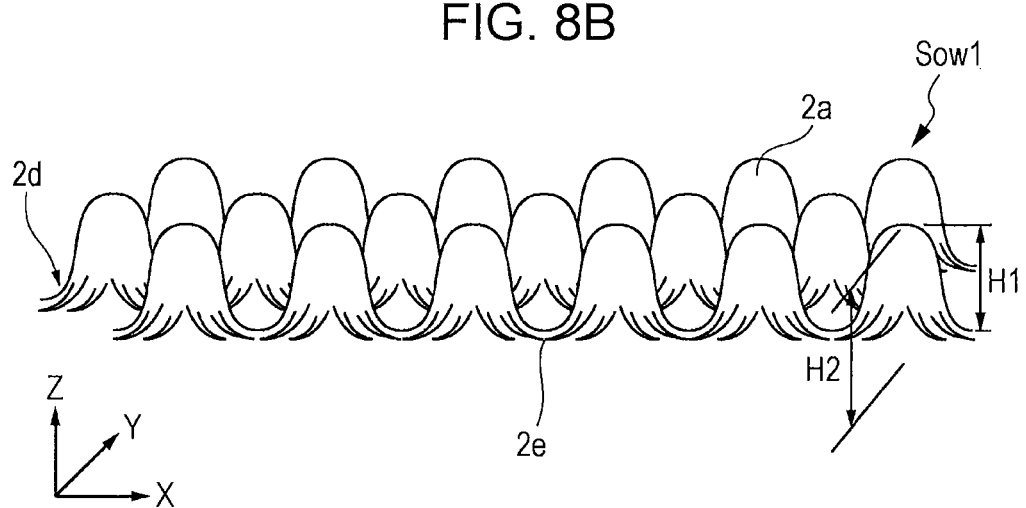
FIG. 8B is a perspective view showing a fourth shape example of the structures shown in FIG. 5B.

As shown in FIGS. 7A to 8B, a protruding portion 2e is preferably formed in a part of or the entirety of the periphery of each of the first structures 2a. This can decrease the reflectance even when the packing fraction of the first structures 2a is low. Specifically, as shown in FIGS. 7A to 8B, the protruding portion 2e is formed between the adjacent first structures 2a. Furthermore, as shown in FIG. 8B, an elongated protruding portion 2e may be formed in a part of or the entirety of the periphery of each of the first structures 2a. The elongated protruding portion 2e, for example, extends in the direction from the top to the lower portion of the first structures 2a. The shape of the protruding portion 2e is, for example, a triangle or a quadrilateral when viewed in section, but is not limited thereto. The shape can be selected in consideration of ease of molding. By roughening a part of or the entirety of the surface around each of the first structures 2a, minute projections and depressions may be formed. Specifically, by roughening the surface between the adjacent first structures 2a, minute projections and depressions may be formed. Minute pores may be formed in the surface of each of the first structures 2a, for example, in the top thereof.

The height H1 of the first structures 2a in the track extending direction is preferably smaller than the height H2 of the first structures 2a in the column direction. That is, the heights H1 and H2 of the first structures 2a preferably satisfy a relationship of H1<H2. If the first structures 2a are arranged so that a relationship of H1≥H2 is satisfied, the arrangement pitch P1 in the track extending direction has to be increased. Therefore, the packing fraction of the first structures 2a in the track extending direction is decreased. Such a decrease in the packing fraction degrades the reflection characteristics.

The aspect ratios of all first structures 2a are not necessarily the same, and the first structures 2a may be arranged so as to have a certain height distribution. By disposing the first structures 2a having a height distribution, the wavelength dependence of the reflection characteristics can be suppressed. Thus, a conductive element 11 having good anti-reflection characteristics can be obtained.

The term "height distribution" means that the first structures 2a having two or more different heights (depths) are disposed on the surface of the base 2c. That is, it means that first structures 2a having a reference height and first structures 2a having a height different from the reference height are disposed on the surface of the base 2c. The first structures 2a having a height different from the reference height are disposed, for example, on the surface of the base 2c periodically or aperiodically (at random). For example, the track extending direction and the column direction may be exemplified as the direction of the periodicity.

A hem 2d is preferably disposed in the peripheral portion of the first structures 2a. This is because, in the production process of conductive elements, the first structures 2a can be easily detached from a mold or the like. Herein, the hem 2d is a protruding portion formed in the peripheral portion of the bottom of the first structures 2a. In terms of detachment characteristics, the hem 2d preferably has a curved surface whose height is gradually decreased in the direction from the top to the lower portion of the first structures 2a. The hem 2d may be disposed only in a part of the peripheral portion of the first structures 2a, but is preferably disposed in the entire peripheral portion of the first structures 2a to improve the detachment characteristics. When the first structures 2a are depressions, the hem has a curved surface formed in the periphery of the openings of the depressions.

When the first structures 2a are arranged so as to form a hexagonal lattice pattern or a quasi-hexagonal lattice pattern, the height H of the first structures 2a is assumed to be the height of the first structures 2a in the column direction. The height of the first structures 2a in the track extending direction (X direction) is smaller than that in the column direction (Y direction). In addition, since the height of portions other than the portions of the first structures 2a in the track extending direction is substantially equal to that in the column direction, the height of sub-wavelength structures is represented by the height in the column direction.

When the arrangement pitch of the first structures 2a on the same track is assumed to be p1 and the arrangement pitch of the first structures 2a between the two adjacent tracks is assumed to be p2, the ratio p1/p2 satisfies a relationship of preferably $1.00 \leq p1/p2 \leq 1.2$ or $1.00 < p1/p2 \leq 1.2$ and more preferably $1.00 \leq p1/p2 \leq 1.1$ or $1.00 < p1/p2 \leq 1.1$. By setting the ratio p1/p2 within the range, the packing fraction of the first structures 2a having an elliptic cone-like shape or a truncated elliptic cone-like shape can be increased and thus the anti-reflection characteristics can be improved.

The packing fraction (maximum 100%) of the first structures 2a on the surface of the base is 65% or more, preferably 73% or more, and more preferably 86% or more. By setting the packing fraction within the range, the anti-reflection characteristics can be improved. To improve the packing fraction, the adjacent first structures 2a are preferably jointed to each other in the lower portions thereof or the first structures 2a are preferably distorted by adjusting the ellipticity of the bottom faces of the structures.

Figure 9A:
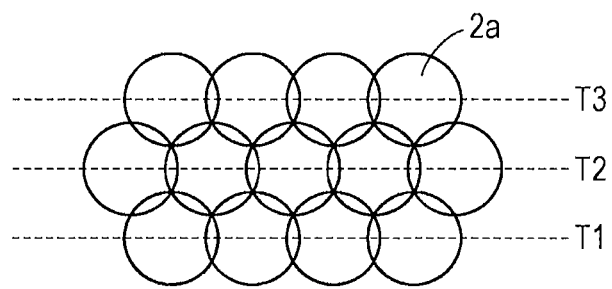
FIG. 9A shows an arrangement example of the structures having a cone-like shape or a truncated cone-like shape.
Figure 9B:
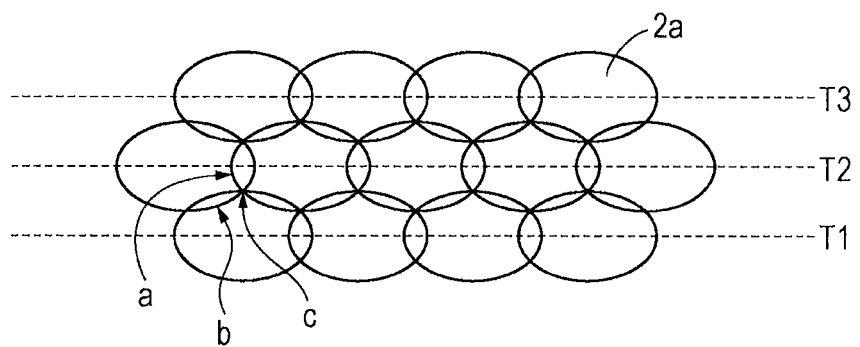
FIG. 9B shows an arrangement example of the structures having an elliptic cone-like shape or a truncated elliptic cone-like shape.

FIG. 9A shows an arrangement example of the first structures 2a having a cone-like shape or a truncated cone-like shape. FIG. 9B shows an arrangement example of the first structures 2a having an elliptic cone-like shape or a truncated elliptic cone-like shape. As shown in FIGS. 9A and 9B, the first structures 2a are preferably joined to each other so that the lower portions thereof overlap one another. Specifically, the lower portion of a first structure 2a is preferably joined to a part of or the entirety of the lower portion of the adjacent first structure 2a. More specifically, the lower portions of the first structures 2a are preferably joined to each other in the track direction, in the θ direction, or in both the directions. FIGS. 9A and 9B show the case where the entire lower portions of the adjacent first structures 2a are joined to one another. By joining the first structures 2a to one another in such a manner, the packing fraction of the first structures 2a can be improved. The first structures are preferably joined to one another at portions each having a size smaller than or equal to ¼ the maximum wavelength of light in a use environment on the basis of an optical path length adopted in consideration of a refractive index. This can provide good anti-reflection characteristics.

As shown in FIG. 9B, a first joint a is formed by causing the lower portions of the adjacent first structures 2a on the same track to overlap one another while at the same time a second joint b is formed by causing the lower portions of the adjacent first structures 2a between the adjacent tracks to overlap one another. An intersection portion c is formed at the intersection point between the first joint a and the second joint b. The level of the intersection portion c is, for example, lower than those of the first joint a and second joint b. When the lower portions of the first structures 2a having an elliptic cone-like shape or a truncated elliptic cone-like shape are joined to each other, for example, the heights of the joint a, the joint b, and the intersection portion c are decreased in that order.

The ratio ((2r/p1)×100) of size 2r to arrangement pitch p1 is 85% or more, preferably 90% or more, and more preferably 95% or more. By setting the ratio within the range, the packing fraction of the first structures 2a is improved and the anti-reflection characteristics can be improved. If the ratio ((2r/p1)×100) is increased and thus the first structures 2a are caused to excessively overlap one another, the anti-reflection characteristics tend to be degraded. Therefore, the upper limit of the ratio ((2r/p1)×100) is preferably set so that the structures are joined to one another at portions each having a size smaller than or equal to ¼ the maximum wavelength of light in a use environment on the basis of an optical path length adopted in consideration of a refractive index. Herein, the arrangement pitch p1 is an arrangement pitch of the first structures 2a in the track direction and the size 2r is a size of the bottom face of each of the first structures 2a in the track direction. In the case where the bottom faces of the first structures have a circular shape, the size 2r is a diameter. In the case where the bottom faces of the first structures have an elliptic shape, the size 2r is a major axis.

Second Example

Figure 10A:
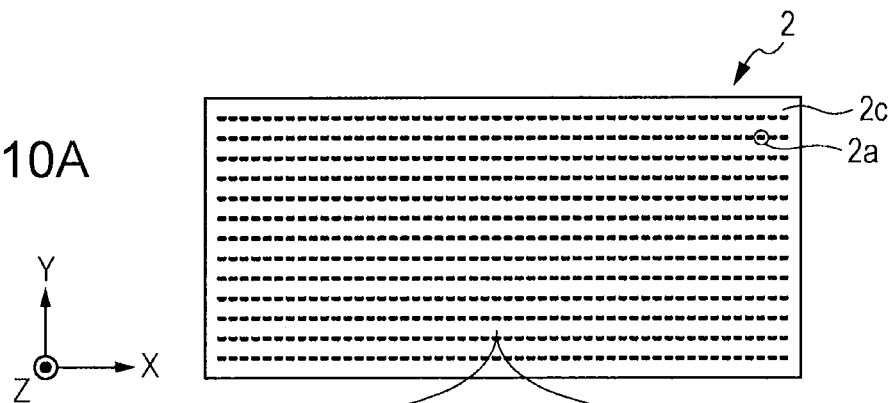
FIG. 10A is a schematic plan view showing a second example of the first optical layer in which a large number of structures, which are depressions, are formed on both principal surfaces.
Figure 10B:
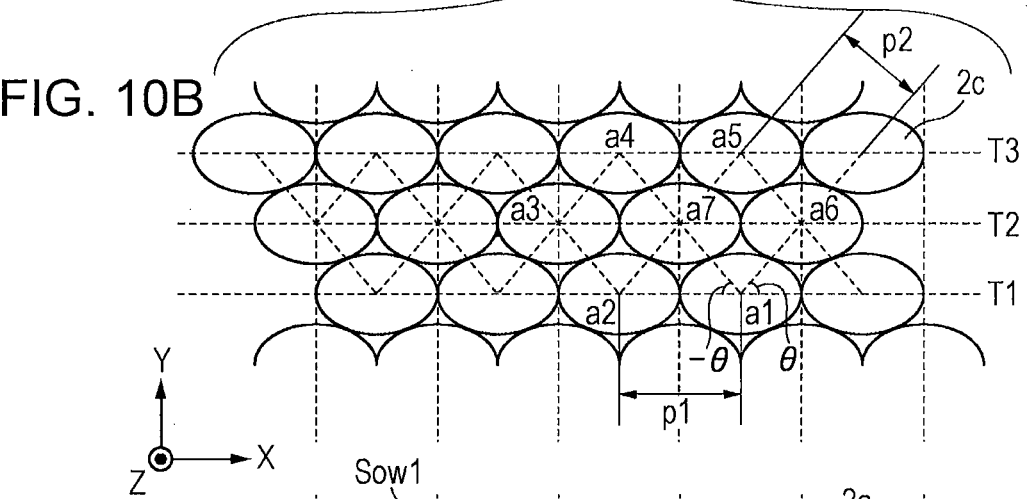
FIG. 10B is an enlarged plan view of part of the first optical layer shown in FIG. 10A.
Figure 10C:
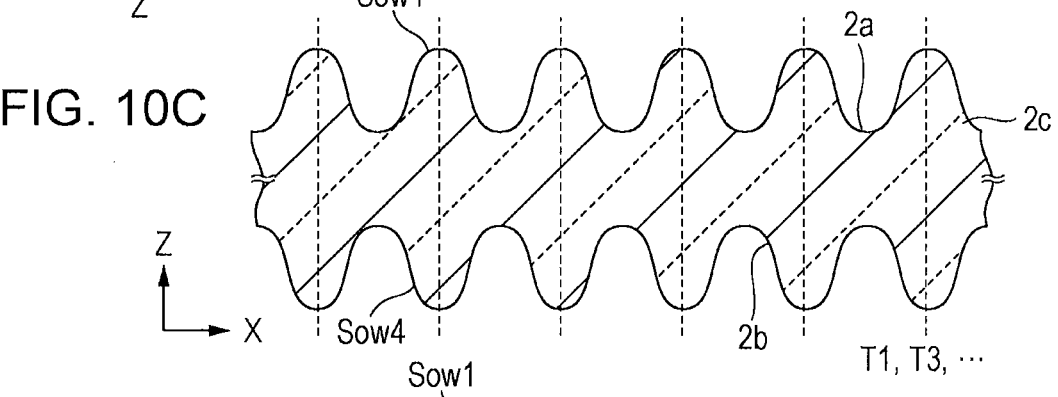
FIG. 10C is a sectional view taken along track T1, T3, . . . of FIG. 10B.
Figure 10D:
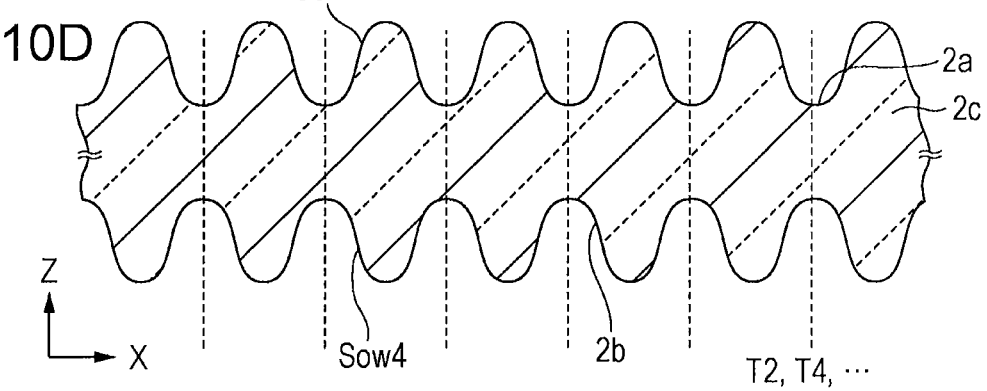
FIG. 10D is a sectional view taken along track T2, T4, . . . of FIG. 10B.
Figure 11:
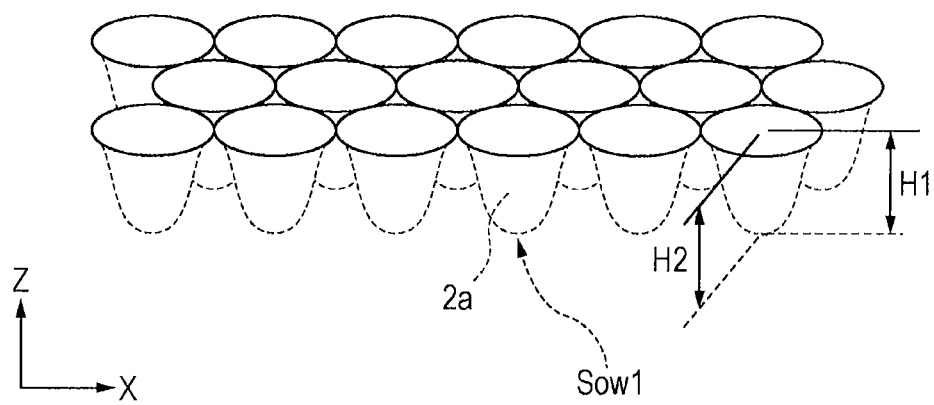
FIG. 11 is an enlarged perspective view of part of the first optical layer shown in FIG. 10B.

FIG. 10A is a schematic plan view showing a second example of the first optical layer in which a large number of structures, which are depressions, are formed on both principal surfaces. FIG. 10B is an enlarged plan view of part of the first optical layer shown in FIG. 10A. FIG. 10C is a sectional view taken along track T1, T3, . . . of FIG. 10B. FIG. 10D is a sectional view taken along track T2, T4, . . . of FIG. 10B. FIG. 11 is an enlarged perspective view of part of the first optical layer shown in FIG. 10B.

The second example is different from the first example in that first structures 2a and second structures 2b are depressions. When the first structures 2a and the second structures 2b are depressions, the openings (the entrance portions of the depressions) of the first structures 2a and the second structures 2b that are depressions are defined as lower portions and the lowest portions (the deepest portions of the depressions) of the base 2c in the depth direction are defined as the tops. In other words, the tops and the lower portions are defined using the first structures 2a and second structures 2b that are insubstantial spaces.

(Transparent Conductive Film)

The first transparent conductive film 5 and the second transparent conductive film 6 are, for example, organic or inorganic transparent conductive films. An organic transparent conductive film may be used as one of the first transparent conductive film 5 and the second transparent conductive film 6, and an inorganic transparent conductive film may be used as the other. The organic transparent conductive film is preferably mainly composed of a conductive polymer or a carbon nanotube. Examples of the conductive polymer include polythiophene-based, polyaniline-based, and polypyrrole-based conductive polymers, and a polythiophene-based conductive polymer is preferably used. A polyethylenedioxythiophene (PEDOT)/polystyrene sulfonate (PSS)-based material obtained by doping PEDOT with PSS is preferably used as the polythiophene-based conductive polymer.

The inorganic transparent conductive film is preferably mainly composed of a transparent oxide semiconductor. Examples of the transparent oxide semiconductor include binary compounds such as $SnO_2$, $InO_2$, ZnO, and CdO; ternary compounds including at least one element selected from Sn, In, Zn, and Cd, which are constituent elements of the binary compounds; and multicomponent (composite) oxides. Specific examples of the transparent oxide semiconductor include indium tin oxide (ITO), zinc oxide (ZnO), aluminum-doped zinc oxide (AZO ($Al_2O_3$, ZnO)), SZO, fluorine-doped tin oxide (FTO), tin oxide ($SnO_2$), gallium-doped zinc oxide (GZO), and indium zinc oxide (IZO ($In_2O_3$, ZnO)). In terms of high reliability and low resistivity, indium tin oxide (ITO) is particularly preferred. To improve the conductivity, a material that constitutes the inorganic transparent conductive film preferably has amorphous and polycrystalline states in a mixed manner.

In terms of productivity, the first transparent conductive film 5 and the second transparent conductive film 6 are preferably mainly composed of at least one material selected from the group of conductive polymer, metal nanoparticles, and carbon nanotube. By using these materials as main components, conductive films can be easily formed by wet coating without using expensive vacuum equipment or the like.

The mean thickness Dm of the first transparent conductive film 5 is preferably a thickness smaller than or equal to the thickness that achieves a transmittance of 20% or more. The mean thickness Dm of the second transparent conductive film 6 is preferably a thickness smaller than or equal to the thickness that achieves a transmittance of 20% or more. In this specification, as described above, the mean thickness Dm of the first transparent conductive film 5 is a mean thickness of the first transparent conductive film 5 at positions corresponding to the tops of the first structures 2a. The mean thickness Dm of the second transparent conductive film 6 is a mean thickness of the second transparent conductive film 6 at positions corresponding to the tops of the second structures 2b.

[Structure of Roll Master]

Figure 12A:
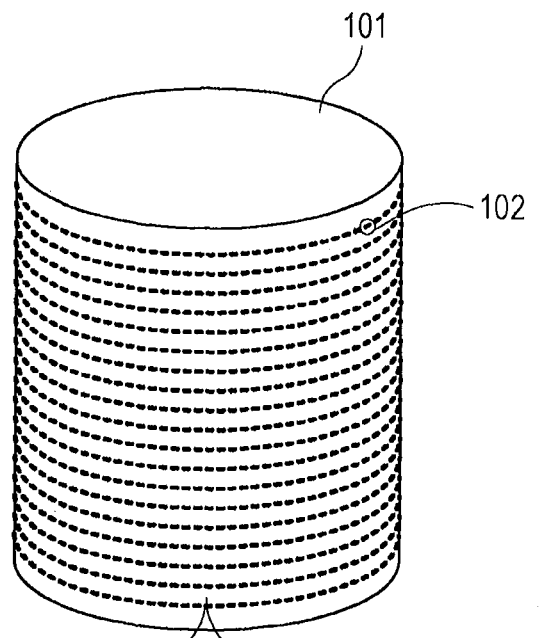
FIG. 12A is a perspective view showing an example of a roll master used for producing the first optical layer.
Figure 12B:
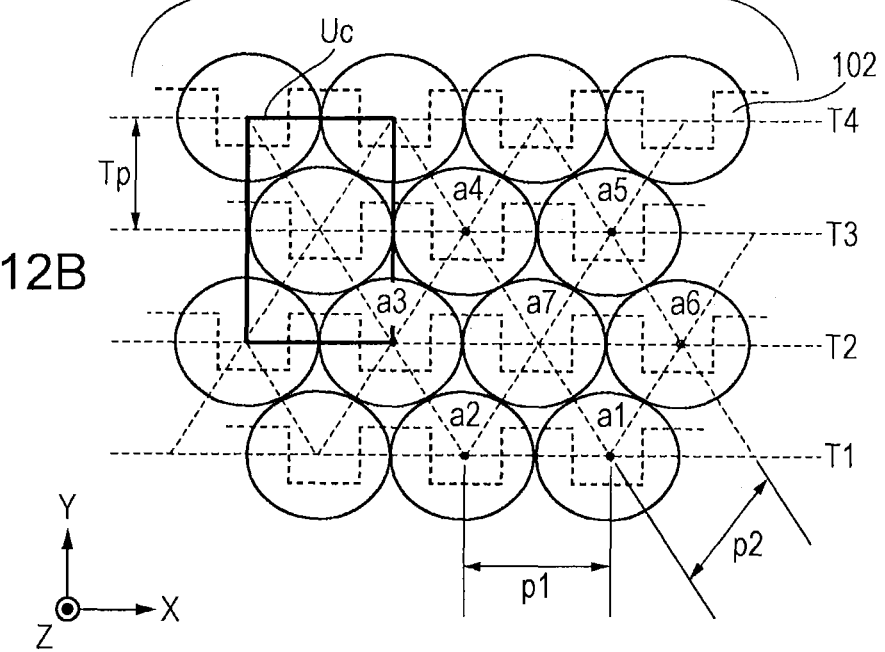
FIG. 12B is an enlarged plan view of part of the roll master shown in FIG. 12A.

FIG. 12A shows an example of a roll master for producing the above-described first optical layer. FIG. 12B is an enlarged plan view of part of the roll master shown in FIG. 12A. A roll master 101 includes a large number of structures 102 that are depressions and are arranged on the surface of a roll with a pitch smaller than or equal to the wavelength of light such as visible light. The roll master 101 has a columnar or cylindrical shape. The material of the roll master 101 is, for example, glass, but is not particularly limited thereto. With a roll master exposure apparatus described below, a polarity inversion formatter signal is synchronized to a rotation controller of a recording apparatus to generate a signal for each track so that two-dimensional patterns are spatially linked to one another, and patterning is performed at constant angular velocity (CAV) at an appropriate feed pitch. Thus, a hexagonal or quasi-hexagonal lattice pattern can be recorded. By appropriately setting the frequency of the polarity inversion formatter signal and the number of revolutions of the roll, a lattice pattern having a uniform spatial frequency is formed in a desired recording region.

[Configuration of Exposure Apparatus]

FIG. 13 schematically shows an example of a configuration of a roll master exposure apparatus for making a roll master. This roll master exposure apparatus is based on an optical disc recording apparatus.

A laser light source 21 is a light source for exposing a resist formed on the surface of the roll master 101 serving as a recording medium, and oscillates, for example, laser beams 104 for recording with a wavelength λ of 266 nm. The laser beams 104 emitted from the laser light source 21 travel in a straight line as collimated beams and enter an electro optical modulator (EOM) 22. The laser beams 104 transmitted through the electro optical modulator 22 are reflected by a mirror 23 and guided to an optical modulation system 25.

The mirror 23 includes a polarization beam splitter and has a function of reflecting one polarized component and transmitting the other polarized component. The polarized component transmitted through the mirror 23 is received by a photodiode 24, and the electro optical modulator 22 is controlled in accordance with the signal of the received polarized component to perform phase modulation of the laser beams 104.

In the optical modulation system 25, the laser beams 104 are focused by a collective lens 26 on an acousto-optic modulator (AOM) 27 composed of glass ($SiO_2$) or the like. After the laser beams 104 are intensity-modulated by the acousto-optic modulator 27 and diverged, the laser beams 104 are collimated by a lens 28. The laser beams 104 emitted from the optical modulation system 25 are reflected by a mirror 31 and guided onto a moving optical table 32 in a horizontal and parallel manner.

The moving optical table 32 includes a beam expander 33 and an objective lens 34. The laser beams 104 guided to the moving optical table 32 are shaped into a desired beam form by the beam expander 33, and then applied to the resist layer on the roll master 101 through the objective lens 34. The roll master 101 is placed on a turntable 36 connected to a spindle motor 35. Subsequently, the exposure step of the resist layer is performed by intermittently irradiating the resist layer with the laser beams 104 while the roll master 101 is rotated and the laser beams 104 are moved in the height direction of the roll master 101. The resulting latent images have, for example, a substantially elliptic shape having a major axis in the circumferential direction. The laser beams 104 are moved by moving the moving optical table 32 in the direction indicated by arrow R.

The exposure apparatus includes a control mechanism 37 for forming, on the resist layer, latent images corresponding to the two-dimensional pattern of the hexagonal lattice or quasi-hexagonal lattice shown in FIG. 12B. The control mechanism 37 includes a formatter 29 and a driver 30. The formatter 29 includes a polarity inversion unit, and the polarity inversion unit controls the timing when the resist layer is irradiated with the laser beams 104. The driver 30 controls the acousto-optical modulator 27 in response to the output from the polarity inversion unit.

In the roll master exposure apparatus, a polarity inversion formatter signal is synchronized to a rotation controller of a recording apparatus to generate a signal for each track so that two-dimensional patterns are spatially linked to one another, and intensity modulation is performed by the acousto-optical modulator 27. By performing patterning at constant angular velocity (CAV) and at an appropriate number of revolutions, an appropriate modulation frequency, and an appropriate feed pitch, a hexagonal or quasi-hexagonal lattice pattern can be recorded. For example, the feed pitch is set to be 251 nm to achieve a period of 315 nm in the circumferential direction and a period of 300 nm in a direction of about 60 degrees (a direction of about −60 degrees) from the circumferential direction (Pythagoras' law). The frequency of the polarity inversion formatter signal is changed using the number of revolutions of the roll (e.g., 1800 rpm, 900 rpm, 450 rpm, and 225 rpm). For example, the numbers of revolution of the roll 1800 rpm, 900 rpm, 450 rpm, and 225 rpm correspond to the frequencies of the polarity inversion formatter signal 37.70 MHz, 18.85 MHz, 9.34 MHz, and 4.71 MHz, respectively. A quasi-hexagonal lattice pattern having a uniform spatial frequency (period in the circumferential direction: 315 nm and period in a direction of about 60 degrees (a direction of about −60 degrees) from the circumferential direction: 300 nm) and formed in a desired recording region is obtained by expanding far-ultraviolet laser beams using the beam expander (BEX) 33 on the moving optical table 32 so that the far-ultraviolet laser beams come to have a beam diameter five times larger than the original beam diameter, by irradiating the resist layer on the roll master 101 with the laser beams through the objective lens 34 with a numerical aperture (NA) of 0.9, and by forming fine latent images.

[Method for Producing Conductive Element]

A method for producing the above-described conductive element 11 will now be described with reference to FIGS. 14A to 16D.

(Resist Layer Formation Step)

Figure 14A:
FIGS. 14A to 14E are process diagrams for describing an example of a method for producing the conductive element according to the first embodiment of the present invention.
Figure 14B:
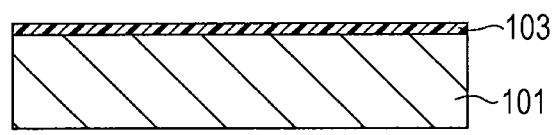

First, as shown in FIG. 14A, a column-shaped roll master 101 is prepared. The roll master 101 is, for example, a glass master. As shown in FIG. 14B, a resist layer 103 is formed on the surface of the roll master 101. The resist layer 103 may be composed of, for example, either an organic resist or an inorganic resist. Examples of the organic resist include novolac resists and chemically-amplified resists. Examples of the inorganic resist include metal compounds containing one or more transition metals.

(Exposure Step)

Figure 14C:
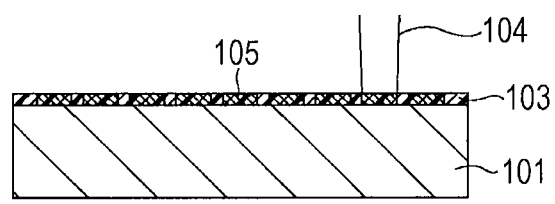

As shown in FIG. 14C, using the roll master exposure apparatus described above, the resist layer 103 is irradiated with the laser beams (exposure beams) 104 while the roll master 101 is rotated. Herein, the entire surface of the resist layer 103 is exposed by intermittently irradiating the resist layer 103 with the laser beams 104 while the laser beams 104 are moved in the height direction of the roll master 101 (in the direction parallel to the central axis of the column- or cylinder-shaped roll master 101). As a result, latent images 105 following the trajectory of the laser beams 104 are formed over the entire surface of the resist layer 103 with a pitch substantially equal to the wavelength of visible light.

For example, the latent images 105 are arranged so as to form multiple rows of tracks on the surface of the master and form a hexagonal lattice pattern or a quasi-hexagonal lattice pattern. Each of the latent images 105 has, for example, an elliptic shape, the major axis direction of which is the track extending direction.

(Development Step)

Figure 14D:
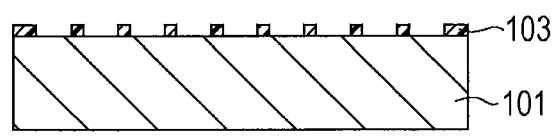

A developer is dropwise applied onto the resist layer 103 while the roll master 101 is rotated, whereby the resist layer 103 is developed as shown in FIG. 14D. In the case where the resist layer 103 is formed using a positive resist, portions exposed to the laser beams 104 have an increased rate of dissolution with the developer compared with non-exposed portions. As a result, as shown in the drawing, a pattern corresponding to the latent images (exposed portions) 105 is formed on the resist layer 103.

(Etching Step)

Figure 14E:
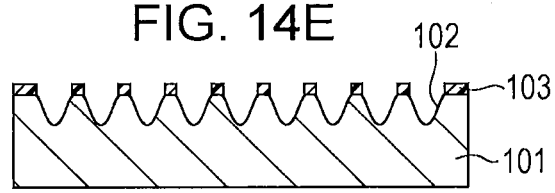
Figure 15A:
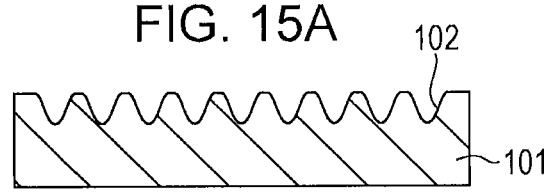
FIGS. 15A to 15D are process diagrams for describing an example of the method for producing the conductive element according to the first embodiment.

As shown in FIG. 14E, the surface of the roll master 101 is subjected to roll etching treatment using, as a mask, the pattern of the resist layer 103 (resist pattern) formed on the roll master 101. Consequently, as shown in FIG. 15A, there can be obtained depressions having an elliptic cone-like shape or a truncated elliptic cone-like shape, the major axis direction of which is the track extending direction, that is, there can be obtained structures 102. The etching is performed by dry etching or the like. Herein, by alternately carrying out etching treatment and ashing treatment, for example, a pattern of conical structures 102 can be formed. In addition, a roll master 101 having a depth of three times or more the thickness of the resist layer 103 (selectivity: 3 or more) can be produced to achieve a high aspect ratio of the structures 102. The dry etching is preferably performed by plasma etching that uses a roll etching apparatus.

Thus, a roll master 101 having a hexagonal lattice pattern or a quasi-hexagonal lattice pattern including depressions each having a depth of about 120 to 350 nm can be obtained.

(First Optical Layer Formation Step)

Figure 15B:
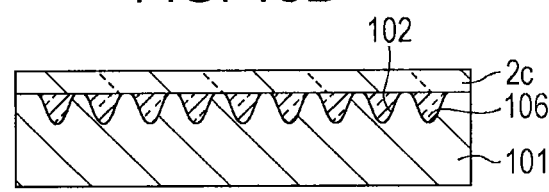
Figure 15C:
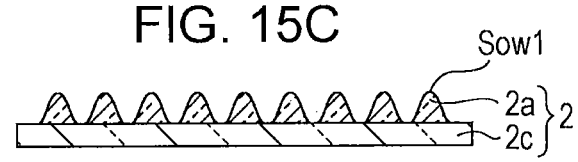

As shown in FIG. 15B, for example, a transfer material 106 is applied on one principal surface of a base 2c; the transfer material 106 is cured by being pressed against the roll master 101 and at the same time irradiated with ultraviolet rays or the like; and the base 2c is detached from the roll master 101. Consequently, as shown in FIG. 15C, a large number of first structures 2a that are projections are formed on the principal surface of the base 2c.

Figure 15D:
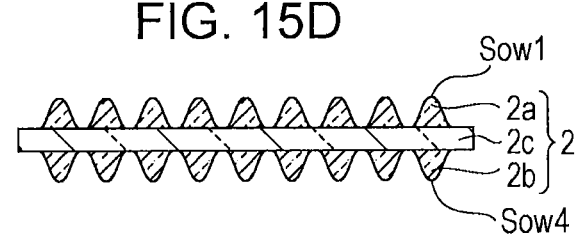

Subsequently, for example, a transfer material 106 is applied on another principal surface (a surface opposite the surface where multiple structures have been formed) of the base 2c; the transfer material 106 is cured by being pressed against the roll master 101 and at the same time irradiated with ultraviolet rays or the like; and the base 2c is detached from the roll master 101. Consequently, as shown in FIG. 15D, a large number of second structures 2b that are projections are formed on the other principal surface of the base 2c. Thus, a first optical layer 2 is obtained. The order of forming the first structures 2a and the second structures 2b is not limited to this example, and the first structures 2a and the second structures 2b may be simultaneously formed on both surfaces of the base 2c.

The transfer material 106 is composed of, for example, an ultraviolet-curable material and an initiator and optionally contains a filler and functional additives.

Examples of the ultraviolet-curable material include monofunctional monomers, bifunctional monomers, and polyfunctional monomers. Specifically, the following materials may be used alone or as a mixture of two or more materials.

Examples of the monofunctional monomers include carboxylic acids (acrylic acid), hydroxy compounds (2-hydroxyethyl acrylate, 2-hydroxypropyl acrylate, and 4-hydroxybutyl acrylate), alkyl compounds, alicyclic compounds (isobutyl acrylate, t-butyl acrylate, isooctyl acrylate, lauryl acrylate, stearyl acrylate, isobornyl acrylate, and cyclohexyl acrylate), and other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropylacrylamide, N,N-dimethylacrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of the bifunctional monomers include tri(propylene glycol) diacrylate, trimethylolpropane diallyl ether, and urethane acrylate.

Examples of the polyfunctional monomers include trimethylolpropane triacrylate, dipentaerythritol penta/hexaacrylate, and ditrimethylolpropane tetraacrylate.

Examples of the initiator include 2,2-dimethoxy-1,2-diphenylethan-1-one, 1-hydroxy-cyclohexyl phenyl ketone, and 2-hydroxy-2-methyl-1-phenylpropan-1-one.

As the filler, for example, inorganic fine particles or organic fine particles can be used. Examples of the inorganic fine particles include fine particles of a metal oxide such as $SiO_2$, $TiO_2$, $ZrO_2$, $SnO_2$, or $Al_2O_3$.

Examples of the functional additives include a leveling agent, a surface control agent, and an anti-foaming agent. Examples of the material of the base 2c include methyl methacrylate (co)polymer, polycarbonate, styrene (co)polymer, methyl methacrylate-styrene copolymer, cellulose diacetate, cellulose triacetate, cellulose acetate butyrate, polyester, polyamide, polyimide, polyethersulfone, polysulfone, polypropylene, polymethylpentene, polyvinyl chloride, polyvinyl acetal, polyetherketone, polyurethane, and glass.

The method for forming the base 2c is not particularly limited. The base 2c may be an injection-molded body, an extruded body, or a cast body. A surface treatment such as a corona treatment may be optionally performed on the surface of the base. A spin-on glass material, for example, can also be used as the transfer material 106.

(Coating Step)

Figure 16A:
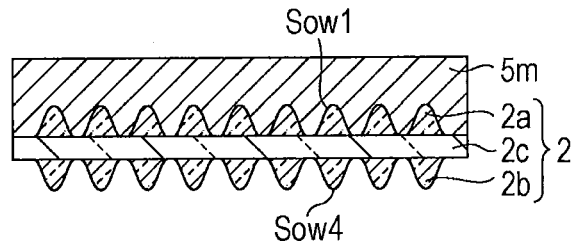
FIGS. 16A to 16D are process diagrams for describing an example of the method for producing the conductive element according to the first embodiment.

As shown in FIG. 16A, for example, a conductive paint 5m is applied on a first wave surface Sow1 of the first optical layer 2. The conductive paint 5m contains, for example, at least one conductive material selected from the group of conductive polymer, metal nanoparticles, and carbon nanotube. The conductive paint 5m may optionally contain an organic polymer, a cross-linking agent, and a solvent. The method for applying the conductive paint 5m is not particularly limited as long as the conductive paint 5m can be substantially uniformly applied on the wave surface Sow1. Examples of the method include spin coating, roll coating, reverse coating, blade coating, spray coating, dip coating, and laminar flow coating. The conductive paint 5m may be applied using a printing technique such as screen printing or inkjet printing to form a predetermined pattern.

(Curing Step)

Figure 16B:
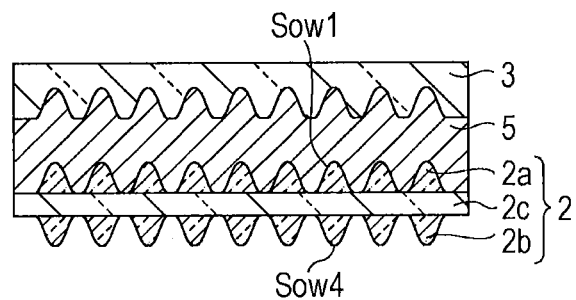

As shown in FIG. 16B, for example, a second optical layer 3 is placed on the conductive paint 5m and the conductive paint 5m is cured.

(Coating Step)

Figure 16C:
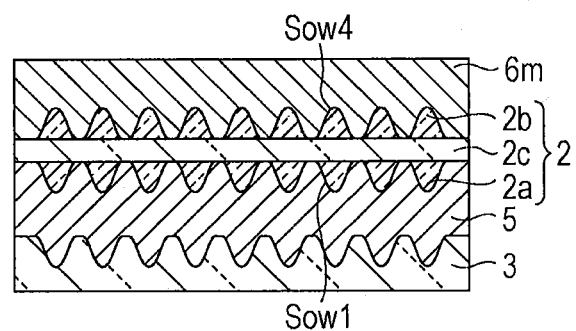

As shown in FIG. 16C, for example, a conductive paint 6m is applied on a fourth wave surface Sow4 of the first optical layer 2. The same conductive paint as the conductive paint 5m can be used as the conductive paint 6m.

(Curing Step)

Figure 16D:
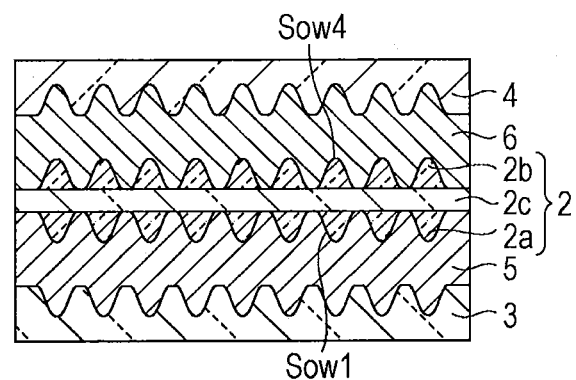

As shown in FIG. 16D, for example, a third optical layer 4 is placed on the conductive paint 6m and the conductive paint 6m is cured.

Through the steps described above, an intended conductive element 11 is obtained.

In the case where the first transparent conductive film 5 and second transparent conductive film 6 are inorganic transparent conductive films, such transparent conductive films can be formed by a chemical vapor deposition (CVD: a technique that deposits a thin film from a vapor phase using chemical reaction) method such as thermal CVD, plasma CVD, or photo CVD or a physical vapor deposition (PVD: a technique that forms a thin film by condensing, onto a substrate, a material physically vaporized in vacuum) method such as vacuum deposition, plasma-assisted deposition, sputtering, or ion plating. In the case where the first transparent conductive film 5 and second transparent conductive film 6 are inorganic transparent conductive films, after the film formation, an annealing treatment may be optionally performed on the inorganic transparent conductive films. Thus, the inorganic transparent conductive films can have amorphous and polycrystalline states in a mixed manner.

According to the first embodiment, the conductive element 11 includes the first transparent conductive film 5 having the first surface S1 and the second surface S2 and the second transparent conductive film 6 having the first surface S1 and the second surface S2 in the optical layer thereof. At least one of the first surface S1 and the second surface S2 of the transparent conductive films is a wave surface with a wavelength shorter than or equal to that of visible light. This can reduce the reflection at the interface between the optical layer 1 and the first transparent conductive film 5 and at the interface between the optical layer 1 and the second transparent conductive film 6.

In the case where the first transparent conductive film 5 and second transparent conductive film 6 are formed so as to have a certain electrode pattern, there can be reduced the difference in reflectance between a portion having a wiring pattern of the first transparent conductive film 5 and second transparent conductive film 6 and a portion having no wiring pattern. Thus, the visibility of a wiring pattern can be suppressed. Furthermore, a nano-imprinting technique and a film structure with high throughput are employed without using a multi-layer optical film, whereby mass productivity and low cost can be achieved.

In the case where the conductive element 11 is produced by a method in which a process of making a master of an optical disc and an etching process are combined with each other, the productivity of the conductive element 11 can be improved while at the same time the size of the conductive element 11 can be increased.

[Modification]

Modification 1

In the above-described first embodiment, the case where the tracks are linearly arranged has been described, but the shape of the tracks are not limited to the case. Hereinafter, only the shape of tracks of first structures 2a formed on a first surface So1 of an optical layer 1 will be described, but structures formed on surfaces other than the first surface So1 of the optical layer 1 can also have the same shape of tracks.

FIG. 17A is a plan view showing a modification of the tracks of the conductive element according to the first embodiment. This modification is different from the first embodiment in that a large number of first structures 2a are arranged in an arc-like shape. In the three adjacent rows of tracks (T1 to T3), the first structures 2a are arranged so as to form a hexagonal lattice pattern or a quasi-hexagonal lattice pattern with the centers of the first structures 2a being positioned at points a1 to a7.

FIG. 17B is a plan view showing a modification of the tracks of the conductive element according to the first embodiment. This modification is different from the first embodiment in that a large number of first structures 2a are arranged on meandering tracks (hereinafter, referred to as "wobble tracks"). By arranging the first structures 2a on the wobble tracks in such a manner, the occurrence of exterior unevenness can be suppressed. The wobbles of the tracks on the base 2c are preferably synchronized with one another. That is, the wobbles are preferably synchronized wobbles. By synchronizing the wobbles in such a manner, a unit lattice shape of a hexagonal lattice or a quasi-hexagonal lattice can be held and high packing fraction can be maintained. Examples of a wave shape of the wobble tracks include a sine wave and a triangular wave. The wave shape of the wobble tracks is not limited to periodical wave shapes, and may be a non-periodical wave shape. The wobble amplitude of the wobble tracks is set to be, for example, about ±10 μm.

Modification 2

Figure 18A:
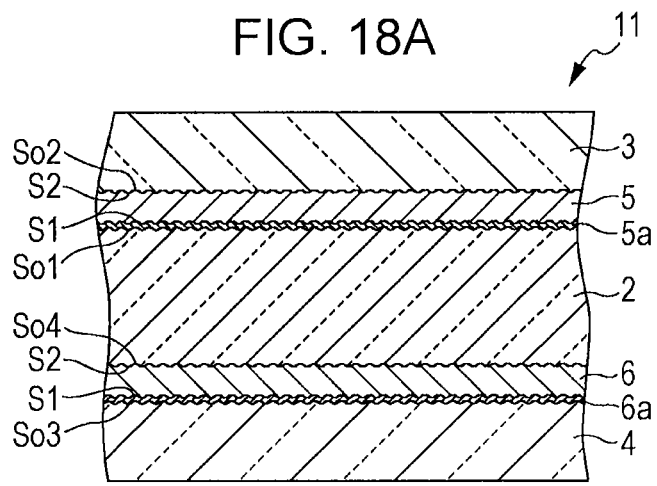
FIG. 18A is a sectional view showing a modification of the conductive element according to the first embodiment.
Figure 18B:
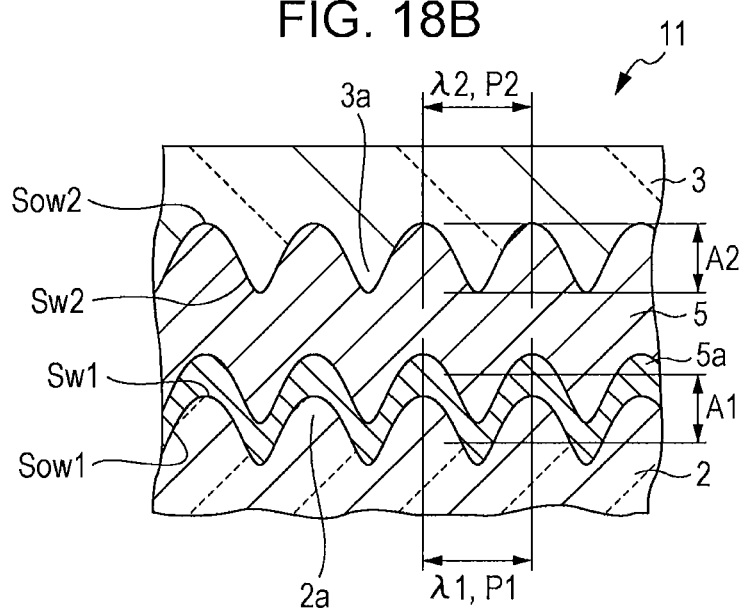
FIG. 18B is an enlarged sectional view of part of the conductive element shown in FIG. 18A.

FIG. 18A is a sectional view showing a modification of the conductive element according to the first embodiment of the present invention. FIG. 18B is an enlarged sectional view of part of the conductive element shown in FIG. 18A. This modification is different from the first embodiment in that the conductive element 11 includes a first metal film 5a disposed so as to be adjacent to the first transparent conductive film 5 and/or a second metal film 6a disposed so as to be adjacent to the second transparent conductive film 6.

By forming the first metal film 5a and/or the second metal film 6a, the resistivity can be reduced and thus the thicknesses of the first transparent conductive film 5 and/or the second transparent conductive film 6 can be decreased. Moreover, in the case where sufficient conductivity is not achieved with only the first transparent conductive film 5 or the second transparent conductive film 6, the formation of the first metal film 5a and/or the second metal film 6a can compensate for the insufficient conductivity.

The first metal film 5a is formed, for example, at the interface between the first optical layer 2 and the first transparent conductive film 5, at the interface between the first transparent conductive film 5 and the second optical layer 3, or at both the interfaces. The layered structure is not limited to a two-layer structure, and there may be employed a layered structure in which three or more layers are stacked by combining the first transparent conductive film 5 and the first metal film 5a with each other. For example, there may be employed a layered structure in which two first transparent conductive films 5 are stacked with the first metal film 5a therebetween.

The second metal film 6a is formed, for example, at the interface between the first optical layer 2 and the second transparent conductive film 6, at the interface between the second transparent conductive film 6 and the third optical layer 4, or at both the interfaces. The layered structure is not limited to a two-layer structure, and there may be employed a layered structure in which three or more layers are stacked by combining the second transparent conductive film 6 and the second metal film 6a with each other. For example, there may be employed a layered structure in which two second transparent conductive films 6 are stacked with the second metal film 6a therebetween.

The thicknesses of the first metal film 5a and second metal film 6a are not particularly limited, and are, for example, about several nanometers. Since the first metal film 5a and second metal film 6a have high conductivity, sufficient surface resistance can be achieved with a thickness of several nanometers. Such a thickness of several nanometers hardly produces optical effects such as absorption and reflection caused by the first metal film 5a and second metal film 6a. The first metal film 5a and second metal film 6a are preferably composed of a metal material with high conductivity. Such a material is at least one material selected from the group of Ag, Al, Cu, Ti, Au, Pt, and Nb. Among the materials, Ag is preferred in view of its high conductivity and use results. Sufficient surface resistance can be achieved with only the first metal film 5a and second metal film 6a. However, if the first metal film 5a and second metal film 6a are excessively thin, they have an island structure, which tends to make it difficult to ensure continuity. In this case, the island-shaped first metal films 5a are preferably electrically connected to each other through the first transparent conductive film 5 and the island-shaped second metal films 6a are preferably electrically connected to each other through the second transparent conductive film 6.

Modification 3

FIGS. 19A to 19D are process diagrams for describing a modification of the method for producing the conductive element according to the first embodiment. FIGS. 20A to 20C are process diagrams for describing a modification of the method for producing the conductive element according to the first embodiment.

(Master-Making Step)

Figure 19A:
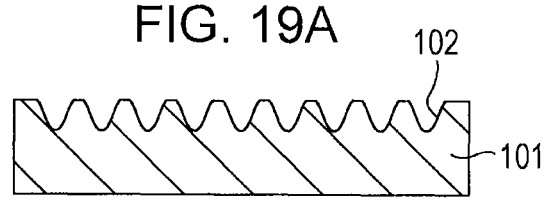
FIGS. 19A to 19D are process diagrams for describing a modification of the method for producing the conductive element according to the first embodiment.
Figure 20A:
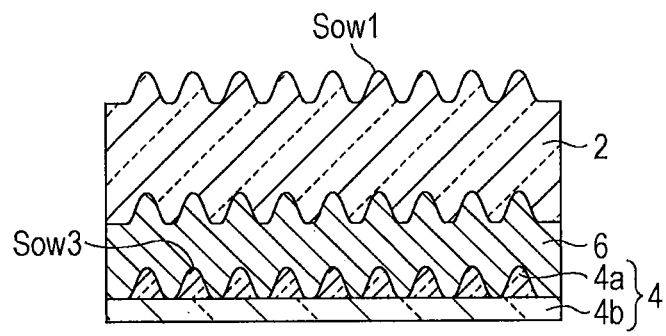
FIGS. 20A to 20C are process diagrams for describing a modification of the method for producing the conductive element according to the first embodiment.
Figure 20B:
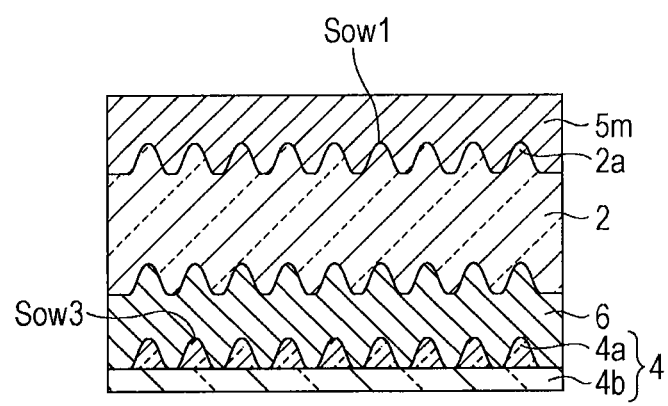
Figure 20C:
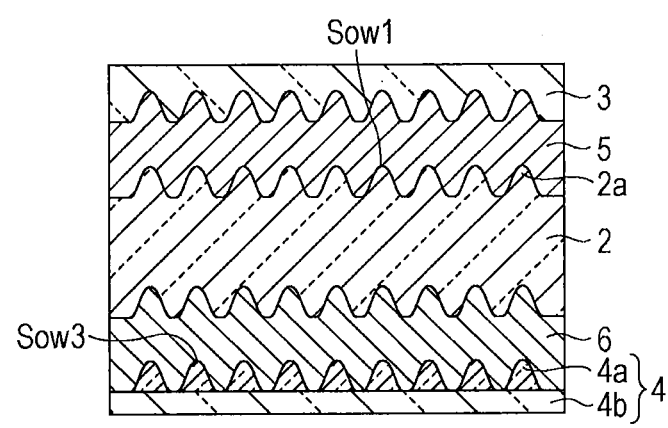
Figure 21A:
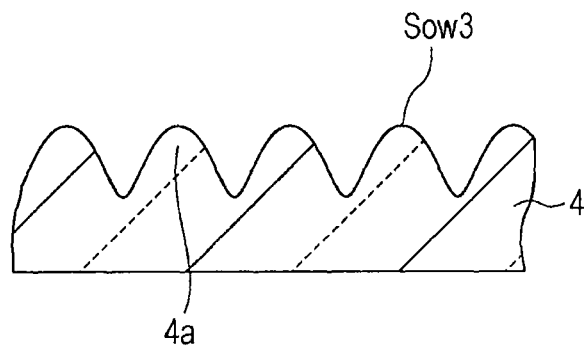
FIGS. 21A to 21D are process diagrams for describing a modification of the method for producing the conductive element according to the first embodiment.
Figure 21B:
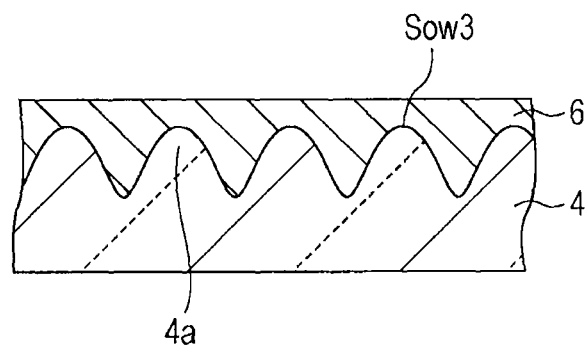
Figure 21C:
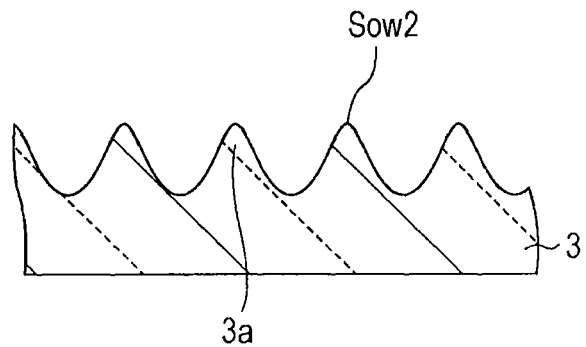
Figure 21D:
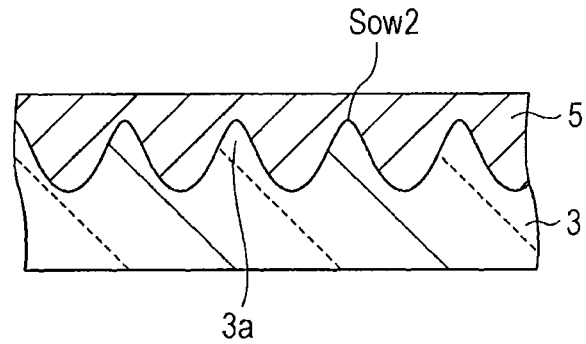

As shown in FIG. 19A, a roll master 101 is made in the same manner as in the first embodiment.

(Third Optical Layer Formation Step)

Figure 19B:
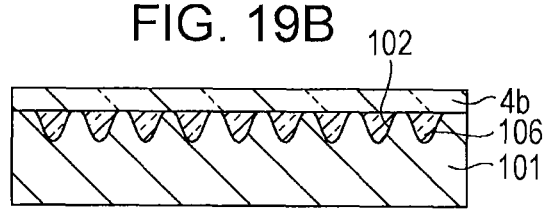
Figure 19C:
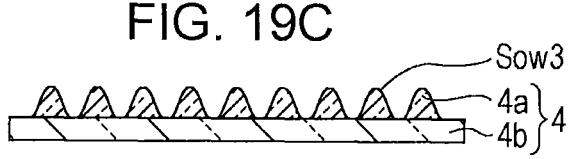

As shown in FIG. 19B, for example, a transfer material 106 is applied on one principal surface of a base 4b; the transfer material 106 is cured by being pressed against the roll master 101 and at the same time irradiated with ultraviolet rays or the like; and the base 4b is detached from the roll master 101. Consequently, as shown in FIG. 19C, a large number of first structures 4a that are projections are formed on the principal surface of the base 4b.

(Coating Step)

Figure 19D:
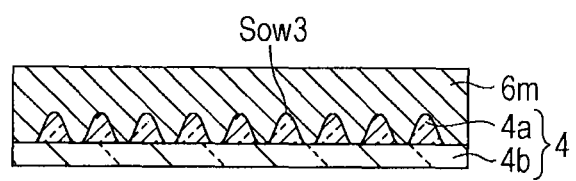

As shown in FIG. 19D, for example, a conductive paint 6m is applied on a third wave surface Sow3 of the third optical layer 4.

(Curing Step)

As shown in FIG. 20A, for example, a first optical layer 2 is placed on the conductive paint 6m and the conductive paint 6m is then cured.

(Coating Step)

As shown in FIG. 20B, for example, a conductive paint 5m is applied on a first wave surface Sow1 of the first optical layer 2.

(Curing Step)

As shown in FIG. 20C, for example, a second optical layer 3 is placed on the conductive paint 5m and the conductive paint 5m is then cured.

Through the steps described above, an intended conductive element 11 is obtained.

Modification 4

Figure 22A:
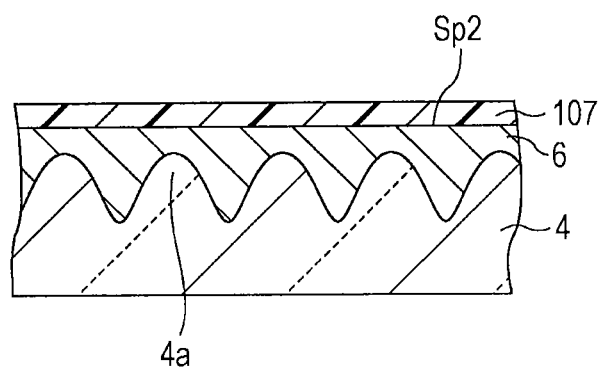
FIGS. 22A and 22B are process diagrams for describing a modification of the method for producing the conductive element according to the first embodiment.
Figure 22B:
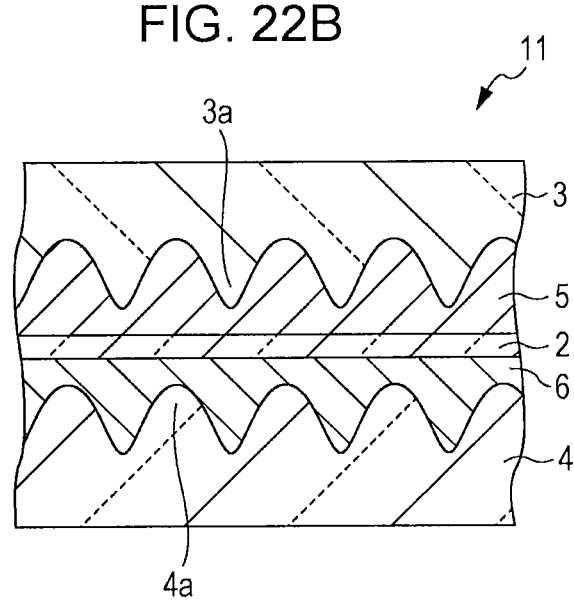

FIGS. 21A to 21D are process diagrams for describing a modification of the method for producing the conductive element according to the first embodiment. FIGS. 22A and 22B are process diagrams for describing a modification of the method for producing the conductive element according to the first embodiment.

First, for example, by transferring an uneven shape of a roll master or the like onto a transfer material, a third optical layer 4 having a wave surface Sow3 is formed. A second transparent conductive film 6 is then formed on the wave surface Sow3 of the third optical layer 4.

Subsequently, for example, by transferring an uneven shape of a roll master or the like onto a transfer material, a second optical layer 3 having a wave surface Sow2 is formed. A first transparent conductive film 5 is then formed on the wave surface Sow2 of the second optical layer 3.

As shown in FIG. 22A, for example, a lamination layer 107 composed of an ultraviolet curable resin or an adhesive is formed on the planar surface Sp2 of the second transparent conductive film 6. As shown in FIG. 22B, the first transparent conductive film 5 formed on the second optical layer 3 and the second transparent conductive film 6 formed on the third optical layer 4 are bonded to each other with the lamination layer 107 therebetween.

Through the steps described above, an intended conductive element 11 is obtained.

2. Second Embodiment

[Structure of Conductive Element]

Figure 23A:
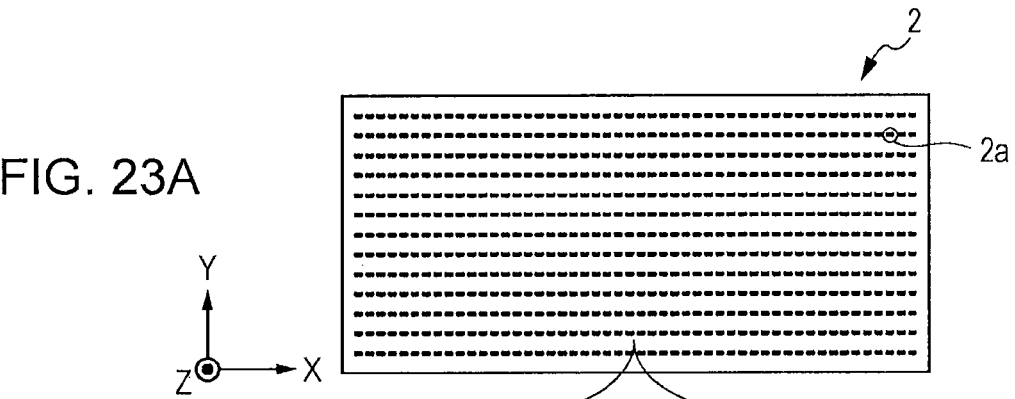
FIG. 23A is a schematic plan view showing an example of a first optical layer of a conductive element according to a second embodiment.
Figure 23B:
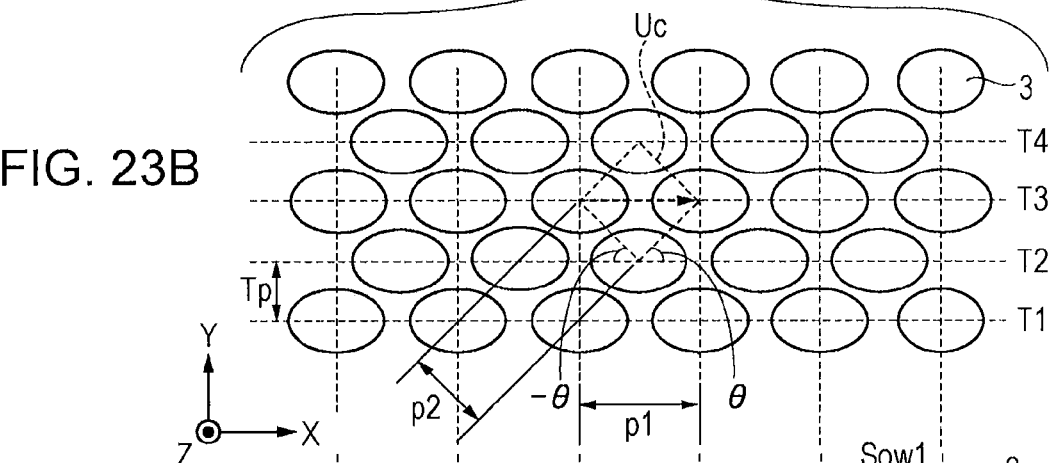
FIG. 23B is an enlarged plan view of part of the first optical layer shown in FIG. 23A.
Figure 23C:
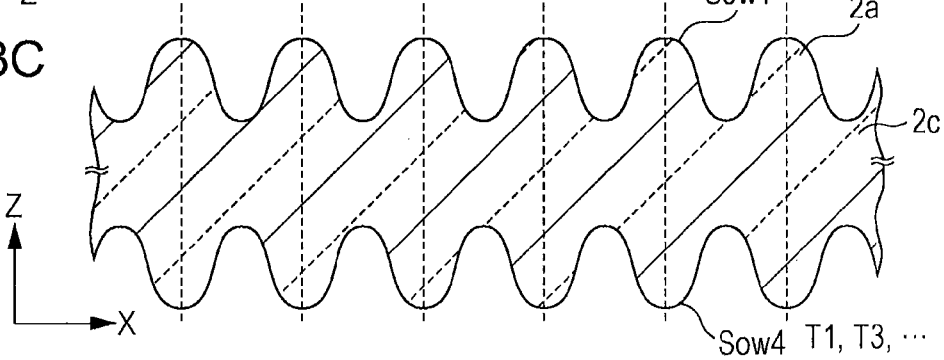
FIG. 23C is a sectional view taken along track T1, T3, . . . of FIG. 23B.
Figure 23D:
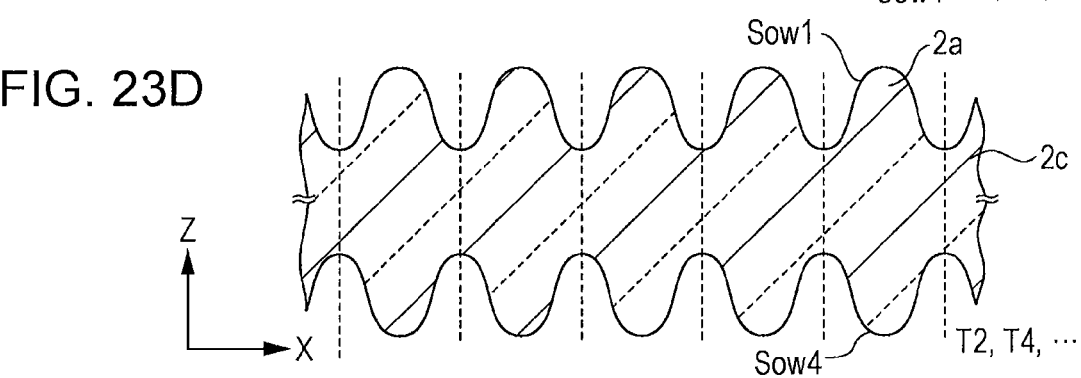
FIG. 23D is a sectional view taken along track T2, T4, . . . of FIG. 23B.

FIG. 23A is a schematic plan view showing an example of a first optical layer of a conductive element according to a second. FIG. 23B is an enlarged plan view of part of the conductive element shown in FIG. 23A. FIG. 23C is a sectional view taken along track T1, T3, . . . of FIG. 23B. FIG. 23D is a sectional view taken along track T2, T4, . . . of FIG. 23B.

A conductive element 11 according to a second embodiment is different from that of the first embodiment in that, in the three adjacent rows of tracks, first structures $2a$ are arranged in a tetragonal lattice pattern or a quasi-tetragonal lattice pattern. In this embodiment, the term "quasi-tetragonal lattice pattern" means, unlike a regular tetragonal lattice pattern, a tetragonal lattice pattern that is stretched and distorted in the track extending direction (X direction).

The height or depth of the first structures $2a$ is not particularly limited, and is, for example, about 100 to 280 nm. The arrangement pitch p2 in a direction of (about) 45 degrees from the track direction is, for example, about 200 to 300 nm. The aspect ratio (height/arrangement pitch) of the first structures $2a$ is, for example, about 0.54 to 1.13. The aspect ratios of all the first structures $2a$ are not necessarily the same, and the first structures $2a$ may be arranged so as to have a certain height distribution.

When the arrangement pitch of the first structures $2a$ on the same track is assumed to be p1 and the arrangement pitch of the first structures $2a$ between the two adjacent tracks is assumed to be p2, the arrangement pitch p1 is preferably larger than the arrangement pitch p2. The ratio p1/p2 preferably satisfies a relationship of $1.4 < p1/p2 \leq 1.5$. By setting the ratio p1/p2 within the range, the packing fraction of the first structures $2a$ having an elliptic cone-like shape or a truncated elliptic cone-like shape can be increased and thus the anti-reflection characteristics can be improved. The height or depth of the first structures $2a$ in a direction of 45 degrees or about 45 degrees from the track direction is preferably smaller than the height or depth of the first structures $2a$ in the track extending direction.

The height H2 of the first structures $2a$ in the arrangement direction (θ direction), which is diagonal to the track extending direction, is preferably smaller than the height H1 of the first structures $2a$ in the track extending direction. That is, the heights H1 and H2 of the first structures $2a$ preferably satisfy a relationship of H1>H2. When the first structures $2a$ are arranged so as to form a tetragonal lattice pattern or a quasi-tetragonal lattice pattern, the height H of the first structures $2a$ is defined as the height of the first structures $2a$ in the track extending direction (track direction).

The packing fraction (maximum 100%) of the first structures $2a$ on the surface of the base is 65% or more, preferably 73% or more, and more preferably 86% or more. By setting the packing fraction within the range, the anti-reflection characteristics can be improved.

The ratio $((2r/p1) \times 100)$ of size $2r$ to arrangement pitch p1 is 64% or more, preferably 69% or more, and more preferably 73% or more. By setting the ratio within the range, the packing fraction of the first structures $2a$ is increased and the anti-reflection characteristics can be improved. Herein, the arrangement pitch p1 is an arrangement pitch of the first structures $2a$ in the track direction and the size $2r$ is a size of the bottom face of each of the structures in the track direction. In the case where the bottom face of each of the structures has a circular shape, the size $2r$ is a diameter. In the case where the bottom face of each of the structures has an elliptic shape, the size $2r$ is a major axis.

3. Third Embodiment

Figure 24A:
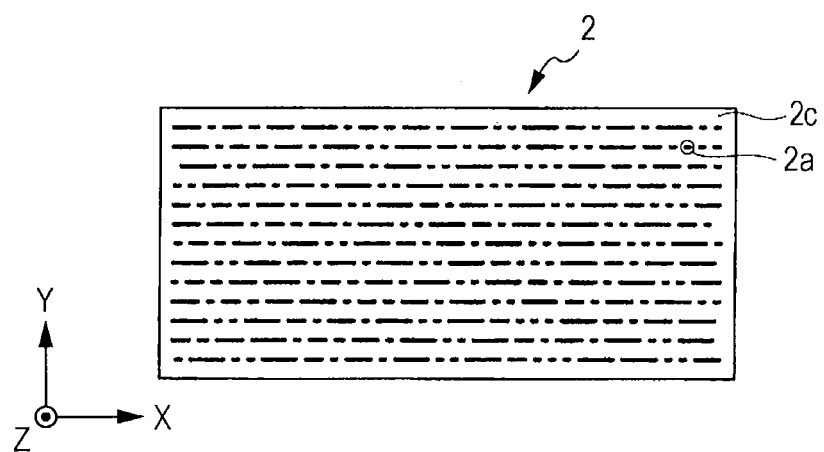
FIG. 24A is a schematic plan view showing an example of a first optical layer of a conductive element according to a third embodiment.
Figure 24B:
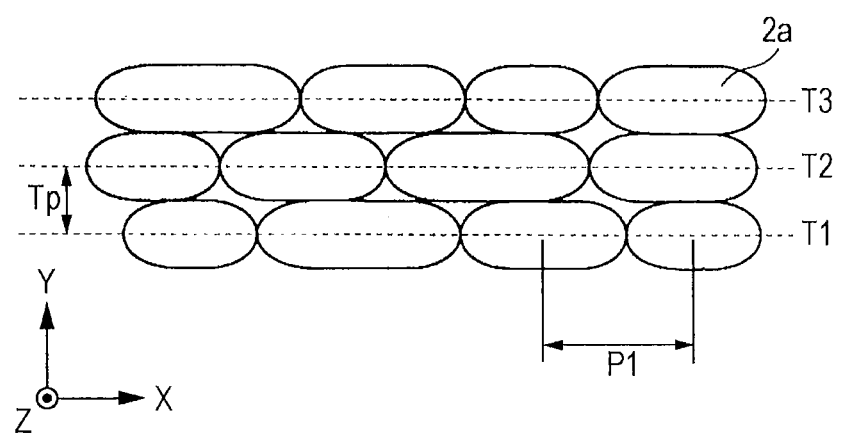
FIG. 24B is an enlarged plan view of part of the first optical layer shown in FIG. 24A.

FIG. 24A is a schematic plan view showing an example of a first optical layer of a conductive element according to a third embodiment. FIG. 24B is an enlarged plan view of part of the first optical layer shown in FIG. 24A. In the third embodiment, the parts corresponding to those in the first embodiment are denoted by the same reference numerals.

A conductive element according to the third embodiment is different from that of the first embodiment in that a large number of structures $2a$ having two or more sizes and/or shapes are formed on the surface of a base. The first structures $2a$ having two or more sizes and/or shapes are, for example, arranged so that first structures $2a$ having the same size and/or shape are periodically arranged in the track direction or the like in a repeated manner. The structures $2a$ having the same size and/or shape may be arranged so as to randomly appear on the surface of the base. Herein, the case where the first structures $2a$ having two or more sizes and/or shapes are formed has been described. However, second structures $3a$, third structures $4a$, and fourth structures $2b$ each having two or more sizes and/or shapes can also be formed. All of the first structures $2a$, the second structures $3a$, the third structures $4a$, and the fourth structures $2b$ do not necessarily have two or more sizes and/or shapes. At least one of them can have two or more sizes and/or shapes in accordance with desired optical properties.

4. Fourth Embodiment

Figure 25A:
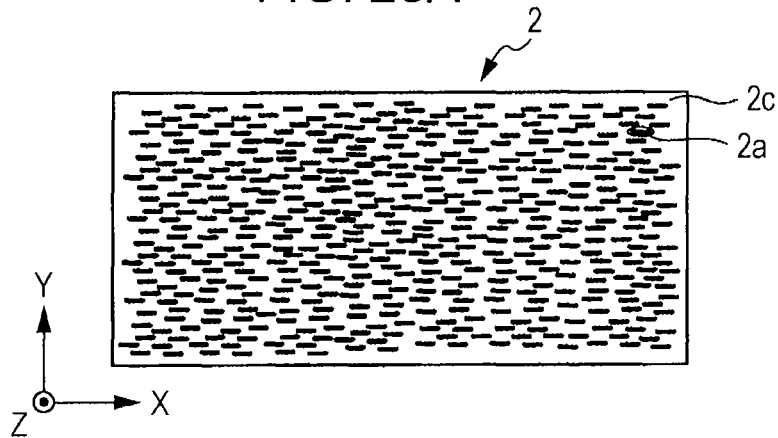
FIG. 25A is a schematic plan view showing an example of a first optical layer of a conductive element according to a fourth embodiment.
Figure 25B:
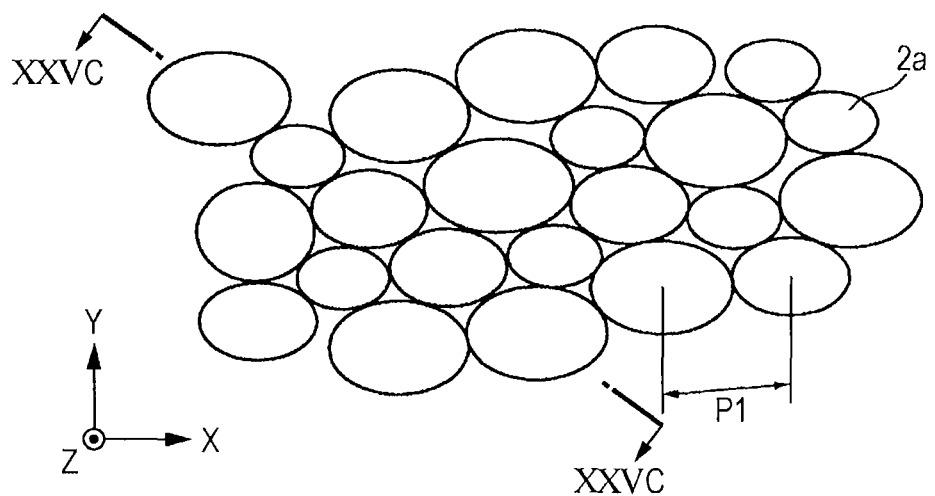
FIG. 25B is an enlarged plan view of part of the first optical layer shown in FIG. 25A.
Figure 25C:
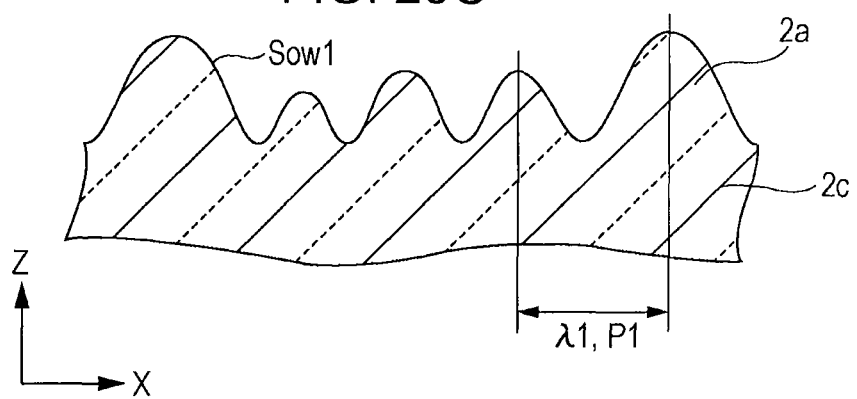
FIG. 25C is a sectional view taken along line XXVC-XXVC shown in FIG. 25B.

FIG. 25A is a schematic plan view showing an example of a first optical layer of a conductive element according to a fourth. FIG. 25B is an enlarged plan view of part of the first optical layer shown in FIG. 25A. FIG. 25C is a sectional view taken along line XXVC-XXVC shown in FIG. 25B. In the fourth embodiment, the parts corresponding to those in the first embodiment are denoted by the same reference numerals.

A conductive element according to the fourth embodiment is different from that of the first embodiment in that a large number of first structures 2a are randomly arranged. The first structures 2a arranged on the surface of the base do not necessarily have the same size and/or shape, and may have two or more different sizes and/or shapes. Preferably, the first structures 2a are two-dimensionally or three-dimensionally formed at random. The phrase "the first structures 2a are two-dimensionally formed at random" means that they are randomly formed in the in-plane direction of the conductive element 11 or the first optical layer 2. The phrase "the first structures 2a are three-dimensionally formed at random" means that they are randomly formed in the in-plane direction of the conductive element 11 or the first optical layer 3 and also in the thickness direction of the conductive element 11 or the first optical layer 2. Herein, the case where the first structures 2a are randomly formed has been described. However, second structures 3a, third structures 4a, and fourth structures 2b can also be randomly formed. All of the first structures 2a, the second structures 3a, the third structures 4a, and the fourth structures 2b are not necessarily formed at random. At least one of them can be randomly formed in accordance with desired optical properties.

5. Fifth Embodiment

Figure 26A:
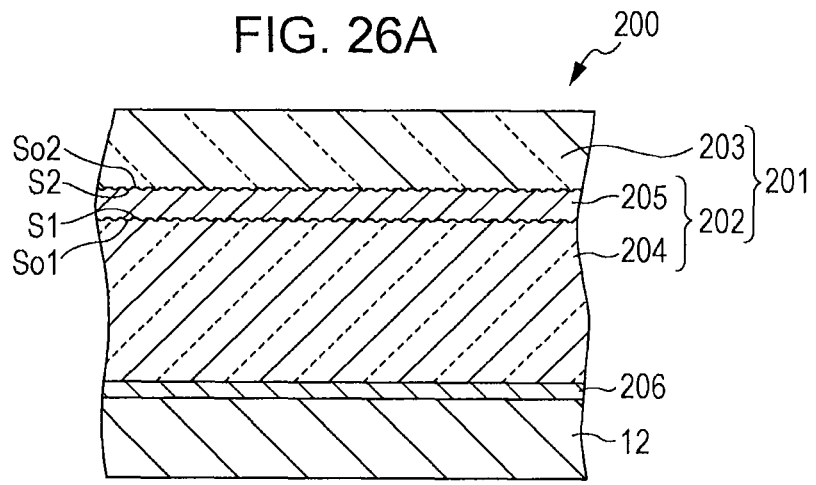
FIG. 26A is a sectional view showing an example of a structure of a touch panel according to a fifth embodiment.
Figure 26B:
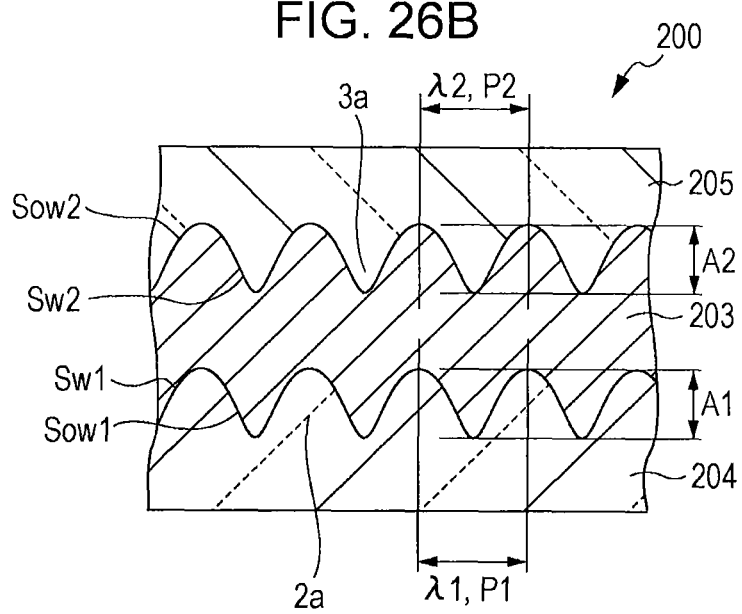
FIG. 26B is an enlarged sectional view of part of the touch panel shown in FIG. 26A.

FIG. 26A is a sectional view showing an example of a structure of a touch panel according to a fifth embodiment. FIG. 26B is an enlarged sectional view of part of the touch panel shown in FIG. 26A. In the fifth embodiment, the parts corresponding to those in the first embodiment are denoted by the same reference numerals. A touch panel (information input apparatus) 200 according to the fifth embodiment is a so-called surface capacitance touch panel and includes a conductive element 201. The touch panel 200 is, for example, bonded to the display surface of a display apparatus 12 with a lamination layer 206 composed of an adhesive or the like therebetween. The conductive element 201 includes an optical layer 202 and a transparent conductive film 203 formed in the optical layer 202.

The transparent conductive film 203 preferably has a first wave surface Sw1 and a second wave surface Sw2. That is, the optical layer 202 preferably includes the first optical layer 204 having the first wave surface Sow1 and the second optical layer 205 having the second wave surface Sow2. This is because the interface reflection in the optical layer 202 can be suppressed. The second optical layer 205 is a dielectric layer mainly composed of a dielectric such as $SiO_2$. The transparent conductive film 203 is, for example, formed on the substantially entire first wave surface Sow1 of the first optical layer 204. The transparent conductive film 203 can be composed of the same material as that of the first transparent conductive film 5 in the first embodiment.

6. Sixth Embodiment

Figure 27:
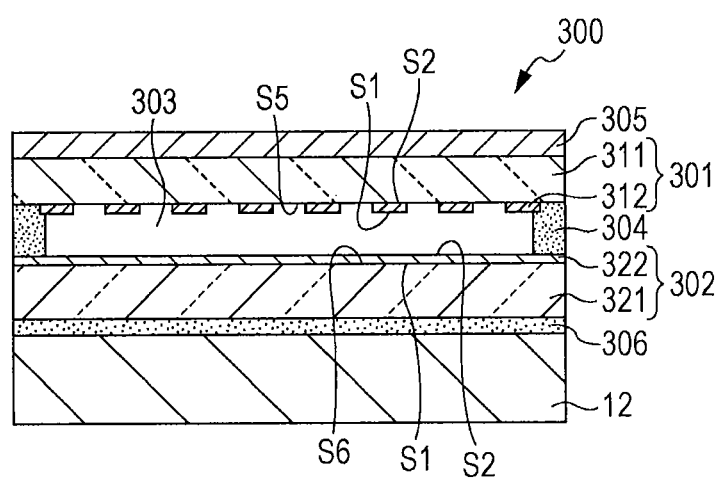
FIG. 27 is a sectional view showing an example of a structure of a touch panel according to a sixth embodiment.

FIG. 27 is a sectional view showing an example of a structure of a touch panel according to a sixth embodiment. In the sixth embodiment, the parts corresponding to those in the fifth embodiment are denoted by the same reference numerals. A touch panel (information input apparatus) 300 is a so-called digital resistive touch panel and includes a first conductive element 301 and a second conductive element 302 that faces the first conductive element 301. The first conductive element 301 and the second conductive element 302 are disposed with an air layer (medium layer) 303 having a certain thickness therebetween. The first conductive element 301 and the second conductive element 302 are bonded to each other with a lamination member 304 disposed between the peripheries thereof. An adhesive paste, an adhesive tape, or the like is used as the lamination member 304. To improve the scratch resistance, the touch panel 300 preferably further includes a hard coat layer 305 on a surface of the first conductive element 301 to be touched. An antifouling property is preferably imparted to the surface of the hard coat layer 305. To improve the display characteristics, the touch panel 300 preferably further includes an anti-reflective layer 307 on the hard coat layer 305. Examples of the anti-reflective layer 307 include an anti-reflection (AR) layer, a low-reflection (LR) layer, and an anti-glare (AG) layer. A structure that imparts anti-reflective properties to the surface of the touch panel is not limited thereto. For example, anti-reflective properties may be imparted to the hard coat layer 305 itself. The touch panel 300 is, for example, bonded to the display surface of a display apparatus 12 with a lamination layer 306 therebetween. The lamination layer 306 can be composed of an acrylic-, rubber-, or silicon-based adhesive. In terms of transparency, an acrylic-based adhesive is preferred.

The first conductive element 301 includes a first base (first optical layer) 311 having a first counter surface S5 that faces the second conductive element 302 and a first transparent conductive film 312 formed on the counter surface S5 of the first base 311. The second conductive element 302 includes a second base (second optical layer) 321 having a counter surface S6 that faces the first conductive element 301 and a second transparent conductive film 322 formed on the counter surface S6 of the second base 321.

The first transparent conductive film 312 is, for example, an X electrode (first electrode) having a certain pattern such as a stripe pattern. The second transparent conductive film 322 is, for example, a Y electrode (second electrode) having a certain pattern such as a stripe pattern. The X electrode and the Y electrode are, for example, disposed so as to be perpendicular to each other. The first transparent conductive film 312 has a first surface S1 and a second surface S2. The first surface S1 and the second surface S2 are preferably wave surfaces with a wavelength shorter than or equal to that of visible light. The second transparent conductive film 322 has a first surface S1 and a second surface S2. The first surface S1 and the second surface S2 are preferably wave surfaces with a wavelength shorter than or equal to that of visible light. Since the wave surfaces of the first transparent conductive film 312 or the second transparent conductive film 322 are the same as those in the first embodiment, the description is omitted.

7. Seventh Embodiment

Figure 28A:
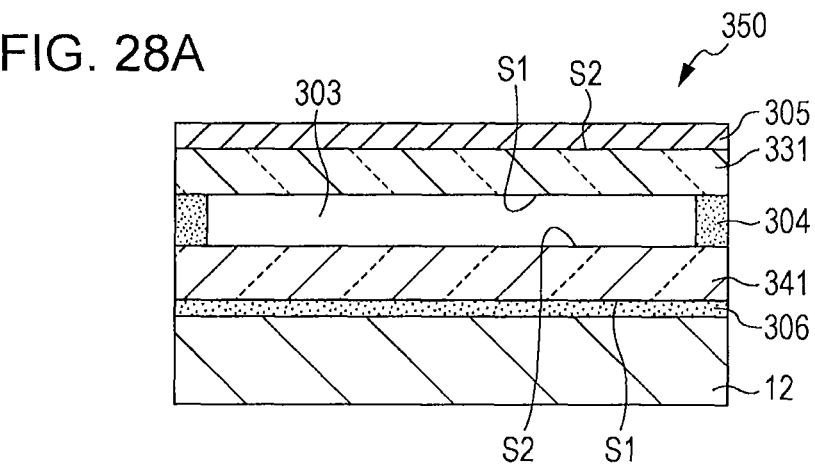
FIG. 28A is a sectional view showing an example of a structure of a touch panel according to a seventh embodiment.
Figure 28B:
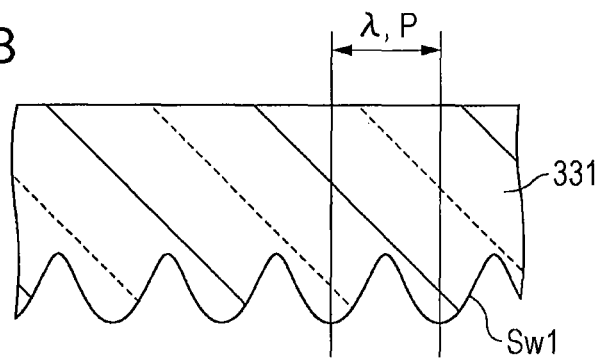
FIG. 28B is a sectional view showing an example of a first conductive element according to the seventh embodiment.
Figure 28C:
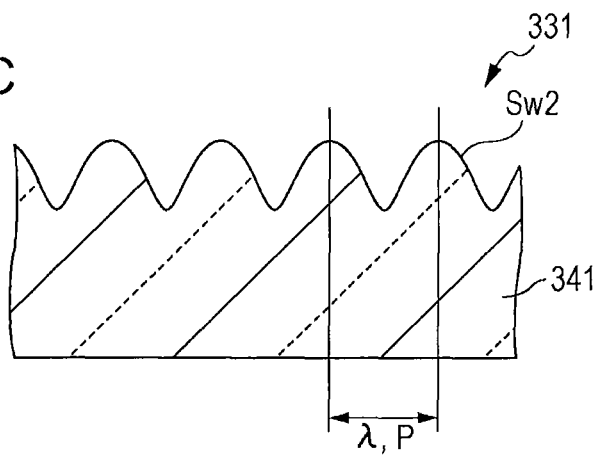
FIG. 28C is a sectional view showing an example of a second conductive element according to the seventh embodiment.

FIG. 28A is a sectional view showing an example of a structure of a touch panel according to a seventh embodiment. FIG. 28B is a sectional view showing an example of a first conductive element according to the seventh embodiment. FIG. 28C is a sectional view showing an example of a second conductive element according to the seventh embodiment. In the seventh embodiment, the parts corresponding to those in the sixth embodiment are denoted by the same reference numerals.

A touch panel (information input apparatus) 350 is a so-called analog resistive touch panel and includes a first conductive element 331 and a second conductive element 341 that faces the first conductive element 331. The first conductive element 331 and the second conductive element 341 are disposed with an air layer (medium layer) 303 having a certain thickness therebetween. A dot spacer may be disposed on the conductive element 341. The first conductive element 331 and the second conductive element 341 are bonded to each other with a lamination member 304 disposed between the peripheries thereof.

The first conductive element 331 and the second conductive element 341 contain, for example, at least one conductive material selected from the group of conductive polymer, metal nanoparticles, and carbon nanotube. The first conductive element 331 has a first surface S1 and a second surface S2, at least one of which is preferably a wave surface. The second conductive element 341 has a first surface S1 and a second surface S2, at least one of which is preferably a wave surface. The wave surface of the first conductive element 331 or the second conductive element 341 is, for example, a wave surface with a wavelength shorter than or equal to that of visible light. The wave surface is specifically the same as that in the first embodiment.

FIG. 28B shows the case where, in the first conductive element 331, the first surface S1 that faces the second conductive element 341 is a wave surface Sw1. FIG. 28C shows the case where, in the second conductive element 341, the second surface S2 that faces the first conductive element 331 is a wave surface Sw2.

An example of a method for producing the first conductive element 331 will now be described with reference to FIGS. 29A to 29D. Herein, the second conductive element 341 can be produced in the same manner as in the first conductive element 331 and thus the description is omitted.

Figure 29A:
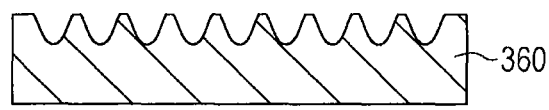
FIGS. 29A to 29D are process diagrams for describing an example of a method for producing the first conductive element according to the seventh embodiment.
Figure 29B:
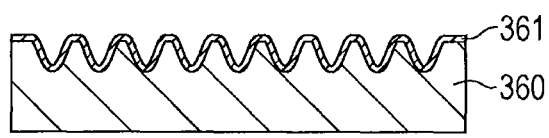
Figure 29C:
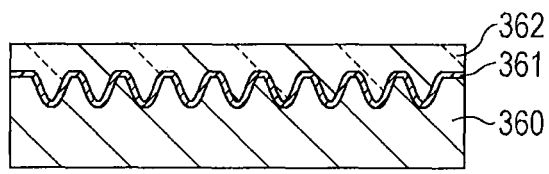
Figure 29D:
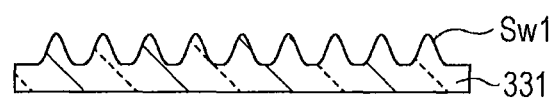

As shown in FIG. 29A, for example, a master 360 is made in the same manner as in the first embodiment. As shown in FIG. 29B, a thin film 361 such as a metal film or an oxide film is preferably formed on the treated surface of the master 360 to improve a release property. As shown in FIG. 29C, a conductive paint 362 is applied to the treated surface of the master 360 and then cured. Subsequently, the cured conductive paint 362 is detached from the master 360. Thus, as shown in FIG. 29D, the first conductive element 331 having the wave surface Sw1 is obtained.

8. Eighth Embodiment

Figure 30:
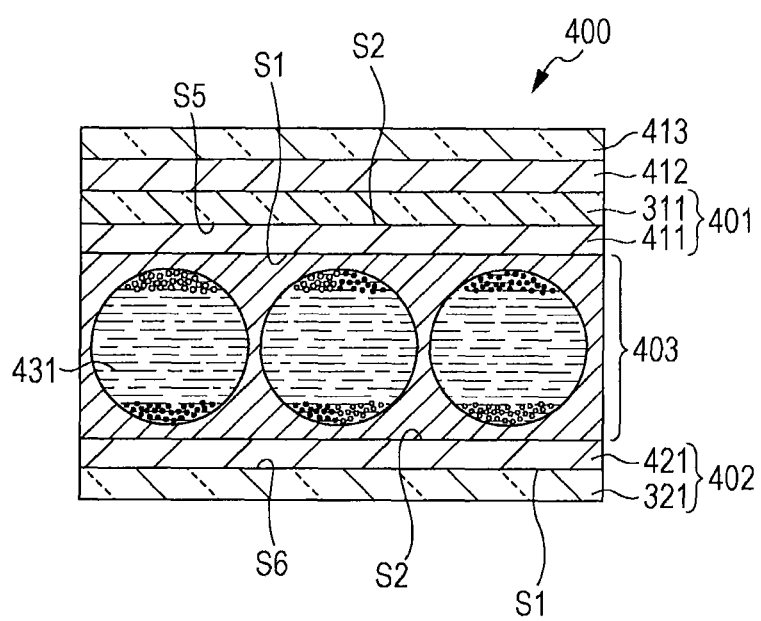
FIG. 30 is a sectional view showing an example of a structure of a display apparatus according to an eighth embodiment.

FIG. 30 is a sectional view showing an example of a structure of a display apparatus according to an eighth embodiment. In the eighth embodiment, the parts corresponding to those in the sixth embodiment are denoted by the same reference numerals. A display apparatus 400 is a so-called electrophoretic electronic paper and includes a first conductive element 401, a second conductive element 402 disposed so as to face the first conductive element 401, and a microcapsule layer (medium layer) 403 disposed between the conductive elements 401 and 402. Herein, an example in which the present embodiment is applied to electrophoretic electronic paper will be described, but electronic paper is not limited to this example. The present embodiment can be applied as long as a medium layer is disposed between conductive elements facing each other. The medium includes gas such as air, in addition to liquid and solid. The medium also contains capsules, pigment, particles, and the like. Examples of electronic paper, to which the present invention can be applied, other than the electrophoretic electronic paper include twist ball-type electronic paper, thermal rewritable electronic paper, toner display-type electronic paper, in-plane electrophoretic electronic paper, and electronic powder and granular-type electronic paper.

The microcapsule layer 403 contains a large number of microcapsules 431. In the microcapsules, a transparent liquid (dispersion medium) in which, for example, black particles and white particles are dispersed is encapsulated.

The first conductive element 401 includes a first base (first optical layer) 311 having a first counter surface S5 that faces the second conductive element 402 and a first transparent conductive film 411 formed on the counter surface S5 of the first base 311. The first base 311 may be optionally bonded to a supporting member 413 composed of glass or the like with a lamination layer 412 composed of an adhesive or the like therebetween.

The second conductive element 402 includes a second base (second optical layer) 321 having a counter surface S6 that faces the first conductive element 401 and a second transparent conductive film 421 formed on the counter surface S6 of the second base 321. The first transparent conductive film 411 has a first surface S1 and a second surface S2. The second transparent conductive film 421 has a first surface S1 and a second surface S2. The first surface S1 and the second surface S2 are preferably wave surfaces with a wavelength shorter than or equal to that of visible light. Since the wave surfaces of the first transparent conductive film 411 or the second transparent conductive film 421 are the same as those in the first embodiment, the description is omitted.

The first transparent conductive film 411 and the second transparent conductive film 421 are formed in a predetermined electrode pattern in accordance with the driving method of the electronic paper 400. Examples of the driving method include simple matrix driving method, active matrix driving method, and segment driving method.

Examples

The present embodiments will now be specifically described based on Examples, but are not limited thereto.
(Mean Height H, Mean Arrangement Pitch P, and Mean Aspect Ratio)

Hereinafter, the mean height H, the mean arrangement pitch P, and the mean aspect ratio (H/P) of structures of a conductive sheet were determined as follows.

First, a conductive sheet was cut so that the section included the top of a structure. The section was then observed with a transmission electron microscope (TEM). From the TEM micrograph obtained, the arrangement pitch P and height H of the structure were determined. This measurement was repeatedly performed at ten positions randomly selected from the conductive sheet. The measurement values were simply averaged (arithmetic mean) to determine the mean arrangement pitch P and the mean height H. The mean aspect ratio (H/P) is then determined using the mean arrangement pitch P and the mean height H.
(Mean Thickness of ITO Film)

Hereinafter, the thickness of an ITO film was determined as follows.

First, a conductive sheet was cut so that the section included the top of a structure. The section was then observed with a transmission electron microscope (TEM). From the TEM micrograph obtained, the thickness of an ITO film at a position corresponding to the top of the structure was measured. This measurement was repeatedly performed at ten positions randomly selected from the conductive sheet. The measurement values were simply averaged (arithmetic mean) to determine the mean thickness.
(Mean Wavelength λ, Mean Peak-to-Peak Amplitude A, and Mean Ratio (A/λ))

Hereinafter, the mean wavelengths λ of a first wave surface and a second wave surface, the mean peak-to-peak amplitude A of the first wave surface, the mean peak-to-peak amplitude B of the second wave surface, and the mean ratio (A/λ) and the mean ratio (B/λ) were determined as follows. First, a conductive sheet was cut in a single direction so that the section included a position where the peak-to-peak amplitude of the first wave surface or second wave surface of the ITO film was maximized. The section was then observed with a transmission electron microscope (TEM). From the TEM micrograph obtained, the wavelength λ of the first wave surface or the second wave surface, the peak-to-peak amplitude A of the first wave surface, and the peak-to-peak amplitude B of the second wave surface were determined. This measurement was repeatedly performed at ten positions randomly selected from the ITO film. Subsequently, the measured wavelengths λ of the first wave surfaces and second wave surfaces, the measured peak-to-peak amplitudes A of the first wave surfaces, and the measured peak-to-peak amplitudes B of the second wave surfaces were simply averaged (arithmetic mean) to determine the mean wavelengths λ of the first wave surfaces and second wave surfaces, the mean peak-to-peak amplitude A of the first wave surfaces, and the mean peak-to-peak amplitude B of the second wave surfaces, respectively. The mean ratio (A/λ) and the mean ratio (B/λ) were determined using the mean wavelength λ, the mean peak-to-peak amplitude A, and the mean peak-to-peak amplitude B.

Example 1

A glass roll master having an outer diameter of 126 mm was prepared and a resist layer was formed on the surface of the glass roll master as follows. That is, a photoresist was diluted ten-fold with thinner, and a resist layer was formed by applying the diluted photoresist onto the cylindrical surface of the glass roll master by dip coating so as to have a thickness of about 70 nm. Subsequently, the glass roll master serving as a recording medium was conveyed to the roll master exposure apparatus shown in FIG. 13. By exposing the resist layer, latent images that extend in a spiral and have a hexagonal lattice pattern in the three adjacent rows of tracks were patterned in the resist layer.

Specifically, a region where a hexagonal lattice exposure pattern is to be formed was irradiated with laser beams having a power of 0.50 mW/m that can perform exposure up to the surface of the glass roll master to form a depressed hexagonal lattice exposure pattern. The thickness of the resist layer in the column direction was about 60 nm and the thickness of the resist layer in the track extending direction was about 50 nm.

The resist layer formed on the glass roll master was then subjected to developing treatment to dissolve the resist layer formed in the exposed region. Specifically, the undeveloped glass roll master was placed on a turntable (not shown) of a developing machine, and a developer was dropped onto the surface of the glass roll master while the glass roll master was rotated together with the turn table to develop the resist layer formed on the surface. Thus, a resist glass master whose resist layer was opened in a hexagonal lattice pattern was obtained.

Next, plasma etching was performed in a $CHF_3$ gas atmosphere using a roll etching machine. As a result, on the surface of the glass roll master, only a region having a hexagonal lattice pattern exposed from the resist layer was etched and the other region was not etched because the resist layer served as a mask. Thus, depressions having an elliptic cone-like shape were formed in the glass roll master. Herein, the amount (depth) of the etching was adjusted by etching time. Finally, by completely removing the resist layer by $O_2$ ashing, a moth-eye glass roll master having a depressed hexagonal lattice pattern was obtained. The depth of the depressions in the column direction was larger than that of the depressions in the track extending direction.

The above-described moth-eye glass roll master and a triacetyl cellulose (TAC) sheet to which an ultraviolet curable resin was applied were closely brought into contact with each other. The TAC sheet was then detached from the moth-eye glass roll master while being irradiated with ultraviolet rays and cured. Thus, an optical sheet having a plurality of structures below arranged on one principal surface thereof was obtained.

Shape of structures: truncated elliptic cone-like shape
    Mean height H: 170 nm
    Mean arrangement pitch P: 270 nm
    Mean aspect ratio: 0.63

By applying an aqueous PEDOT/PSS dispersion solution on the optical sheet and drying it, there was obtained an optical sheet in which a PEDOT/PSS layer with a mean thickness of 10 μm was formed on the structures. Subsequently, two of the optical sheets were prepared and a UV curable resin was sandwiched between the conductive layers of the optical sheets. The optical sheets were irradiated with ultraviolet rays to cure the UV curable resin. Thus, the optical sheets were bonded to each other.

Through the steps described above, an intended conductive sheet was obtained.

The optical properties of the conductive sheet produced as described above were evaluated. Consequently, it was confirmed that ripples were not observed through visual inspection and satisfactory transparency was achieved.

Furthermore, the conductivity was evaluated using the end portion of the conductive sheet. Consequently, it was confirmed that low resistivity was achieved.

Example 2

A conductive sheet was produced by the same method as in Example 1, except that the structures below were formed on the TAC sheet by adjusting the conditions of the exposure step and the etching step.

Shape of structures: elliptic cone-like shape
    Mean height H: 150 nm
    Mean arrangement pitch P: 250 nm
    Mean aspect ratio (H/P): 0.63

By applying an ethanol solution including Ag nanoparticles dispersed therein on the optical sheet and drying it, there was obtained an optical sheet in which a Ag layer with a mean thickness of 3 μm was formed on the structures. Subsequently, two of the optical sheets were prepared and a UV curable resin was sandwiched between the conductive layers of the optical sheets. The optical sheets were irradiated with ultraviolet rays to cure the UV curable resin. Thus, the optical sheets were bonded to each other.

Through the steps described above, an intended conductive sheet was obtained.

The optical properties of the conductive sheet produced as described above were evaluated. Consequently, it was confirmed that ripples were not observed through visual inspection and satisfactory transparency was achieved.

Furthermore, the conductivity was evaluated using the end portion of the conductive sheet. Consequently, it was confirmed that low resistivity was achieved.

Example 3

A conductive sheet was produced by the same method as in Example 1, except that the structures below were formed on the TAC sheet by adjusting the conditions of the exposure step and the etching step.

Shape of structures: truncated elliptic cone-like shape
    Mean height H: 120 nm
    Mean arrangement pitch P: 250 nm
    Mean aspect ratio (H/P): 0.48

By applying an ethanol solution including ITO nanoparticles dispersed therein on the optical sheet and drying it, there was obtained an optical sheet in which an ITO layer (conductive layer) with a thickness of 3 μm was formed on the structures. Subsequently, two of the optical sheets were prepared and a UV curable resin was sandwiched between the conductive layers of the optical sheets. The optical sheets were irradiated with ultraviolet rays to cure the UV curable resin. Thus, the optical sheets were bonded to each other.

Through the steps described above, an intended conductive sheet was obtained.

The optical properties of the conductive sheet produced as described above were evaluated. Consequently, it was confirmed that ripples were not observed through visual inspection and satisfactory transparency was achieved.

Furthermore, the conductivity was evaluated using the end portion of the conductive sheet. Consequently, it was confirmed that low resistivity was achieved.

Example 4

A conductive sheet was produced by the same method as in Example 1, except that the structures below were formed on the TAC sheet by adjusting the conditions of the exposure step and the etching step.
Shape of structures: elliptic cone-like shape
Mean height H: 360 nm
Mean arrangement pitch P: 300 nm
Mean aspect ratio (H/P): 1.2

By applying an aqueous PEDOT/PSS dispersion solution on the optical sheet and drying it, there was obtained an optical sheet in which a PEDOT/PSS layer with a mean thickness of 10 μm was formed on the structures. Subsequently, two of the optical sheets were prepared and a UV curable resin was sandwiched between the conductive layers of the optical sheets. The optical sheets were irradiated with ultraviolet rays to cure the UV curable resin. Thus, the optical sheets were bonded to each other.

Through the steps described above, an intended conductive sheet was obtained.

The optical properties of the conductive sheet produced as described above were evaluated. Consequently, it was confirmed that an interference pattern or the like was not observed using an infrared camera and satisfactory transparency was achieved in the wavelength range used.

Furthermore, the conductivity was evaluated using the end portion of the conductive sheet. Consequently, it was confirmed that low resistivity was achieved.

Reference Examples and Comparative Examples of the present invention are described in the order below.
1. Examination of reflection characteristics through simulation
2. Examination of reflection characteristics through production of sample
3. Examination of resistance characteristics through production of sample 1. Examination of Reflection Characteristics Through Simulation Reference Example 1-1

Figure 31:
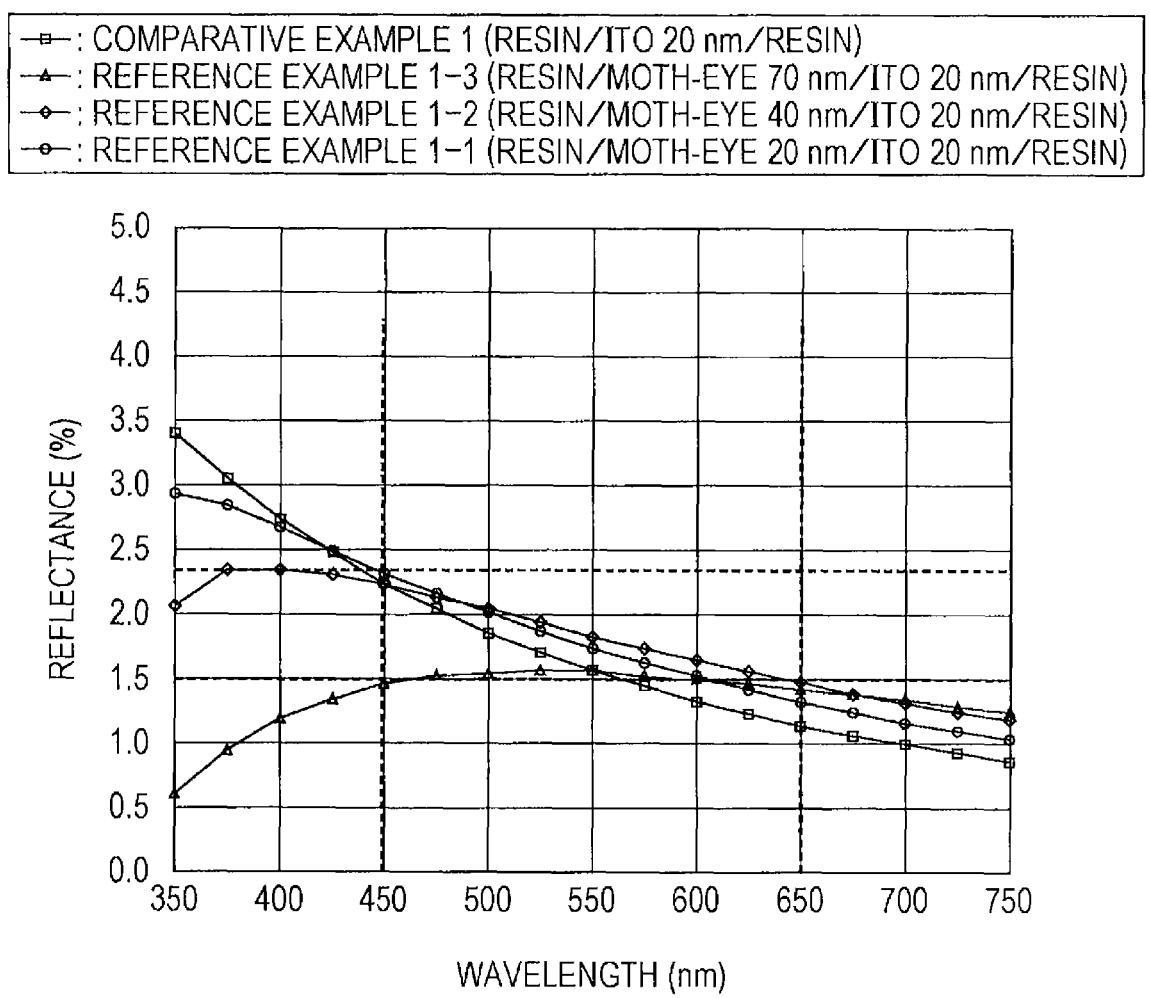
FIG. 31 is a graph showing the reflection characteristics of conductive elements according to Reference Examples 1-1 to 1-3 and Comparative Example 1.

The wavelength dependence of the reflectance of a conductive element was determined through a rigorous coupled wave analysis (RCWA) simulation. FIG. 31 shows the results.

The conditions of the simulation was shown below.
(Layered Structure of Conductive Element)
(outgoing-surface side) resin layer/moth-eye structures/ITO film/resin layer (incoming-surface side)
(Resin Layer)
Refractive index n: 1.52
(ITO Film)
Thickness d: 20 nm
Refractive index n: 2.0
Sectional shape of first wave surface: a shape obtained by periodically repeating a parabola
Wavelength λ of first wave surface: 400 nm
Peak-to-peak amplitude A of first wave surface: 20 nm
Ratio (A/λ) of peak-to-peak amplitude A to wavelength λ of first wave surface: 0.05
Sectional shape of second wave surface: a shape obtained by periodically repeating a parabola
Wavelength λ of second wave surface: 400 nm
Peak-to-peak amplitude B of second wave surface: 20 nm
Ratio (B/λ) of peak-to-peak amplitude B to wavelength λ of second wave surface: 0.05

In Reference Example 1-1, the sectional shape of the first wave surface is a sectional shape obtained when a conductive element is cut in a single direction so that the section includes a position where the peak-to-peak amplitude of the first wave surface of the ITO film is maximized. The sectional shape of the second wave surface is a sectional shape obtained when a conductive element is cut in a single direction so that the section includes a position where the peak-to-peak amplitude of the second wave surface of the ITO film is maximized.
(Moth-Eye Structures)
Shape of structures: paraboloid
Arrangement pattern: hexagonal lattice pattern
Arrangement pitch P between structures: 400 nm
Height H of structures: 20 nm
Aspect ratio (H/P): 0.05
Refractive index n: 1.52
(Resin Layer)
Refractive index n: 1.52

Reference Example 1-2

The wavelength dependence of reflectance was determined by performing the same simulation as that of Reference Example 1-1, except that the simulation conditions were changed to the following simulation conditions. FIG. 31 shows the results.
(Moth-Eye Structures)
Height H of structures: 40 nm
Aspect ratio (H/P): 0.1
(ITO Film)
Peak-to-peak amplitudes of first and second wave surfaces: 40 nm
Ratio (A/λ) and ratio (B/λ): 0.1

Reference Example 1-3

The wavelength dependence of reflectance was determined by performing the same simulation as that of Reference Example 1-1, except that the simulation conditions were changed to the following simulation conditions. FIG. 31 shows the results.
(Moth-Eye Structures)
Height H of structures: 70 nm
Aspect ratio (H/P): 0.175
(ITO Film)
Peak-to-peak amplitudes of first and second wave surfaces: 70 nm
Ratio (A/λ) and ratio (B/λ): 0.175

Comparative Example 1

The wavelength dependence of reflectance was determined by performing a simulation under the same conditions as those of Reference Example 1-1, except that structures were not formed on the resin layer to provide a planar surface and the ITO film was formed on the planar surface. FIG. 31 shows the results.

The following is understood from FIG. 31.

When structures having a height of 40 nm (an aspect ratio of 0.1) or more are formed in the surface, there can be obtained substantially the same spectrum as that of the case where structures are not formed in the surface.

When the structures have a height of 40 nm (an aspect ratio of 0.1) or more, the variation ΔR of reflectance can be reduced to ΔR<1% in the visible region (450 to 650 nm). In other words, the reflectance becomes substantially constant in the visible region.

Reference Example 2-1

Figure 32:
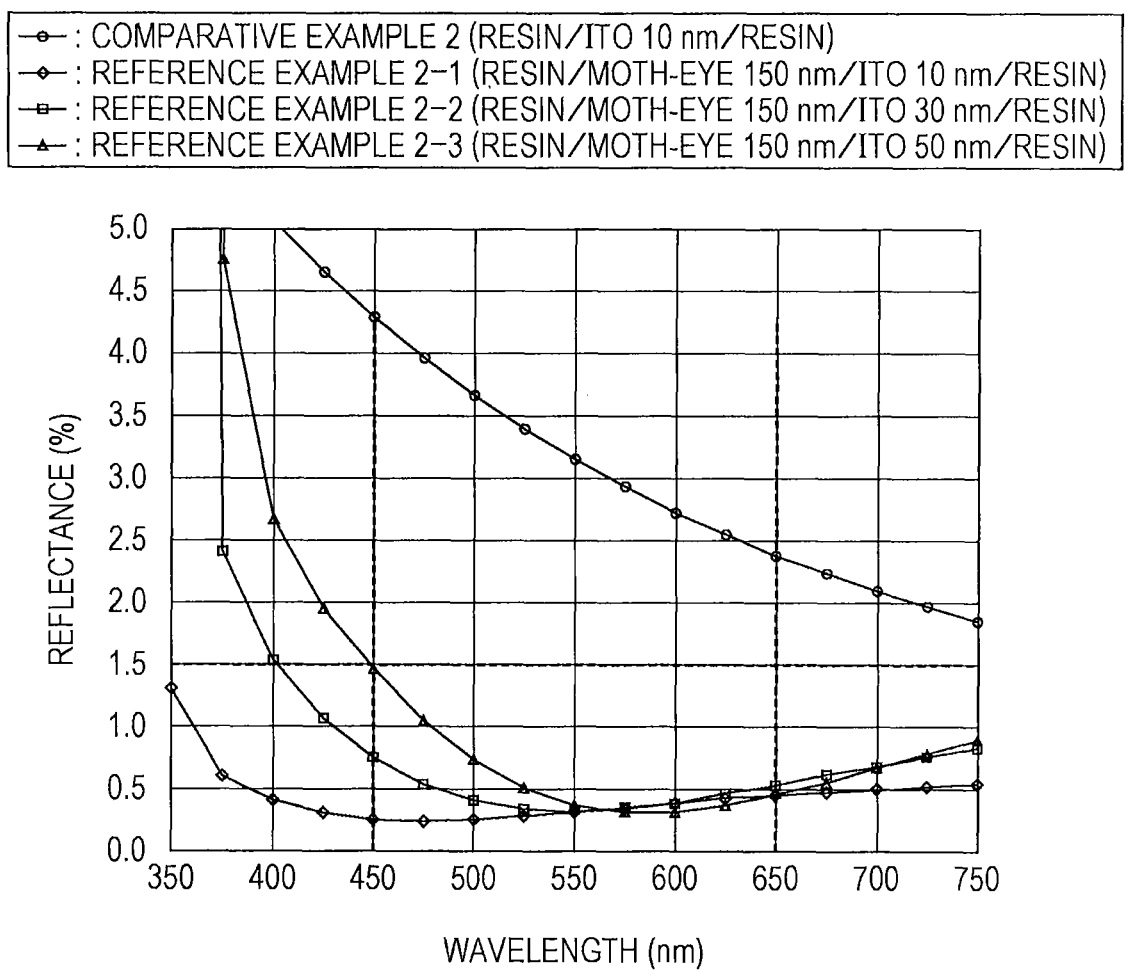
FIG. 32 is a graph showing the reflection characteristics of conductive elements according to Reference Examples 2-1 to 2-3 and Comparative Example 2.

The wavelength dependence of the reflectance of a conductive element was determined through an RCWA simulation. FIG. 32 shows the results.

The conditions of the simulation was shown below.
(Layered Structure of Conductive Element)
  (outgoing-surface side) resin layer/moth-eye structures/ITO film/resin layer (incoming-surface side)
(Resin Layer)
  Refractive index n: 1.52
(ITO Film)
  Thickness d: 10 nm
  Refractive index n: 2.0
  Sectional shape of first wave surface: a shape obtained by periodically repeating a parabola
    Wavelength λ of first wave surface: 250 nm
    Peak-to-peak amplitude A of first wave surface: 150 nm
    Ratio (A/λ) of peak-to-peak amplitude A to wavelength λ of first wave surface: 0.6
  Sectional shape of second wave surface: a shape obtained by periodically repeating a parabola
    Wavelength λ of second wave surface: 250 nm
    Peak-to-peak amplitude B of second wave surface: 150 nm
    Ratio (B/λ) of peak-to-peak amplitude B to wavelength λ of second wave surface: 0.6
(Moth-Eye Structures)
  Shape of structures: paraboloid
  Arrangement pattern: hexagonal lattice pattern
  Arrangement pitch P: 250 nm
  Height H of structures: 150 nm
  Aspect ratio (H/P): 0.6
  Refractive index n: 1.52
(Resin Layer)
  Refractive index n: 1.52

Reference Example 2-2

The wavelength dependence of reflectance was determined by performing a simulation under the same conditions as those of Reference Example 2-1, except that the thickness d of the ITO film was changed to 30 nm. FIG. 32 shows the results.

Reference Example 2-3

The wavelength dependence of reflectance was determined by performing a simulation under the same conditions as those of Reference Example 2-1, except that the thickness d of the ITO film was changed to 50 nm. FIG. 32 shows the results.

Comparative Example 2

The wavelength dependence of reflectance was determined by performing a simulation under the same conditions as those of Reference Example 2-1, except that structures were not formed on the resin layer to provide a planar surface and the ITO film was formed on the planar surface. FIG. 32 shows the results.

The following is understood from FIG. 32.

When the thickness of the ITO film is within a range of 10 to 50 nm, sufficient anti-reflection characteristics are achieved in the visible region. Specifically, the reflectance can be reduced to 1.5% or less in the visible region (450 to 750 nm).

By sandwiching the ITO film between the uneven surfaces of the resin layers, the reflectance can be significantly reduced compared with the case where the ITO film is sandwiched between the planar surfaces of the resin layers. In particular, the reflectance on the shorter wavelength side of the visible region can be reduced.

Reference Example 3-1

Figure 33:
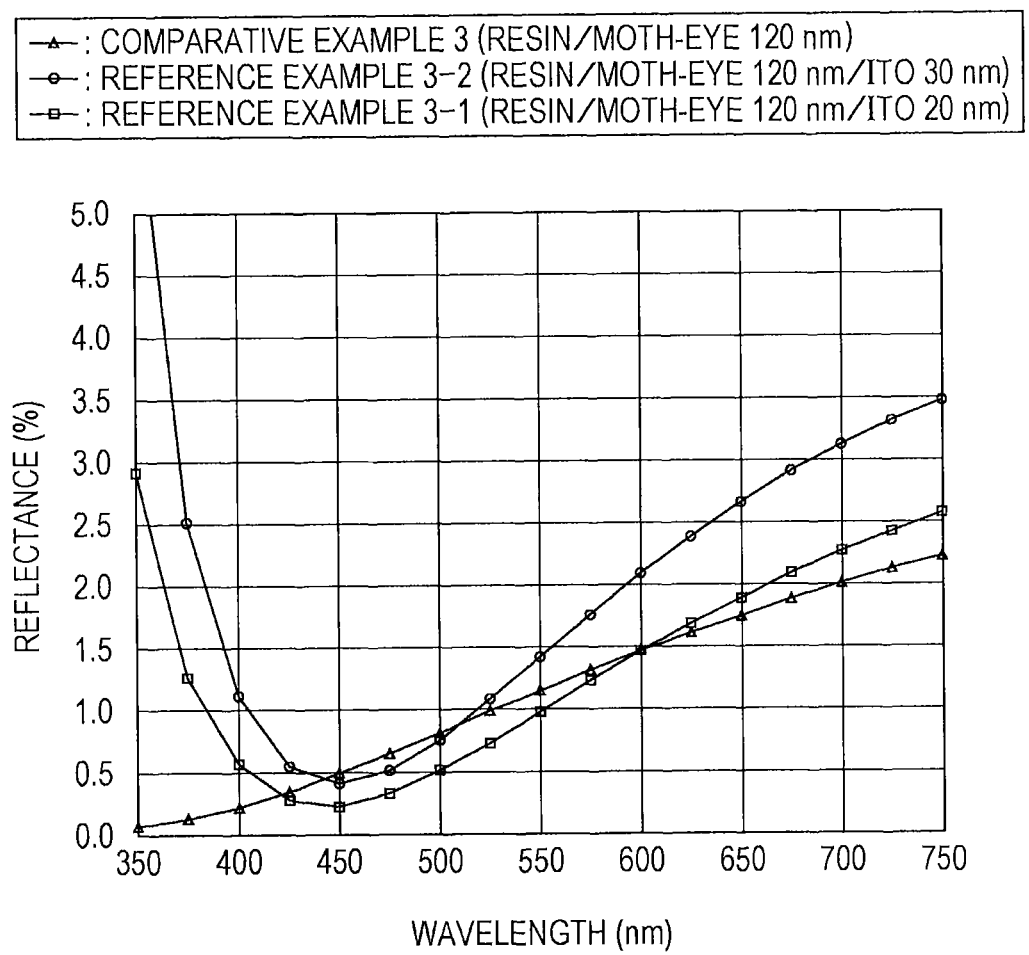
FIG. 33 is a graph showing the reflection characteristics of conductive elements according to Reference Examples 3-1 and 3-2 and an optical element according to Comparative Example 3.

The wavelength dependence of the reflectance of a conductive element was determined through an RCWA simulation. FIG. 33 shows the results.

The conditions of the simulation was shown below.
(Layered Structure of Conductive Element)
  resin layer/moth-eye structures/ITO film/air
(Resin Layer)
  Refractive index n: 1.52
(Moth-Eye Structures)
  Shape of structures: paraboloid
  Arrangement pattern: hexagonal lattice pattern
  Arrangement pitch P: 250 nm
  Height H of structures: 120 nm
  Aspect ratio (H/P): 0.48
  Refractive index n: 1.52
(ITO Film)
  Thickness d: 20 nm
  Refractive index n: 2.0
  Sectional shape of first wave surface: a shape obtained by periodically repeating a parabola
    Wavelength λ of first wave surface: 250 nm
    Peak-to-peak amplitude A of first wave surface: 120 nm
    Ratio (A/λ) of peak-to-peak amplitude A to wavelength λ of first wave surface: 0.48
  Sectional shape of second wave surface: a shape obtained by periodically repeating a parabola
    Wavelength λ of second wave surface: 250 nm
    Peak-to-peak amplitude B of second wave surface: 120 nm
    Ratio (B/λ) of peak-to-peak amplitude B to wavelength λ of second wave surface: 0.48

Reference Example 3-2

The wavelength dependence of reflectance was determined by performing a simulation under the same conditions as those of Reference Example 3-1, except that the thickness d of the ITO film was changed to 30 nm. FIG. 33 shows the results.

Comparative Example 3

The wavelength dependence of reflectance was determined by performing a simulation under the same conditions as those of Reference Example 3-1, except that the thickness d of the ITO film was changed to 0 nm. FIG. 33 shows the results.

The following is understood from FIG. 33.

When a large number of structures are formed in the surface of the resin layer, the difference in reflectance between the case where an ITO film is formed on the structures and the case where an ITO film is not formed on the structures tends to become small at a wavelength of about 450 to 700 nm. Therefore, the difference in reflectance between a region having an electrode pattern of the ITO film and a region having no electrode pattern can be suppressed. In other words, the visibility of a wiring pattern of a digital resistive touch panel or the like can be suppressed.

Reference Example 20-1

Figure 34:
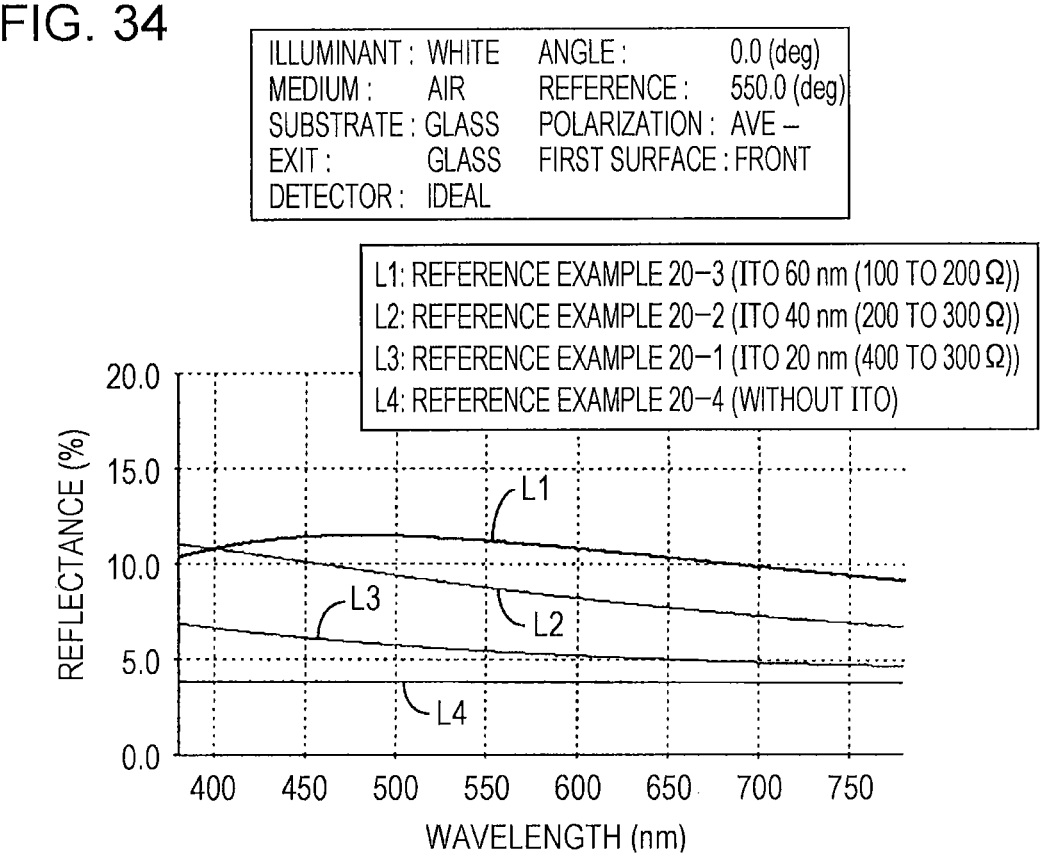
FIG. 34 is a graph showing the reflection characteristics of conductive elements according to Reference Examples 20-1 to 20-3 and an optical element according to Reference Example 20-4.

The wavelength dependence of the reflectance of a conductive element was determined through a simulation. FIG. 34 shows the results.

The conditions of the simulation was shown below.
(Layered Structure of Conductive Element)
  base/ITO film/medium
(Base)
  Base: glass base
  Formed surface: planar surface
  Refractive index n: 1.5
(ITO Film)
  Thickness d: 20 nm
  Refractive index n: 2.0
(Medium)
  Type of medium: air Reference Example 20-2

The wavelength dependence of reflectance was determined by performing a simulation under the same conditions as those of Reference Example 20-1, except that the thickness of the ITO film was changed to 40 nm. FIG. 34 shows the results.

Reference Example 20-3

The wavelength dependence of reflectance was determined by performing a simulation under the same conditions as those of Reference Example 20-1, except that the thickness of the ITO film was changed to 60 nm. FIG. 34 shows the results.

Reference Example 20-4

The wavelength dependence of reflectance was determined by performing a simulation under the same conditions as those of Reference Example 20-1, except that the thickness of the ITO film was changed to 0 nm. FIG. 34 shows the results.

The following is understood from FIG. 34.

When moth-eye structures are not formed in the surface of the base and an ITO film is formed on the planar surface of the base, the reflectance tends to be increased compared with the case where an ITO film is not formed on the planar surface of the base. The degree of an increase in reflectance tends to be proportional to the thickness of the ITO film.

2. Examination of Reflection Characteristics Through Production of Sample

Reference Example 4-1

A glass roll master having an outer diameter of 126 mm was prepared and a resist layer was formed on the surface of the glass roll master as follows. That is, a photoresist was diluted ten-fold with thinner, and a resist layer was formed by applying the diluted photoresist onto the cylindrical surface of the glass roll master by dip coating so as to have a thickness of about 70 nm. Subsequently, the glass roll master serving as a recording medium was conveyed to the roll master exposure apparatus shown in FIG. 13. By exposing the resist layer, latent images that extend in a spiral and have a hexagonal lattice pattern in the three adjacent rows of tracks were patterned in the resist layer.

Specifically, a region where a hexagonal lattice exposure pattern is to be formed was irradiated with laser beams having a power of 0.50 mW/m that can perform exposure up to the surface of the glass roll master to form a depressed hexagonal lattice exposure pattern. The thickness of the resist layer in the column direction was about 60 nm and the thickness of the resist layer in the track extending direction was about 50 nm.

The resist layer formed on the glass roll master was then subjected to developing treatment to dissolve the resist layer formed in the exposed region. Specifically, the undeveloped glass roll master was placed on a turntable (not shown) of a developing machine, and a developer was dropped onto the surface of the glass roll master while the glass roll master was rotated together with the turn table to develop the resist layer formed on the surface. Thus, a resist glass master whose resist layer was opened in a hexagonal lattice pattern was obtained.

Next, plasma etching was performed in a $CHF_3$ gas atmosphere using a roll etching machine. As a result, on the surface of the glass roll master, only a region having a hexagonal lattice pattern exposed from the resist layer was etched and the other region was not etched because the resist layer served as a mask. Thus, depressions having an elliptic cone-like shape were formed in the glass roll master. Herein, the amount (depth) of the etching was adjusted by etching time. Finally, by completely removing the resist layer by $O_2$ ashing, a moth-eye glass roll master having a depressed hexagonal lattice pattern was obtained. The depth of the depressions in the column direction was larger than that of the depressions in the track extending direction.

The above-described moth-eye glass roll master and a triacetyl cellulose (TAC) sheet to which an ultraviolet curable resin was applied were closely brought into contact with each other. The TAC sheet was then detached from the moth-eye glass roll master while being irradiated with ultraviolet rays and cured. Thus, an optical sheet having a plurality of structures arranged on one principal surface thereof was obtained.

Subsequently, an ITO film having a mean thickness of 30 nm was formed by sputtering on the entire surface of the TAC sheet in which the large number of structures had been formed. Another TAC sheet was then attached to the ITO film with an adhesive therebetween.

Regarding the structures of the optical sheet obtained as described above, the mean arrangement pitch P was 270 nm, the mean height H was 170 nm, and the mean aspect ratio was 0.63. Regarding the ITO film, the wavelength λ was 270 nm, the peak-to-peak amplitude A of the first wave surface was 170 nm, the peak-to-peak amplitude B of the second wave surface was 170 to 180 nm, the ratio (A/λ) was 0.63, and the ratio (B/λ) was 0.63 to 0.67.

Through the steps described above, an intended conductive sheet was produced.

Reference Example 4-2

A conductive sheet was produced by the same method as that of Reference Example 4-1, except that the mean thickness of the ITO film was changed to 20 nm.

Comparative Example 4-1

An optical sheet was produced by the same method as that of Reference Example 4-1, except that the ITO film was not formed.

Comparative Example 4-2

A conductive sheet was produced by the same method as that of Reference Example 4-1, except that the step of forming the structures by applying the ultraviolet curable resin was omitted and the ITO film was directly formed on the planar surface of the TAC sheet.

(Evaluation of Surface Resistance)

The surface resistances of the conductive sheets and optical sheet produced as described above were measured by a four-terminal method. Table 1 shows the results.

(Evaluation of Spectral Reflection Characteristics)

Figure 35:
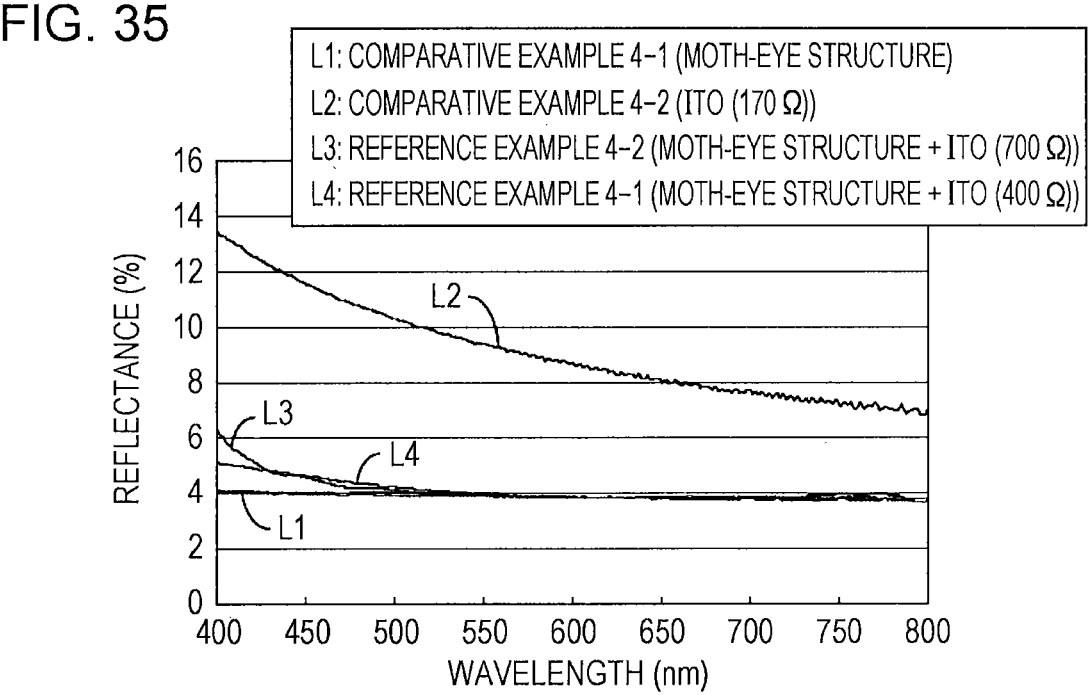
FIG. 35 is a graph showing the reflection characteristics of conductive sheets according to Reference Examples 4-1 and 4-2 and Comparative Example 4-2 and an optical sheet according to Comparative Example 4-1.
Figure 36A:
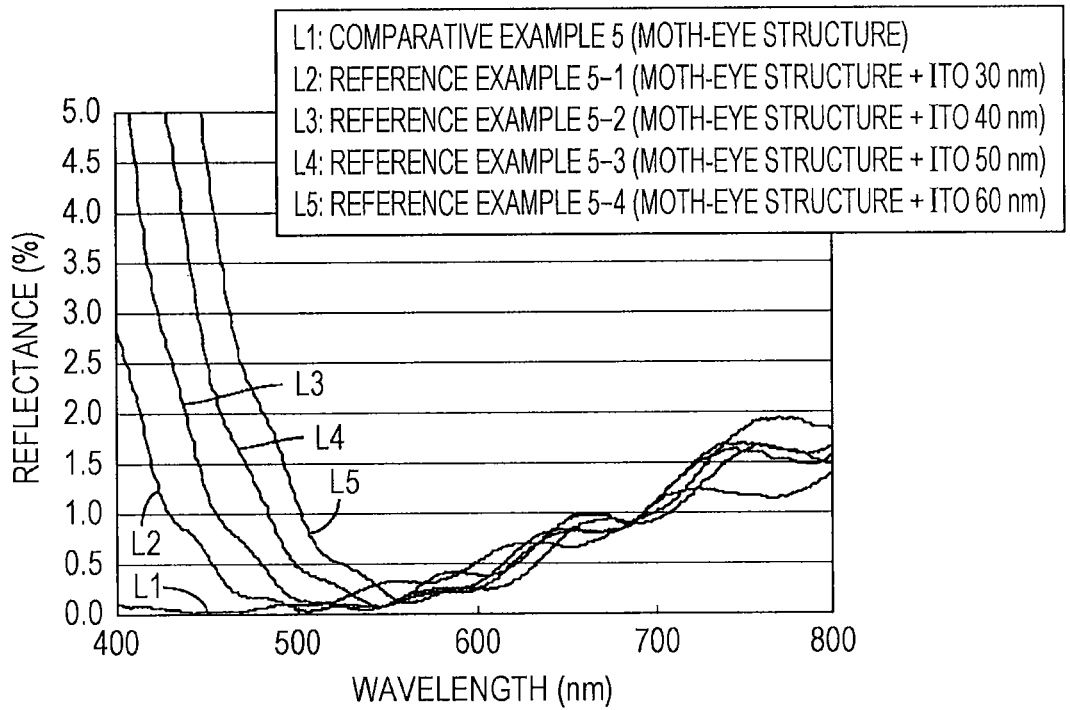
FIG. 36A is a graph showing the reflection characteristics of conductive sheets according to Reference Examples 5-1 to 5-4 and an optical sheet according to Comparative Example 5.
Figure 36B:
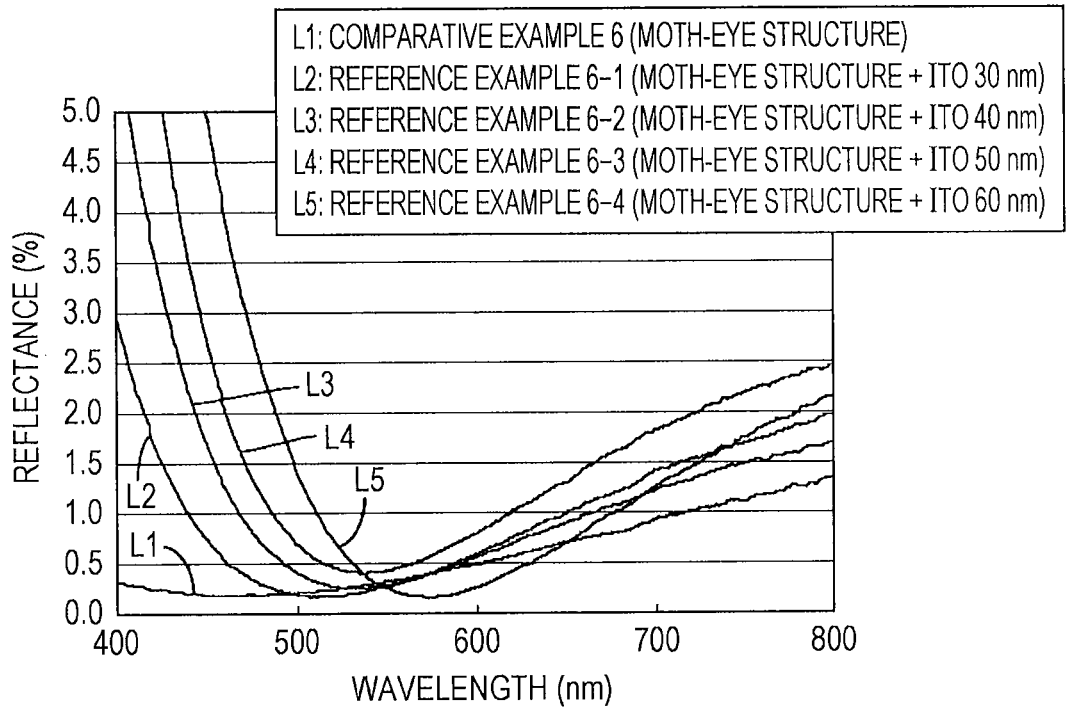
FIG. 36B is a graph showing the reflection characteristics of conductive sheets according to Reference Examples 6-1 to 6-4 and an optical sheet according to Comparative Example 6.
Figure 37A:
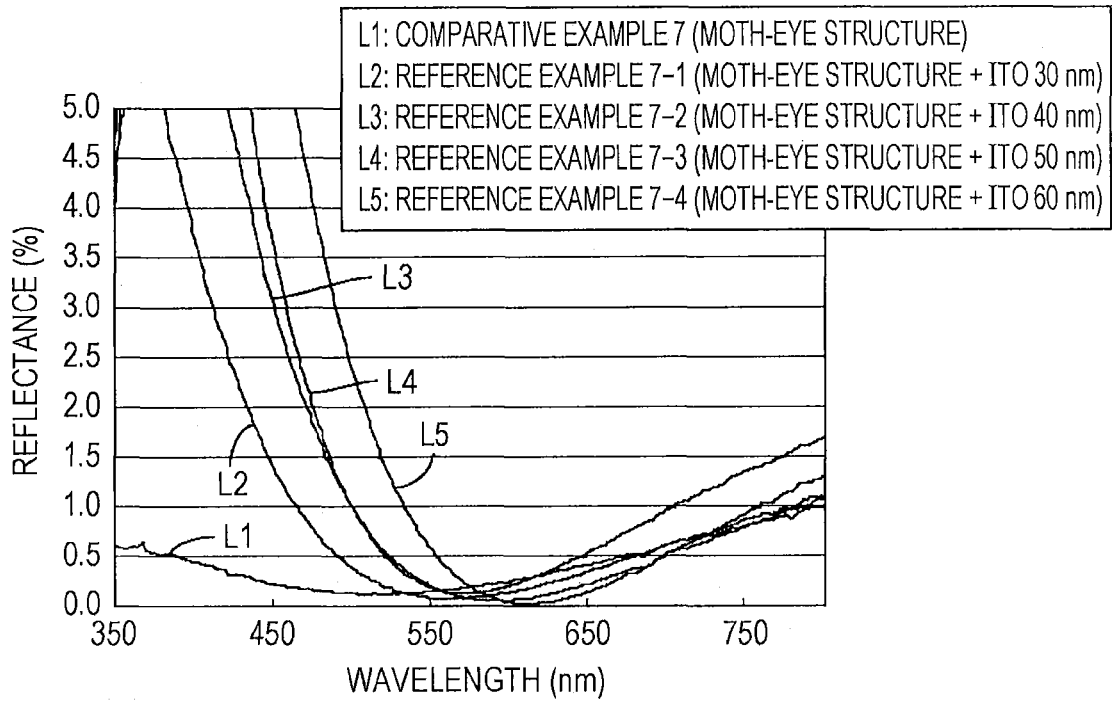
FIG. 37A is a graph showing the reflection characteristics of conductive sheets according to Reference Examples 7-1 to 7-4 and an optical sheet according to Comparative Example 7.
Figure 37B:
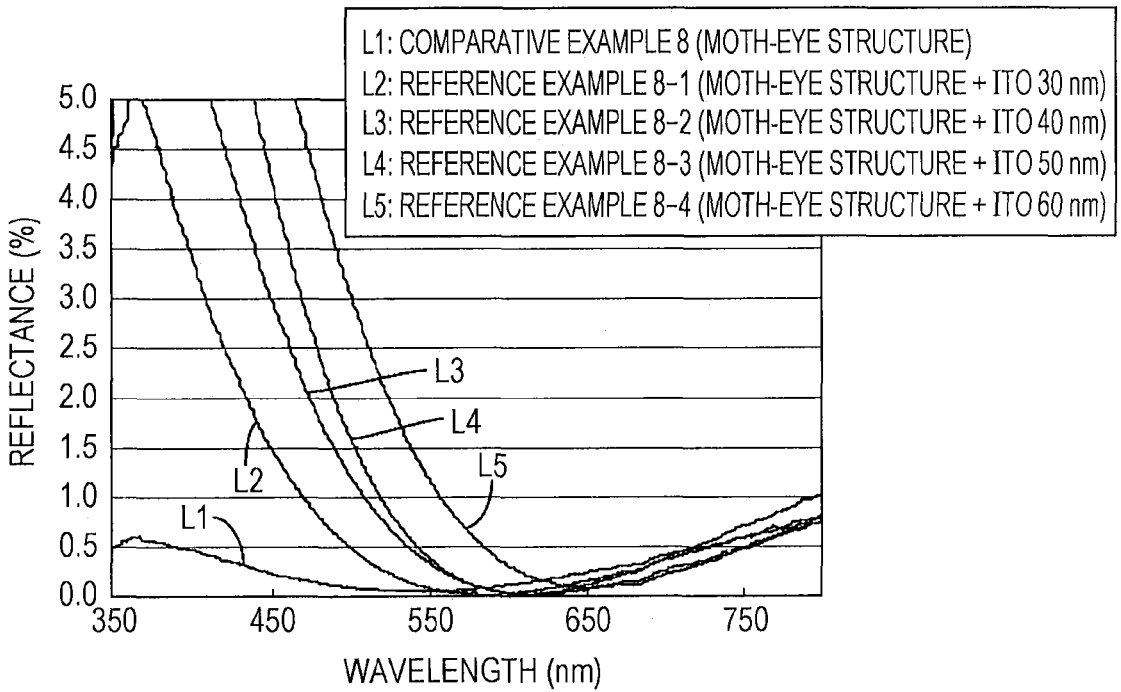
FIG. 37B is a graph showing the reflection characteristics of conductive sheets according to Reference Examples 8-1 to 8-4 and an optical sheet according to Comparative Example 8.
Figure 38A:
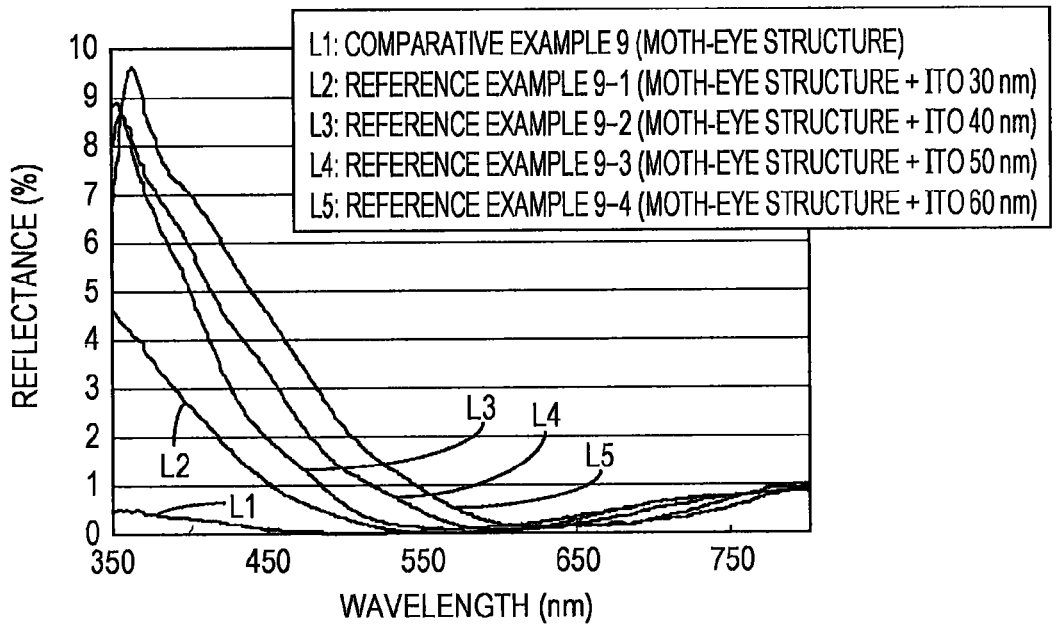
FIG. 38A is a graph showing the reflection characteristics of conductive sheets according to Reference Examples 9-1 to 9-4 and an optical sheet according to Comparative Example 9.
Figure 38B:
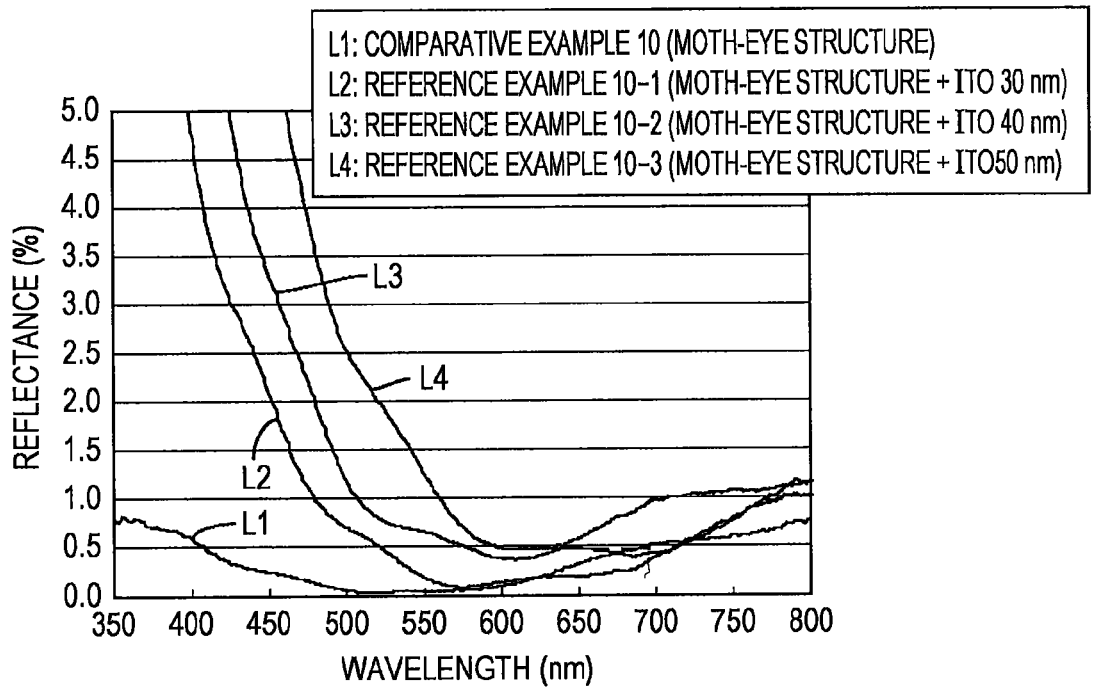
FIG. 38B is a graph showing the reflection characteristics of conductive sheets according to Reference Examples 10-1 to 10-3 and an optical sheet according to Comparative Example 10.
Figure 39:
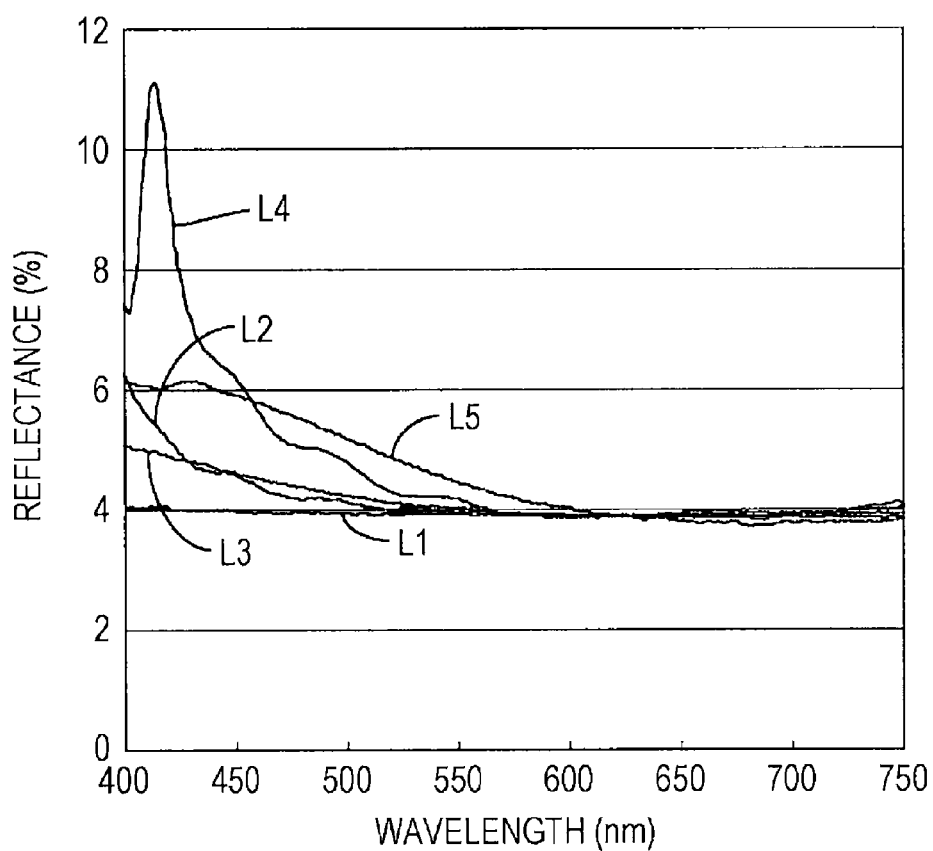
FIG. 39 is a graph showing the reflection characteristics of conductive sheets according to Reference Examples 11-1 to 11-4 and an optical sheet according to Comparative Example 11.
Figure 40A:
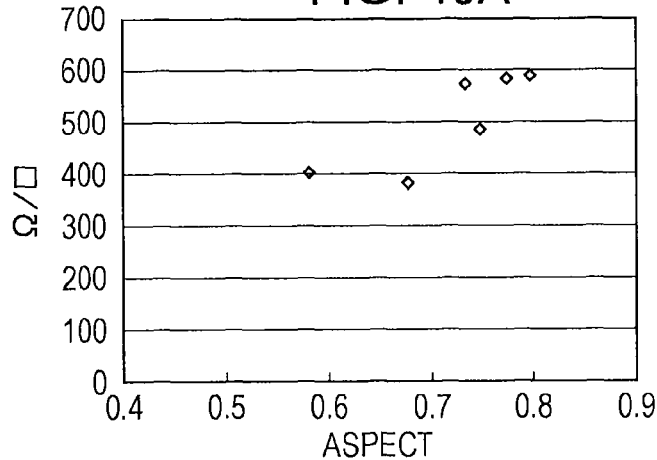
FIG. 40A is a graph showing the surface resistance of conductive sheets according to Reference Examples 12-1 to 12-6.
Figure 40B:
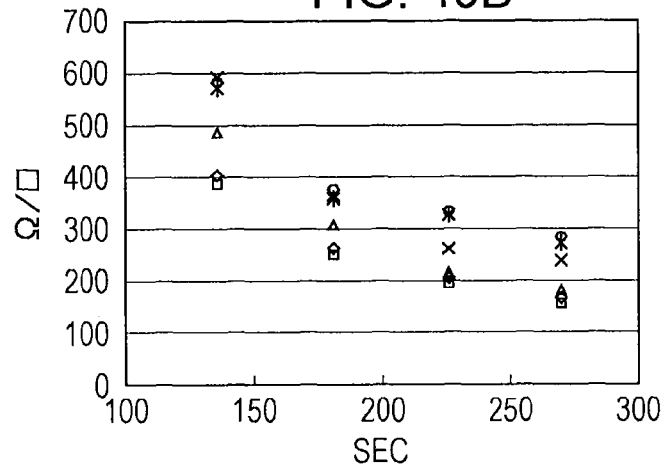
FIG. 40B is a graph showing the surface resistance of conductive sheets according to Reference Examples 13-1 to 18-4.
Figure 40C:
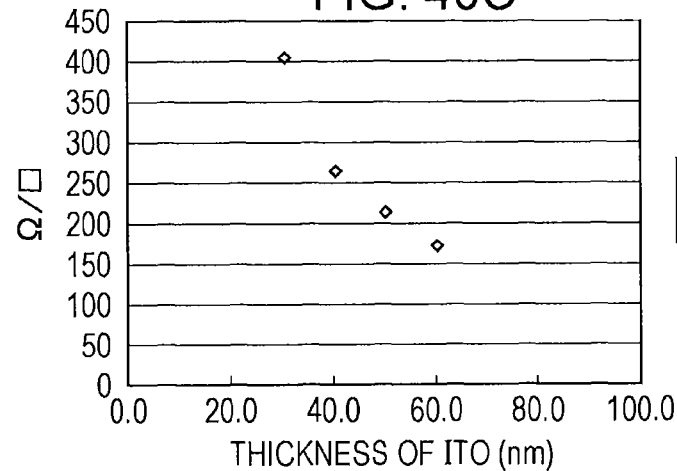
FIG. 40C is a graph showing the surface resistance of conductive sheets according to Reference Examples 19-1 to 19-4.

The spectral reflection characteristics of the conductive sheets and optical sheet produced as described above were measured by the following method. A black tape was attached to the back side of the TAC sheet in which the large number of structures or the ITO film had been formed. Subsequently, the spectral reflection characteristics of the conductive sheet obtained when light was incident upon a surface opposite the surface to which the black tape had been attached were determined using an evaluation apparatus (V-550) available from JASCO Corporation. FIG. 35 shows the results.

TABLE 1

| | Layered structure | Arrangement pattern | Shape of structures | Projection or depression (structures) | Pitch (mm) | Height (nm) | Aspect ratio | Thickness (nm) | Surface resistance (Ω/square) |
|---|---|---|---|---|---|---|---|---|---|
| R.E. 4-1 | (a) | Hexagonal lattice | Paraboloid | Projection | 270 | 170 | 0.6 | 30 | 400 |
| R.E. 4-2 | (a) | | | | | | | 20 | 700 |
| C.E. 4-1 | (b) | | | | | | | 0 | — |
| C.E. 4-2 | (c) | — | — | — | — | — | — | 30 | 170 |

Layered structure (a): resin layer (with moth-eye structure)/ITO film/resin layer (with moth-eye structure)
Layered structure (b): resin layer (with moth-eye structure)/resin layer (with moth-eye structure)
Layered structure (c): resin layer (without moth-eye structure)/ITO film/resin layer (without moth-eye structure)
R.E.: Reference Example
C.E.: Comparative Example The following is understood from FIG. 35.

In Reference Examples 4-1 and 4-2 in which the ITO film is formed on the structures, the reflectance can be reduced in a visible region of 400 to 800 nm compared with Comparative Example 4-2 in which the ITO film is formed on the planar surface of the TAC sheet.

In Reference Examples 4-1 and 4-2 in which the ITO film is formed on the structures, substantially the same reflectance as that of Comparative Example 4-1 in which the ITO film is not formed on the structures is achieved in a visible region of 400 to 800 nm. From these results, even when the ITO film is formed in a certain wiring pattern, the difference in reflectance between a portion having a wiring pattern and a portion having no wiring pattern can be almost completely eliminated by forming the ITO film on the structures. Therefore, the wiring pattern becomes substantially invisible.

Reference Example 5-1

A TAC sheet having moth-eye structures formed therein was obtained by the same method as that of Reference Example 4-1, except that the conditions of the exposure step and the etching step were adjusted and the structures shown in Table 2 were employed. Subsequently, an ITO film having a mean thickness of 30 nm was formed by sputtering on the entire surface of the TAC sheet in which the large number of structures had been formed. Thus, there was produced a conductive sheet in which the surface having moth-eye structures formed therein was exposed without being covered with a resin layer.

Reference Example 5-2

A conductive sheet was produced by the same method as that of Reference Example 5-1, except that the mean thickness of the ITO film was changed to 40 nm.

Reference Example 5-3

A conductive sheet was produced by the same method as that of Reference Example 5-1, except that the mean thickness of the ITO film was changed to 50 nm.

Reference Example 5-4

A conductive sheet was produced by the same method as that of Reference Example 5-1, except that the mean thickness of the ITO film was changed to 60 nm.

Comparative Example 5

An optical sheet was produced by the same method as that of Reference Example 5-1, except that the ITO film was not formed.

Reference Example 6-1

A conductive sheet was produced by the same method as that of Reference Example 5-1, except that the conditions of the exposure step and the etching step were adjusted, the structures shown in Table 2 were employed, and the mean thickness of the ITO film was changed to 30 nm

Reference Example 6-2

A conductive sheet was produced by the same method as that of Reference Example 6-1, except that the mean thickness of the ITO film was changed to 40 nm.

Reference Example 6-3

A conductive sheet was produced by the same method as that of Reference Example 6-1, except that the mean thickness of the ITO film was changed to 50 nm.

Reference Example 6-4

A conductive sheet was produced by the same method as that of Reference Example 6-1, except that the mean thickness of the ITO film was changed to 60 nm.

Comparative Example 6

An optical sheet was produced by the same method as that of Reference Example 6-1, except that the ITO film was not formed.

Reference Example 7-1

A conductive sheet was produced by the same method as that of Reference Example 5-1, except that the conditions of the exposure step and the etching step were adjusted, the structures shown in Table 2 were employed, and the mean thickness of the ITO film was changed to 30 nm.

Reference Example 7-2

A conductive sheet was produced by the same method as that of Reference Example 7-1, except that the mean thickness of the ITO film was changed to 40 nm.

Reference Example 7-3

A conductive sheet was produced by the same method as that of Reference Example 7-1, except that the mean thickness of the ITO film was changed to 50 nm.

Reference Example 7-4

A conductive sheet was produced by the same method as that of Reference Example 7-1, except that the mean thickness of the ITO film was changed to 60 nm.

Comparative Example 7

An optical sheet was produced by the same method as that of Reference Example 7-1, except that the ITO film was not formed.

Reference Example 8-1

A conductive sheet was produced by the same method as that of Reference Example 5-1, except that the conditions of the exposure step and the etching step were adjusted, the structures shown in Table 2 were employed, and the mean thickness of the ITO film was changed to 30 nm.

Reference Example 8-2

A conductive sheet was produced by the same method as that of Reference Example 8-1, except that the mean thickness of the ITO film was changed to 40 nm.

Reference Example 8-3

A conductive sheet was produced by the same method as that of Reference Example 8-1, except that the mean thickness of the ITO film was changed to 50 nm.

Reference Example 8-4

A conductive sheet was produced by the same method as that of Reference Example 8-1, except that the mean thickness of the ITO film was changed to 60 nm.

Comparative Example 8

An optical sheet was produced by the same method as that of Reference Example 8-1, except that the ITO film was not formed.

Reference Example 9-1

A conductive sheet was produced by the same method as that of Reference Example 5-1, except that the conditions of the exposure step and the etching step were adjusted, the structures shown in Table 2 were employed, and the mean thickness of the ITO film was changed to 30 nm.

Reference Example 9-2

A conductive sheet was produced by the same method as that of Reference Example 9-1, except that the mean thickness of the ITO film was changed to 40 nm.

Reference Example 9-3

A conductive sheet was produced by the same method as that of Reference Example 9-1, except that the mean thickness of the ITO film was changed to 50 nm.

Reference Example 9-4

A conductive sheet was produced by the same method as that of Reference Example 9-1, except that the mean thickness of the ITO film was changed to 60 nm.

Comparative Example 9

An optical sheet was produced by the same method as that of Reference Example 9-1, except that the ITO film was not formed.

Reference Example 10-1

A conductive sheet was produced by the same method as that of Reference Example 5-1, except that the conditions of the exposure step and the etching step were adjusted, the structures shown in Table 2 were employed, and the mean thickness of the ITO film was changed to 30 nm.

Reference Example 10-2

A conductive sheet was produced by the same method as that of Reference Example 10-1, except that the mean thickness of the ITO film was changed to 40 nm.

Reference Example 10-3

A conductive sheet was produced by the same method as that of Reference Example 10-1, except that the mean thickness of the ITO film was changed to 50 nm.

Reference Example 10-4

A conductive sheet was produced by the same method as that of Reference Example 10-1, except that the mean thickness of the ITO film was changed to 60 nm.

Comparative Example 10

An optical sheet was produced by the same method as that of Reference Example 10-1, except that the ITO film was not formed.

Reference Example 11-1

A conductive sheet was produced by the same method as that of Reference Example 5-1, except that the conditions of the exposure step and the etching step were adjusted, the structures shown in Table 2 were formed, and the mean thickness of the ITO film was changed to 30 nm.

Reference Example 11-2

A conductive sheet was produced by the same method as that of Reference Example 11-1, except that the structures shown in Table 2 were formed.

Reference Example 11-3

A conductive sheet was produced by the same method as that of Reference Example 11-1, except that the mean thickness of the ITO film was changed to 50 nm.

Reference Example 11-4

A conductive sheet was produced by the same method as that of Reference Example 11-3, except that the structures shown in Table 2 were formed.

Comparative Example 11

A single-layer glass was prepared.

Table 2 shows the configurations of the conductive sheets of Reference Examples 5-1 to 11-4 and the optical sheets of Comparative Examples 5 to 11.

TABLE 2

| | Layered structure | Arrangement pattern | Shape of structures | Projection or depression (structures) | Pitch (nm) | Height (nm) | Aspect ratio | Thickness (nm) | Surface resistance (Ω/square) |
|---|---|---|---|---|---|---|---|---|---|
| R.E. 5-1 | (d) | Hexagonal lattice | Paraboloid | Projection | 270 | 156 | 0.56 | 30 | 405 |
| R.E. 5-2 | | | | | | | | 40 | 265 |
| R.E. 5-3 | | | | | | | | 50 | 214 |
| R.E. 5-4 | | | | | | | | 60 | 173 |
| C.E. 5 | | | | | | | | 0 | — |
| R.E. 6-1 | (d) | Hexagonal lattice | Paraboloid | Projection | 240 | 160 | 0.68 | 30 | 383 |
| R.E. 6-2 | | | | | | | | 40 | 250 |
| R.E. 6-3 | | | | | | | | 50 | 193 |
| R.E. 6-4 | | | | | | | | 60 | 157 |
| C.E. 6 | | | | | | | | 0 | — |
| R.E. 7-1 | (d) | Hexagonal lattice | Paraboloid | Projection | 240 | 179 | 0.75 | 30 | 486 |
| R.E. 7-2 | | | | | | | | 40 | 306 |
| R.E. 7-3 | | | | | | | | 50 | 215 |
| R.E. 7-4 | | | | | | | | 60 | 185 |
| C.E. 7 | | | | | | | | 0 | — |
| R.E. 8-1 | (d) | Hexagonal lattice | Paraboloid | Projection | 240 | 190 | 0.8 | 30 | 591 |
| R.E. 8-2 | | | | | | | | 40 | 361 |
| R.E. 8-3 | | | | | | | | 50 | 263 |
| R.E. 8-4 | | | | | | | | 60 | 241 |
| C.E. 8 | | | | | | | | 0 | — |
| R.E. 9-1 | (d) | Hexagonal lattice | Paraboloid | Projection | 250 | 183 | 0.73 | 30 | 575 |
| R.E. 9-2 | | | | | | | | 40 | 362 |
| R.E. 9-3 | | | | | | | | 50 | 328 |
| R.E. 9-4 | | | | | | | | 60 | 270 |
| C.E. 9 | | | | | | | | 0 | — |
| R.E. 10-1 | (d) | Hexagonal lattice | Paraboloid | Projection | 230 | 178 | 0.77 | 30 | 585 |
| R.E. 10-2 | | | | | | | | 40 | 374 |
| R.E. 10-3 | | | | | | | | 50 | 334 |
| R.E. 10-4 | | | | | | | | 60 | 282 |
| C.E. 10 | | | | | | | | 0 | — |
| R.E. 11-1 | (a) | Hexagonal lattice | Paraboloid | Projection | 270 | 156 | 0.56 | 30 | 350 |
| R.E. 11-2 | | | | | | 240 | 190 | 0.8 | 30 | 650 |
| R.E. 11-3 | | | | | | 270 | 156 | 0.56 | 50 | 170 |
| R.E. 11-4 | | | | | | 240 | 190 | 0.8 | 50 | 275 |
| C.E. 11 | (e) | — | — | — | — | — | — | — | — |

Layered structure (a): resin layer (with moth-eye structure)/ITO film/resin layer (with moth-eye structure)
Layered structure (d): resin layer (with moth-eye structure)/ITO film/air layer
Layered structure (e): single-layer glass
R.E.: Reference Example
C.E.: Comparative Example

3. Examination of Resistance Characteristics Through Production of Sample

Reference Examples 12-1 to 12-6

Conductive sheets were produced by the same method as that of Reference Example 4-1, except that the conditions of the exposure step and the etching step were adjusted, the structures shown in Table 3 were formed, and the mean thickness of the ITO film was changed to 30 nm.

Reference Examples 13-1 to 13-4

Conductive sheets were produced by the same method as that of Reference Example 12-1, except that the mean thicknesses of the ITO films were changed to 30 nm, 40 nm, 50 nm, and 60 nm, respectively.

Reference Examples 14-1 to 14-4

Conductive sheets were produced by the same method as that of Reference Example 12-2, except that the mean thicknesses of the ITO films were changed to 30 nm, 40 nm, 50 nm, and 60 nm, respectively.

Reference Examples 15-1 to 15-4

Conductive sheets were produced by the same method as that of Reference Example 12-3, except that the mean thicknesses of the ITO films were changed to 30 nm, 40 nm, 50 nm, and 60 nm, respectively.

Reference Examples 16-1 to 16-4

Conductive sheets were produced by the same method as that of Reference Example 12-4, except that the mean thicknesses of the ITO films were changed to 30 nm, 40 nm, 50 nm, and 60 nm, respectively.

Reference Examples 17-1 to 17-4

Conductive sheets were produced by the same method as that of Reference Example 12-6, except that the mean thicknesses of the ITO films were changed to 30 nm, 40 nm, 50 nm, and 60 nm, respectively.

Reference Examples 18-1 to 18-4

Conductive sheets were produced by the same method as that of Reference Example 12-5, except that the mean thicknesses of the ITO films were changed to 30 nm, 40 nm, 50 nm, and 60 nm, respectively.

Reference Examples 19-1 to 19-4

Conductive sheets were produced by the same method as that of Reference Example 12-2, except that the mean thicknesses of the ITO films were changed to 30 nm, 40 nm, 50 nm, and 60 nm, respectively.

Table 3 shows the configurations of the conductive sheets of Reference Examples 12-1 to 19-4.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

TABLE 3

| | Arrangement Pattern | Shape of structures | Projection or depression (structures) | Pitch (nm) | Height (nm) | Aspect ratio | Thickness (nm) | Surface resistance ($\Omega$/square) |
|---|---|---|---|---|---|---|---|---|
| R.E. 12-1 | Hexagonal lattice | Paraboloid | Projection | 270 | 156 | 0.58 | 30 | 405 |
| R.E. 12-2 | | | | 240 | 162 | 0.68 | 30 | 383 |
| R.E. 12-3 | | | | 240 | 179 | 0.75 | 30 | 486 |
| R.E. 12-4 | | | | 240 | 191 | 0.8 | 30 | 591 |
| R.E. 12-5 | | | | 230 | 178 | 0.77 | 30 | 585 |
| R.E. 12-6 | | | | 250 | 183 | 0.73 | 30 | 575 |
| R.E. 13-1 | Hexagonal lattice | Paraboloid | Projection | 270 | 156 | 0.58 | 30 | 405 |
| R.E. 13-2 | | | | | | | 40 | 265 |
| R.E. 13-3 | | | | | | | 50 | 214 |
| R.E. 13-4 | | | | | | | 60 | 173 |
| R.E. 14-1 | Hexagonal lattice | Paraboloid | Projection | 240 | 162 | 0.68 | 30 | 383 |
| R.E. 14-2 | | | | | | | 40 | 250 |
| R.E. 14-3 | | | | | | | 50 | 193 |
| R.E. 14-4 | | | | | | | 60 | 157 |
| R.E. 15-1 | Hexagonal lattice | Paraboloid | Projection | 240 | 179 | 0.75 | 30 | 486 |
| R.E. 15-2 | | | | | | | 40 | 306 |
| R.E. 15-3 | | | | | | | 50 | 215 |
| R.E. 15-4 | | | | | | | 60 | 185 |
| R.E. 16-1 | Hexagonal lattice | Paraboloid | Projection | 240 | 191 | 0.8 | 30 | 591 |
| R.E. 16-2 | | | | | | | 40 | 361 |
| R.E. 16-3 | | | | | | | 50 | 263 |
| R.E. 16-4 | | | | | | | 60 | 241 |
| R.E. 17-1 | Hexagonal lattice | Paraboloid | Projection | 250 | 183 | 0.73 | 30 | 575 |
| R.E. 17-2 | | | | | | | 40 | 362 |
| R.E. 17-3 | | | | | | | 50 | 328 |
| R.E. 17-4 | | | | | | | 60 | 275 |
| R.E. 18-1 | Hexagonal lattice | Paraboloid | Projection | 230 | 178 | 0.77 | 30 | 585 |
| R.E. 18-2 | | | | | | | 40 | 374 |
| R.E. 18-3 | | | | | | | 50 | 334 |
| R.E. 18-4 | | | | | | | 60 | 282 |

TABLE 3-continued

|  | Arrangement Pattern | Shape of structures | Projection or depression (structures) | Pitch (nm) | Height (nm) | Aspect ratio | Thickness (nm) | Surface resistance (Ω/square) |
|---|---|---|---|---|---|---|---|---|
| R.E. 19-1 | Hexagonal lattice | Paraboloid | Projection | 240 | 162 | 0.68 | 30 | 383 |
| R.E. 19-2 |  |  |  |  |  |  | 40 | 250 |
| R.E. 19-3 |  |  |  |  |  |  | 50 | 193 |
| R.E. 19-4 |  |  |  |  |  |  | 60 | 157 |

R.E.: Reference Example

The embodiments have been specifically described above, but various modifications can be made.

For example, the configurations, methods, shapes, materials, numerical values, and the like described in the above embodiments are mere examples, and other configurations, methods, shapes, materials, numerical values, and the like, which are different from the above, may be optionally used.

The configurations of the above-described embodiments can be combined with each other.

In the above-described embodiments, a conductive element may be produced by thermal transfer. Specifically, a conductive element may be produced by heating a base mainly composed of a thermoplastic resin and then by pressing a mold such as a roll-shaped master or a disc-shaped master against the base that has been sufficiently softened through the application of heat.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transparent conductive element comprising:
a first conductive layer having a first surface and a second surface, and extending in a first direction;
a second conductive layer having a first surface and a second surface, and extending in a second direction perpendicular to the first direction;
first and second metal layers formed on and directly contacting one of the first and second surfaces of the first and second conductive layers, respectively; and
a plurality of medium layers including a first medium layer formed between the first and second conductive layers, a second medium layer formed on a side of the first conductive layer opposite to the first medium layer, and a third medium layer formed on a side of the second conductive layer opposite to the first medium layer,
wherein the transparent conductive element has a refractive index ranging from 1.2 to 1.7,
wherein the first and second surfaces of each of the first and second conductive layers are wave surfaces with a wavelength shorter than or equal to 360 nm,
the ratio (Am/λm) of a mean peak-to-peak amplitude Am to a mean wavelength λm of the wave surfaces of the first and second conductive layers are 1.8 or less, and
the mean thickness Dm of the first conductive layer is larger than the mean peak-to-peak amplitude Am of the wave surface of the first conductive layer and ranges from 10 nm to 120 nm, and
wherein each of the medium layers includes at least one uneven surface that forms an interface with the wave surface of the respective adjacent conductive layer.

2. The transparent conductive element according to claim 1, wherein the first and second surfaces for each of the first and second conductive layers are respectively first wave surfaces and second wave surfaces each having a wavelength shorter than or equal to 360 nm.

3. The transparent conductive element according to claim 2, wherein the mean peak-to-peak amplitude of the first wave surface is different from that of the second wave surface for each of the first and second conductive layers.

4. The transparent conductive element according to claim 2, wherein the mean peak-to-peak amplitude of the first wave surface is larger than that of the second wave surface for each of the first and second conductive layers.

5. The transparent conductive element according to claim 2,
wherein the ratio (Am1/λm1) of a mean peak-to-peak amplitude Am1 to a mean wavelength λm1 of the first wave surface is 1.8 or less for each of the first and second conductive layers, and
the ratio (Am2/λm2) of a mean peak-to-peak amplitude Am2 to a mean wavelength λm2 of the second wave surface is 1.8 or less for each of the first and second conductive layers.

6. The transparent conductive element according to claim 1, wherein the surface resistance of each of the first and second conductive layers is 1000 Ω/square or less.

7. The transparent conductive element according to claim 1, wherein each of the first and second conductive layers includes at least one selected from the group consisting of conductive polymer, metal nanoparticles, and carbon nanotube.

8. The transparent conductive element according to claim 1, wherein the each of the first and second conductive layers contains a transparent oxide semiconductor.

9. The transparent conductive element according to claim 2, wherein for at least one of the first and second conductive layers, the positions of the first wave surface and the second wave surface are not in synchronization with each other.

10. The transparent conductive element according to claim 2, wherein for at least one of the first and second conductive layers, the positions of the first wave surface and the second wave surface are in synchronization with each other.

11. The transparent conductive element according to claim 1, wherein at least one of the first, second, and third medium layers has a transmittance of visible light of 20% or more, the visible light having a wavelength of 400 nm or longer and 800 nm or shorter.

12. The transparent conductive element according to claim 1,
wherein at least one of the first, second, and third medium layers has an uneven surface that forms an interface with the wave surface,
the uneven surface is formed of a large number of structures arranged with a pitch smaller than or equal to 360 nm, and
the mean aspect ratio of the structures is 1.8 or less.

13. The transparent conductive element according to claim 1,
   wherein the wave surfaces of the first and second conductive layer is formed of a large number of parabolic structures arranged with a pitch smaller than or equal to 360 nm, and
   the mean aspect ratio of the structures is 1.8 or less.

14. An information input apparatus comprising the transparent conductive element according to claim 1.

15. A display apparatus comprising the transparent conductive element according to claim 1.

16. The transparent conductive element according to claim 1,
   wherein at least one of the first and second surfaces of at least one of the first and second conductive layers includes an uneven surface formed of a large number of structures, said structures being arranged in a quasi-tetragonal lattice pattern or a quasi-hexagonal lattice pattern.

17. The transparent conductive element according to claim 1,
   wherein at least one of the first and second metal layers includes at least one material selected from the group consisting of Ag, Al, Cu, Ti, Au, Pt, and Nb.

18. The transparent conductive element according to claim 1, wherein the mean thicknesses Dm of the first and second conductive layers each range from 10 nm to 50 nm.

* * * * *